United States Patent
Tanaka et al.

[11] Patent Number: 5,654,839
[45] Date of Patent: Aug. 5, 1997

[54] CONTROL APPARATUS AND METHOD FOR CONVEYANCE CONTROL OF MEDIUM IN LIBRARY APPARATUS AND DATA TRANSFER CONTROL WITH UPPER APPARATUS

[75] Inventors: Hidehiko Tanaka, Kawasaki; Ryutaro Kurusu, Yokohama; Akira Hayakawa, Yokohama; Masakazu Sakamoto, Yokohama, all of Japan

[73] Assignee: Fujitsu Limited, Kawasaki, Japan

[21] Appl. No.: 351,601

[22] Filed: Dec. 7, 1994

[30] Foreign Application Priority Data

Dec. 21, 1993 [JP] Japan .................. 5-321902
Apr. 20, 1994 [JP] Japan .................. 6-081210

[51] Int. Cl.$^6$ .................................. G11B 15/00
[52] U.S. Cl. ................ 360/71; 360/69; 360/92; 364/478.03; 364/478.06
[58] Field of Search ............... 360/69, 71, 72.1, 360/92, 74.1; 369/30, 32, 33, 34; 395/404, 405; 364/478, 478.02, 478.03, 478.06; 414/277; 242/339

[56] References Cited

U.S. PATENT DOCUMENTS

| | | | |
|---|---|---|---|
| 4,604,661 | 8/1986 | De Shon | 360/69 |
| 4,907,889 | 3/1990 | Simone | 360/92 |
| 4,928,245 | 5/1990 | Moy | 360/71 |
| 5,274,516 | 12/1993 | Kakuta et al. | 360/92 |
| 5,343,403 | 8/1994 | Beidle | 360/69 |
| 5,459,848 | 10/1995 | Mose | 360/69 |

FOREIGN PATENT DOCUMENTS

| | | | |
|---|---|---|---|
| 4334455 | 9/1994 | Germany | 360/92 |
| 281352 | 3/1990 | Japan . | |
| 3259450 | 11/1991 | Japan . | |
| 128684 | 5/1993 | Japan | 360/69 |
| 36243 | 2/1994 | Japan | 360/69 |

*Primary Examiner*—Aristotelis M. Psitos
*Assistant Examiner*—Alan Faber
*Attorney, Agent, or Firm*—Greer, Burns & Crain, Ltd.

[57] ABSTRACT

A end report of the unloading operation is issued to a host computer for a period of time between after the start of the ejecting operation of a medium cartridge of a recording/reproducing unit based on an unloading command until before the end of the unloading operation, thereby allowing the next moving command to be issued precedently to the end of the actual unloading operation. Simultaneously with that the unloading operation is instructed to the recording/reproducing unit on the basis of the unloading command, the end report of the unloading operation is executed to the host computer, thereby allowing the host computer to issue the next moving command. In a data transfer control between the host computer and a control unit of a library apparatus, when the number of error times of the data transfer errors exceeds a threshold value, the subsequent data transfer speed is switched to the executable data transfer speed at which the data transfer can be retried, and the data transfer is executed.

13 Claims, 36 Drawing Sheets

C: MAXIMUM DATA TRANSFER SPEED
D: TIMER
E: TIMER THRESHOLD VALUE
F: DATA TRANSFER SPEED REGISTER

FIG. 11

| STORING POSITION | CELL ADDRESS |
|---|---|
| ACCESSOR HAND | A 0 0 0, A 0 0 1 |
| INLET/OUTLET PORT | B 0 0 0 |
| CELL BLOCK | C 0 0 0 ~ C F F F |
| MTU | D 0 0 0 ~ D 0 0 D |

CONTROL APPARATUS AND METHOD FOR CONVEYANCE CONTROL OF MEDIUM IN LIBRARY APPARATUS AND DATA TRANSFER CONTROL WITH UPPER APPARATUS

BACKGROUND OF THE INVENTION

The present invention relates to apparatus and method for controlling a conveyance of a medium of a library apparatus in which a number of memory media such as magnetic tape cartridges or the like are enclosed and which records and reproduces them and, more particularly, to apparatus and method for controlling a data transfer between a library apparatus and a host computer.

In recent computer systems, in association with an increase in number of media such as magnetic tapes, optical disks, or the like as external memory media, improving a use efficiency, maintenance performance, further, a reliability, and the like is important. For these purposes, a library apparatus to automatically execute the storage of the media and the conveyance to the recording/reproducing unit by using a robot mechanism is provided. In such a library apparatus, the number of access requests per unit time increases in association with an increase in number of working jobs and an increase in number of host computers connected.

FIG. 1 is a schematic diagram of a conventional library apparatus. A library apparatus 700 is used as an information storage of upper host computers 20-1 to 20-4 and has two directors 702 as input/output control sections. The directors 702 have, for example, four channels A to D and E to H, respectively. In this case, the channels A and B and the channels E and F are used. Cell blocks 710 as medium storages each for enclosing a medium such as a magnetic tape cartridge or the like are provided in the library apparatus 700. Two accessors 708 are provided as conveying robot mechanisms which run on a rail 714 along the cell blocks 710. The accessor 708 is controlled by a machine controller 706. An accessor controller 704 is provided as an upper apparatus of the machine controller 706. Generally, one of the accessors 708 operates and executes a conveyance control and the other accessor 708 doesn't operate. This is because the two accessors 708 move on the one rail 714, they cannot operate simultaneously and a management is one-dimensionally performed by one control section so that the accessors 708 operate separately by an exclusive control method. A plurality of magnetic tape units are connected to the director 702. The director 702 loads the medium conveyed by the accessor 708 and reads or writes it and, after that, the medium is returned to the cell block 710 by the accessor 708.

In such a library apparatus, how fast the library apparatus can process the attachment (mounting) and removal (demounting) of a magnetic tape cartridge to/from a magnetic tape unit 716 is important. Namely, at the start of the reading or writing process, it is necessary to convey the designated magnetic tape cartridge from the cell block 710 as quickly as possible and to return the ejected magnetic tape cartridge to the original cell as soon as possible after the reading or writing operation is completed in order to improve the performance of the library apparatus.

The mounting and demounting processes in the conventional library apparatus occurs as follows. First, according to the mounting process, a host OS (operating system), such as a library support program provided for the host computer, generates a moving command having command data in which a cell address of the cell block 710 is set to a movement original side address (From Address) and a logical machine No. of the magnetic tape unit 716 to be used is set to a movement destination side address (To Address). The director 702 which received the moving command instructs the operation to the accessor controller 704. The magnetic tape cartridge is taken out from the cell block 710 by the accessor 708 and is conveyed to the designated magnetic tape unit 716 and is inserted into an insertion port.

When a device end is obtained by completion of the conveyance, the host OS generates a loading command, thereby loading the conveyed magnetic tape cartridge to the magnetic tape unit 716. When the device end is obtained by completion of the loading, the host OS Generates a reading or writing command, thereby performing the reading or writing operation.

When the reading or writing operation is completed, the host OS executes the demounting process. In the demounting process, first, an unloading command is generated, thereby executing the unloading operation to eject out the magnetic tape cartridge from the magnetic tape unit 716 which finished the reading or writing operation. When the unloading command is finished by the device end, the host OS Generates a moving command to return the magnetic tape cartridge to the cell block. That is, the host OS generates a moving command having command data in which the machine No. of the magnetic tape unit which finished the unloading operation is set to the movement original side address and the position of the original cell block is set to the movement destination side address. When the accessor 708 is in an idle state, the accessor 708 returns the ejected magnetic tape cartridge to the original position in the cell blocks 710 by the control of the accessor controller 704 based on the command data from the director 702. In this manner, a series of processes are finished.

The time chart of FIG. 2 shows the demounting process of a conventional library apparatus. In FIG. 2, the host OS, directors 702, magnetic tape units 716, and accessors 708 are shown in the upper lateral direction; wherein the vertical direction denotes a time base and a state of commands between the units, instructions, and a state of response between the units.

In FIG. 2, a host computer (host OS) 20 first designates the logical machine No. of the magnetic tape unit and generates an unloading command 600 to the director 702. When the director 702 normally receives the unloading command 600, the director 702 returns an initial status 602 of "00" and sets a channel end. The director 702 also gives an unloading instruction 604 to the magnetic tape unit 716 of the logical machine No. designated on the basis of the unloading command 600. The magnetic tape unit 716 which received the unloading instruction 604 rewinds the cartridge of the magnetic tape, executes the ejecting operation after completion of the rewinding, and reports a completion of the unloading 614 to the director 702. The operating time from the start of the unloading to the end thereof is equal to about 10 to 60 seconds.

On the other hand, at the time point when the director 702 gives the unloading instruction 604 to the magnetic tape unit 716, the status of a control end, a unit end, and a unit check are returned as an end status 606 for the unloading command 600 and the host computer 20 recognizes the normal end of the command generation. Subsequently, the host computer 20 executes a sensing process during the unloading operation. First, a sensing command 608 is issued and an initial status and sense data 610 of a predetermined number of bytes is returned from the director 702 as a channel end based on the command receipt. A final status 612 of the device end is subsequently returned and a state of the library apparatus is recognized. The sensing process is executed at a predetermined timer period.

The director 702 which received the completion of the unloading 614 by the end of the unloading operation of the magnetic tape unit 716 reports an attention status 616 having the logical machine No. #8 allocated to the accessor 708 to the host computer 20. The host computer 20 recognizes the unloading operation by the receipt of the attention status 616 having the logical machine No. #8 and issues a moving command 618. When the moving command 618 is normally received by the director 702, an initial status 620 of "00" is returned and the channel end is set. Subsequently, movement original side/movement destination side address data 622 is issued as command data. When the accessor 708 is empty in this instance, the director 702 gives a moving instruction 624 based on the movement original side address and the movement destination side address and the conveying operation of the accessor 708 is started. Although it depends on the cell position, the conveying operation needs about 10 seconds as an average. When a completion of the operation 628 is reported from the accessor 708 to the director 702, a final status 630 is reported to the host computer 20 and the device end indicative of the normal end of the moving command is obtained.

In such a conventional demounting process after completion of the reading or writing process, however, a special attention status is reported to the host OS at a time point when the unloading command is issued by the host OS and the operation is completed, a moving command to return the medium to the original cell is issued from the host OS in response to the attention status, and serialized processes to sequentially execute the unloading operation and the conveying operation are performed.

Due to this, only after the unloading operation was completed, does the accessor starts moving to the position of the magnet tape unit which ejected the cartridge. Therefore, at least the processing time obtained by adding the conveying time to the unloading operation time is needed until the end of the demounting process and there is a problem such that it takes an additional processing time.

As a background a storage amount of the data base is being enormously increased nowadays on the user's side, it is an indispensable condition to process the data at a high speed when the library apparatus is used, and further, the improvement of the processing performance of the library apparatus is strongly demanded by the user's needs in association with the appearance of the other competition apparatuses.

Hitherto, the magnetic tape subsystem using a library apparatus is widely used as an external memory apparatus of a computer system and stores a great amount of preservation data. Such a magnetic tape subsystem needs to process a large amount of data in a short time and a data transfer speed between the channel of the host computer and the magnetic tape subsystem is remarkably raised. In the data transfer between the channel and the magnetic tape subsystem, the data is transmitted and received each time an input/output request is generated between the channel and the magnetic tape subsystem. Therefore, by changing the transmission/reception speed of the channel or magnetic tape subsystem, the data transfer speed can be changed. In the magnetic tape subsystem, in order to efficiently store a great amount of data to a medium more efficiently, write data is compressed and stored and read data from the medium is decompressed and transferred to the host computer.

However, there is a case where the high speed data transfer cannot be normally performed due to a failure of a data transmitting and receiving circuit or the like in the magnetic tape subsystem and the failure cannot be detected. In such a case, a timer in which a constant monitoring time has been set is activated in the magnetic tape subsystem and a failure is detected by a time-out which occurs because the process is not finished within a monitoring time.

A data compressing circuit in the magnetic tape subsystem compresses a great amount of data to a smaller amount of data and preserves. Therefore, an amount of input data to the compressing circuit is large and an amount of output data is small. Thus, it is necessary to realize a high transfer speed of the input data. However, when the transfer speed rises, a load of the magnetic tape subsystem increases, so that a probability such that the margin lacks and the system enters an abnormal state rises.

Further, when the data compressing circuit is realized by a program, the processing speed becomes slow and it takes a time for a storing process to the medium. The compressing process is an algorithm having a constant regularity. Therefore, the data compressing circuit is generally realized by a hardware. However, in the data compressing circuit with a hardware construction, there is a case where a hardware failure which is peculiar to the apparatus occurs in dependence on the performance of the device or the like. In many cases, causes of such a failure depend on a state of a high load by the data transfer of a high speed. Therefore, there is also a case where when the data compressing circuit fails, by switching the data transfer speed of the magnetic tape subsystem to a low speed, the failure can be rescued. However, since the time of the data preserving process to the magnetic tape subsystem is reduced, the maximum transfer speed is generally set and the data transfer is started between the magnetic tape subsystem and the channel. When an error occurs, the data transfer speed is switched to a low speed and a retry is performed.

FIG. 3 shows a conventional data transfer control apparatus. The director 702 of a library apparatus which functions as a magnetic tape control unit is provided for a data transmission and reception control circuit 718 provided for a channel of a host computer 20. The director 702 comprises: a data transmission and reception control circuit 730; a host interface controller (HIC) 722; a multiblock buffer (MBB) 724; a control information table (CIT) 726; and a formatter (FMT) 728. The host interface controller (HIC) 722 comprises: the data transmission and reception control circuit 730; a transfer speed setting register 732; a channel data abnormality detecting circuit 734; a memory 736; a microprocessor (MPU) 738; and a data compressing circuit 740.

The host interface controller 722 executes various kinds of input and output processes with the host computer 20. The formatter 728 executes a formatting process of the read data and write data for a magnetic tape in the magnetic tape drive unit or the like. The control information table 726 is a memory to store various control information (command parameter and the like). The multiblock buffer 724 is a data buffer to temporarily store the transfer data. The data transmission and reception control circuits 718 and 730 control the transmission and reception at the time of the data transfer. The MPU 738 executes various controls in the host interface controller 722. The data compressing circuit 740 performs a compression of data to be written to the magnetic tape medium and a decompression of read data in the drive unit. The channel data abnormality detecting circuit 734 detects that an error such as a hardware failure or the like occurs when data is transferred from the channel. The memory 736 stores data such as timer, threshold value of the timer, maximum data transfer speed, and the like. The MPU 738 manages the data in the memory 736. The transfer speed setting register 732 sets the data transfer speed between the register and the channel.

A flowchart of FIG. 4 shows a transfer control by the conventional MPU 738. First, the MPU 738 sets the maximum data transfer speed into the transfer speed setting register 732 in the data transmission and reception control circuit 730 (step S1). The timer stored in the memory 736 is reset and is started (step S2). The data transfer is started (step S3). After that, the elapsed time as a value of the timer in the memory 736 is compared with the timer threshold value, thereby monitoring the time (step S4). Until the timer value exceeds the timer threshold value by the time monitor, a check is made to see if an error has been detected by the channel data abnormality detecting circuit 734 or not (step S5). Thus, when no error is detected, a normal end is reported to the host computer 20 (step S6). When the timer value exceeds the timer threshold value in the process in step S4 or when the error is detected in the process in step S5, a data transfer speed lower than the present data transfer speed is set into the transfer speed setting register 732 in the data transmission and reception control circuit 730 (step S7). An error is reported to the host computer 20, thereby instructing the retry (step S8).

A time chart of FIG. 5 shows a transfer control by the conventional MPU 738. In FIG. 5, (A) denotes a channel; (B) a magnetic tape control unit; (C) a maximum data transfer speed (4.5 Mbytes/sec); (D) a timer value (initial value=0); (E) a timer threshold value (=10); and F a value of the transfer speed setting register (initial value=4.5 Mbytes/sec).

When a data transfer request is generated from the host computer 20 at a timing t1, the MPU 738 executes a data transfer at the maximum data transfer speed of 4.5 Mbytes/sec stored in the memory 736. When the time-out is detected due to an error at a timing t2 during the data transfer process, the error is reported to the host computer 20, thereby executing the retry. Since the error has already occurred at a timing t3 at the maximum data transfer speed of 4.5 Mbytes/sec, the data transfer speed is reduced to 3.0 Mbytes/sec, thereby retrying. Since the data transfer speed is reduced, the data transfer is normally executed at a timing t4. When the data transfer is finished, the normal end is reported to the host computer 20. When a new data transfer request is subsequently generated at a timing t5, the data transfer speed is again set to 4.5 MBytes/sec as a maximum data transfer speed, thereby starting the data transfer. However, in a manner similar to the case at a timing t6, an error occurs during the data transfer and the time-out occurs. The error is reported to the host computer 20, thereby performing the retry. At a timing tT, the data transfer speed is reduced to 3.0 MBytes/sec and the retry is performed. The normal end is reported to the host computer 20 at a timing t8.

However, such a data transfer control in the conventional external memory apparatus has the following problems. First, each time a data transfer request is generated from the host computer, the maximum data transfer speed is set and the data transfer is performed. Therefore, the load on the external memory apparatus side increases, an error occurs, and a frequency of the occurrence of the retry process increases. Thus, the delay time for the data storing process which is executed by the external memory apparatus increases and an occupation time of the channel increases.

The external memory apparatus detects an error by monitoring the time by the timer. As a monitoring time in this case, it is necessary to have at least the time during which the maximum amount of data which is peculiar to the external memory apparatus can be transferred. For example, in the magnetic tape subsystem, the monitoring time which is about 90 times as long as the transfer time which is generally used is used. Therefore, although the data transfer is completed in one minute so long as the normal data transfer can be performed, if a retry of the data transfer occurs due to a failure or abnormality, a situation such that it takes a time of 90 minutes for the time-out waiting. Therefore, the data storage processing time is fairly delayed.

Among the errors of the data transmission and reception control circuit and the like of the external memory apparatus, there is a case where an error occurs because of a high data transfer speed. In such a case, the error can be rescued by setting the data transfer speed to a low speed. However, hitherto, each time the data transfer request is generated from the host computer, the maximum data transfer speed is set and the data transfer is started. Therefore, when an error occurs because the data transfer speed is too high, the error occurs each time the data transfer request is generated. Therefore, the number of retry times remarkably increases and the data storing process becomes slow.

Further, there is a case where the error at the time of the data transfer in the external memory apparatus is caused by the data pattern of the transfer data. Generally, the user of the external memory apparatus stores data patterns of the same system. Therefore, there is a case where the number of errors which occurs due to the data pattern increases in dependence on the user. In such a case, each time the data transfer request is generated, the error of the data transfer occurs, so that the number of retry times extremely increases and the data storing process becomes slow.

SUMMARY OF THE INVENTION

According to the present invention, there is provided a library apparatus in which a processing time that is required for demounting a medium which finished the reading or writing process is reduced as much as possible and a processing performance is improved and there is also provided a control method of such a library apparatus.

A library apparatus of the invention comprises: a recording/reproducing unit to read and write a detachable memory medium; an inserting/ejecting apparatus to insert and eject the memory medium; a cell block as a medium storage to store a plurality of memory media; and an accessor as a medium conveying apparatus to convey the memory medium between the cell block and the recording/reproducing unit or between the cell block and the inserting/ejecting apparatus. Each apparatus is operated by an instruction of an input/output control unit apparatus (director) which receives a command from an upper apparatus.

The input/output control unit sequentially receives a first moving command, a loading command, a reading or writing command, an unloading command, and a second moving command from the upper apparatus and executes a series of mounting and demounting processes. First, in the mounting process, the memory medium is conveyed by the accessor from the cell block or the inserting/ejecting apparatus to the recording/reproducing unit on the basis of the first moving command, the conveyed memory medium is loaded into the recording/reproducing unit by the loading command, and the loaded memory medium is subjected to the reading or writing operation on the basis of the reading or writing command.

In the demounting process, the memory medium is ejected out of the recording/reproducing unit on the basis of the unloading command after completion of the reading or writing operation and the ejected memory medium is finally conveyed to the cell block or the inserting/ejecting apparatus by the accessor on the basis of the second moving command.

According to such a library apparatus of the invention, a first pseudo status reporting section for performing a pseudo end report of the unloading operation to the upper apparatus and for allowing the upper apparatus to issue the second moving command from the recording/reproducing unit based on the unloading command for a period of time from the start of the medium ejecting operation to the end of the unloading operation is provided for the input/output control unit.

For example, the first pseudo status reporting section instructs the unloading operation to the recording/reproducing unit on the basis of the unloading command and also performs the pseudo end report of the unloading operation to the upper apparatus, thereby allowing the upper apparatus to issue the second moving command. In the case where the magnetic tape cartridge is used for the recording/reproducing unit, it is also possible to construct in a manner such that the first pseudo status reporting section receives the report of completion of the tape rewinding of the magnetic tape cartridge from the recording/reproducing unit on the basis of the unloading command and also performs the pseudo end report of the unloading operation to the upper apparatus, thereby allowing the upper apparatus to issue the second moving command.

In this case, the second moving command is precedently issued from the upper apparatus during the unloading operation on the basis of the pseudo end report of the unloading operation from the first pseudo status reporting section. Therefore, the second moving command received is reserved, and when the end report of the unloading operation is received from the recording/reproducing unit, the conveying operation based on the reserved second moving command is instructed to the accessor.

As mentioned above, according to the library apparatus of the invention, the unloading operation is instructed to the recording/reproducing unit and simultaneously performs the pseudo end report of the unloading operation and allows the upper apparatus to issue the second moving command for returning the medium to the original position and the conveying operation is started during the unloading operation. Due to this, at the time point when the medium is ejected out by the completion of the unloading operation, the medium conveying apparatus has already moved the medium to the position of the recording/reproducing unit designated by the movement original side address or to a position near the designated position. Accordingly, since the medium is immediately picked up by the completion of the unloading operation and is conveyed to the original position, the processing time in which the unloading and conveying operations overlap can be reduced. For the second moving command issued in association with the pseudo completion report during the unloading operation, the pseudo completion of the conveying operation is also reported and a command for the recording/reproducing unit of the same machine No. in association with a new input/output request is issued.

As a modification of the invention, in addition to the first pseudo status reporting section, a second pseudo status reporting section and a machine No. converting section are further provided. When the second moving command is received from the upper apparatus in association with the pseudo end report of the unloading operation by the first pseudo status reporting section, the second pseudo status reporting section performs a pseudo end report of the conveying operation to return the memory medium ejected out of the recording/reproducing unit to the original position, thereby allowing the upper apparatus to issue a command on the basis of the new input/output request.

When a command is received for example the logical machine No. #0 to designate the same recording/reproducing unit, from the upper apparatus in association with the pseudo end report of the conveying operation, the machine converting section converts the logical machine No. #0 designated by such a command to, for example, the logical machine No. #1 of another recording/reproducing unit in a vacant state and instructs the operation corresponding to the command.

With regard to the first moving command of the same machine No. #0 in association with the new input/output request received until the completion of the unloading operation of the recording/reproducing unit of the machine No. #0 which performed the pseudo completion report, the machine converting section instructs the operation due to the conversion from the logical machine No. #0 to No. #1 with respect to each of the loading command of the same machine No. #0 subsequent to the first moving command, reading or writing command, unloading command, and second moving command. Therefore, even if a new moving command which designated the same logical machine No. as that of the recording/reproducing unit during the unloading operation is issued, the moving command is normally received without finishing by a busy response of the recording/reproducing unit. The logical machine No. is changed to the logical machine No. of a vacant apparatus and the operation is instructed, so that the input/output request of the upper apparatus can be efficiently processed.

According to the invention, there are provided apparatus and method in which, for example, by setting the data transfer speed to the optimum speed on the basis of the number of error times at the time of the data transfer in the controller of the library apparatus which functions as an external memory apparatus, the number of retry times of the data transfer is reduced and the delay of a data storing process is reduced.

According to the invention, for example, a library apparatus for realizing a magnetic tape subsystem is set to an external memory apparatus. The library apparatus comprises: a drive unit for reading and writing data from/to a tape medium; and a magnetic tape control unit for controlling the drive unit. The magnetic tape control unit functions as a director and has a host interface controller to execute an interface control with an upper host computer. The host interface controller comprises: a transfer speed setting register for setting a data transfer speed between the register and an upper apparatus; a data transmission and reception control circuit for performing a data transfer at a data transfer speed set in the transfer speed setting register; a channel data abnormality detecting circuit for detecting a data transfer error between the detecting circuit and the host computer; and a memory.

An MPU in the host interface controller sets the maximum data transfer speed or executable data transfer speed of the memory into the transfer speed setting register. Thus, the data transmission and reception control circuit executes the data transfer between the control circuit and the channel in accordance with a proper data transfer speed set in the transfer speed setting register. When the data transfer is being executed between the data transmission and reception control circuit and the channel, the timer in the memory is started and the timer value (elapsed time) is compared with the timer threshold value, thereby monitoring the time-out of the data transfer. A check is made to see if the data transfer enters an abnormal state or not on the basis of the detection information from the channel data abnormality detecting circuit. When an error occurs in the data transfer due to the time-out or the abnormality detection from the channel data abnormality detecting circuit, a data transfer speed lower than the present data transfer speed is set into the transfer speed setting register and a retry is requested to the channel. Thus, the data transfer is executed at a low speed. When the data transfer is normally finished by the retry of the data transfer, the value of an error counter enclosed in the memory is increased by (+1). At the same time, the data transfer speed when the data transfer is normally finished by the retry at the time of the error detection is stored into the memory as an executable data transfer speed.

According to the invention, in the case where a plurality of magnetic tape control units are provided for the library apparatus, the number of error times of the data transfer is counted every magnetic tape control unit. When the number of error times exceeds the error threshold value stored in the memory, the data transfer speed is switched to the executable data transfer speed in the memory and all of the command processes which are executed by the same magnetic tape control unit are executed.

The number of error times of the data transfer errors is counted every plural channel ports of the host computer. When the number of error times exceeds the error threshold value in the memory, the data transfer speed is switched to the executable data transfer speed in the memory and all of the command processes which are executed by the same channel port are executed.

Further, the number of error times of the data transfer errors is counted every drive machine number allocated to each of a plurality of drive units. When the number of error times exceeds the error threshold value in the memory, the data transfer speed is switched to the executable data transfer speed in the memory and all of the command processes which are executed by the drive of the same drive machine number are executed.

Further, the number of error times of the data transfer errors is counted every plural tape media. When the number of error times exceeds the error threshold value in the memory, the data transfer speed is switched to the executable data transfer speed in the memory and all of the command processes which are executed by the same media are executed. By the above processes, the number of times of the retry which is executed when an error occurs in the data transfer is reduced. Therefore, the processing time to read or write data from/to the medium is reduced.

The above and other objects, features, and advantages of the present invention will become more apparent from the following detailed description with reference to the drawings.

BRIEF DESCRIPTION OF THE DRAWINGS

FIG. 11 is an explanatory diagram of cell addresses allocated to a library apparatus;

DETAILED DESCRIPTION OF THE PREFERRED EMBODIMENTS

[System Construction and Mechanical Structure]

Figure 6:
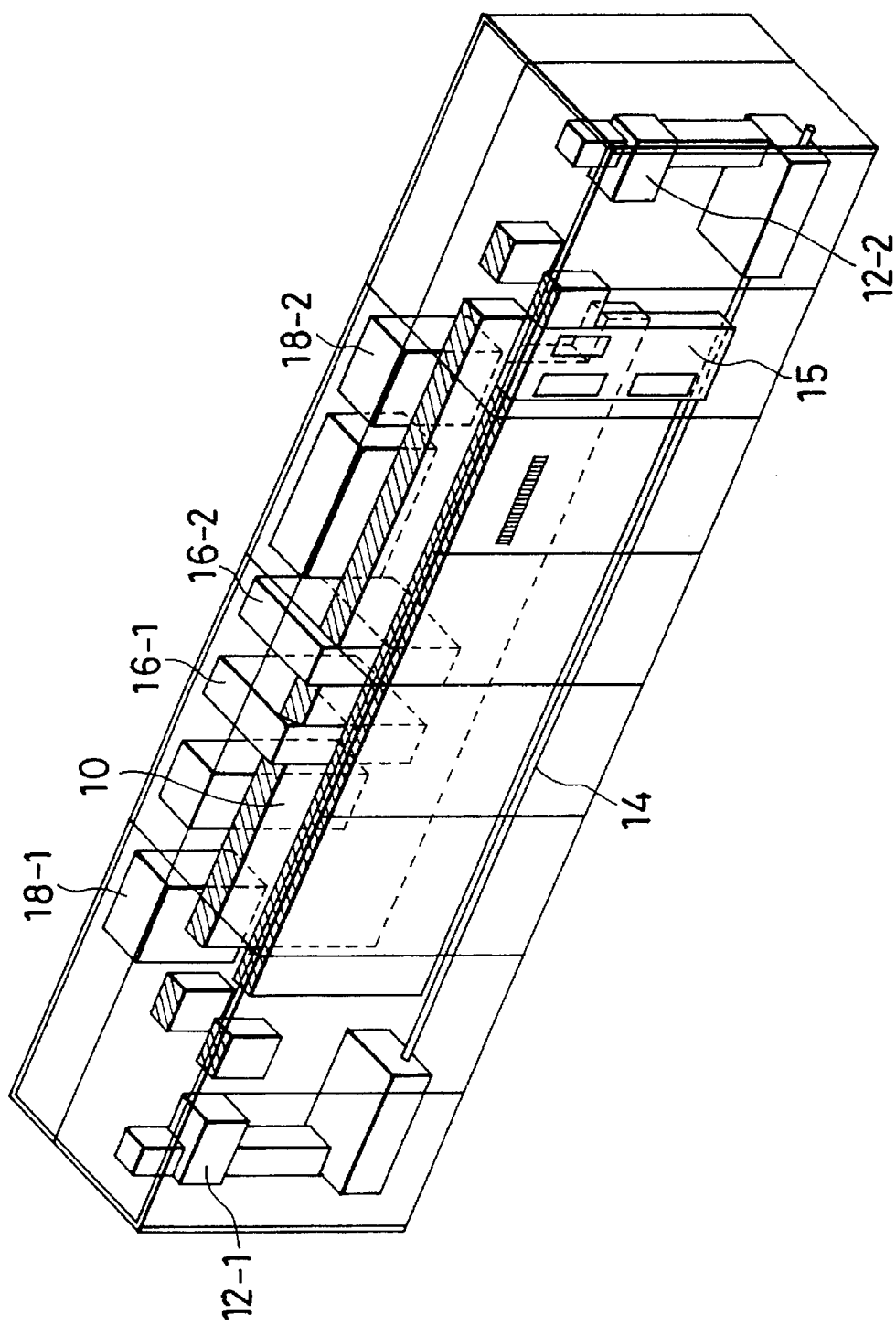
FIG. 6 is an explanatory diagram of a construction of an apparatus of the invention.

FIG. 6 is a perspective view of a whole construction of a library apparatus of the invention. The library apparatus is divided into a plurality of frames and an apparatus can be constructed by combining those frames. A cell block 10 as a medium storage is provided for the library apparatus. A number of medium cartridges having therein recording media such as magnetic tapes, magnetic disks, optical disks, or the like are enclosed in the cell block 10. In the following embodiment, the case where the magnetic tape cartridges are used as recording media will be explained as an example. In the library apparatus, rails 14 are arranged on the right and left sides in a frame and accessors 12-1 and 12-2 which operate as medium conveying robots are movably put on the rails 14. For the cell block 10, deck units 16-1 and 16-2 and control units 18-1 and 18-2 are provided on the opposite side of the cell block 10 so as to sandwich the rails 14. A plurality of magnetic tape units are provided in the deck units 16-1 and 16-2. The cartridges conveyed from the cell block 10 by the accessors 12-1 and 12-2 are loaded and data is read or written. Further, a medium inlet/outlet port 15 is provided at the front surface of the frame of the library apparatus, thereby inserting or ejecting the cartridges.

Figure 1:
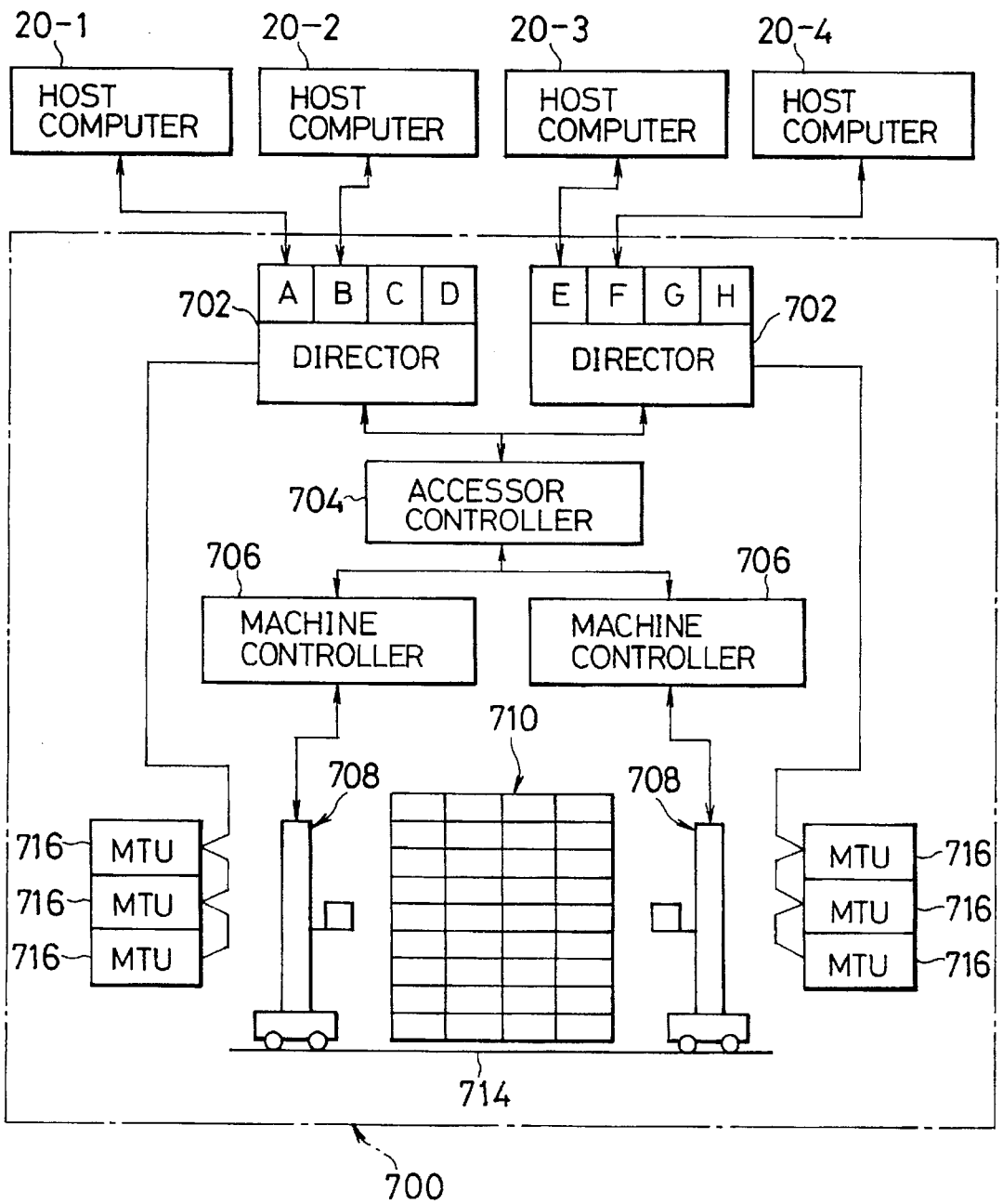
FIG. 1 is a schematic explanatory diagram of a conventional apparatus.
Figure 2:
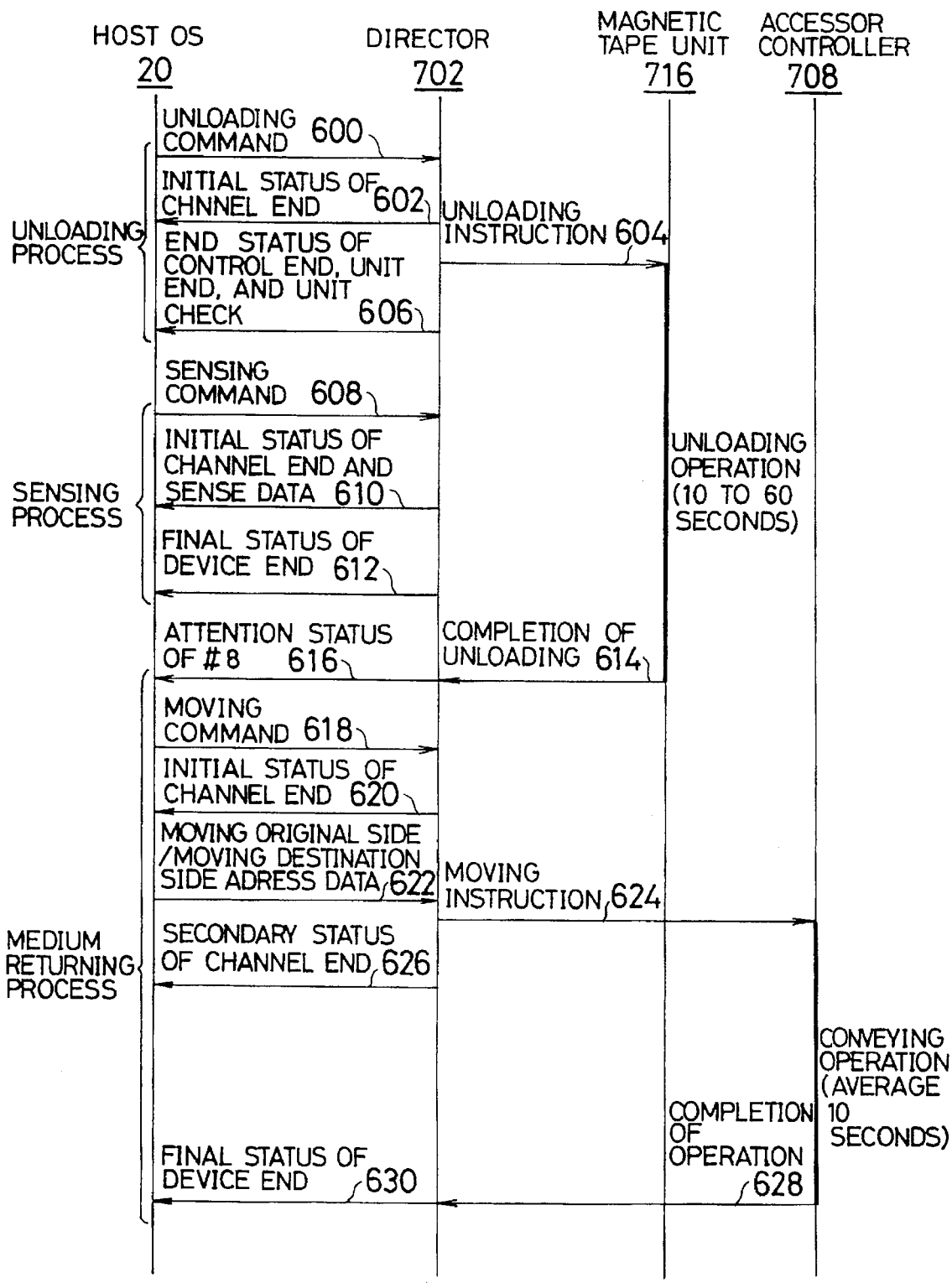
FIG. 2 is a timing chart showing the demounting processing operation of the conventional apparatus.
Figure 3:
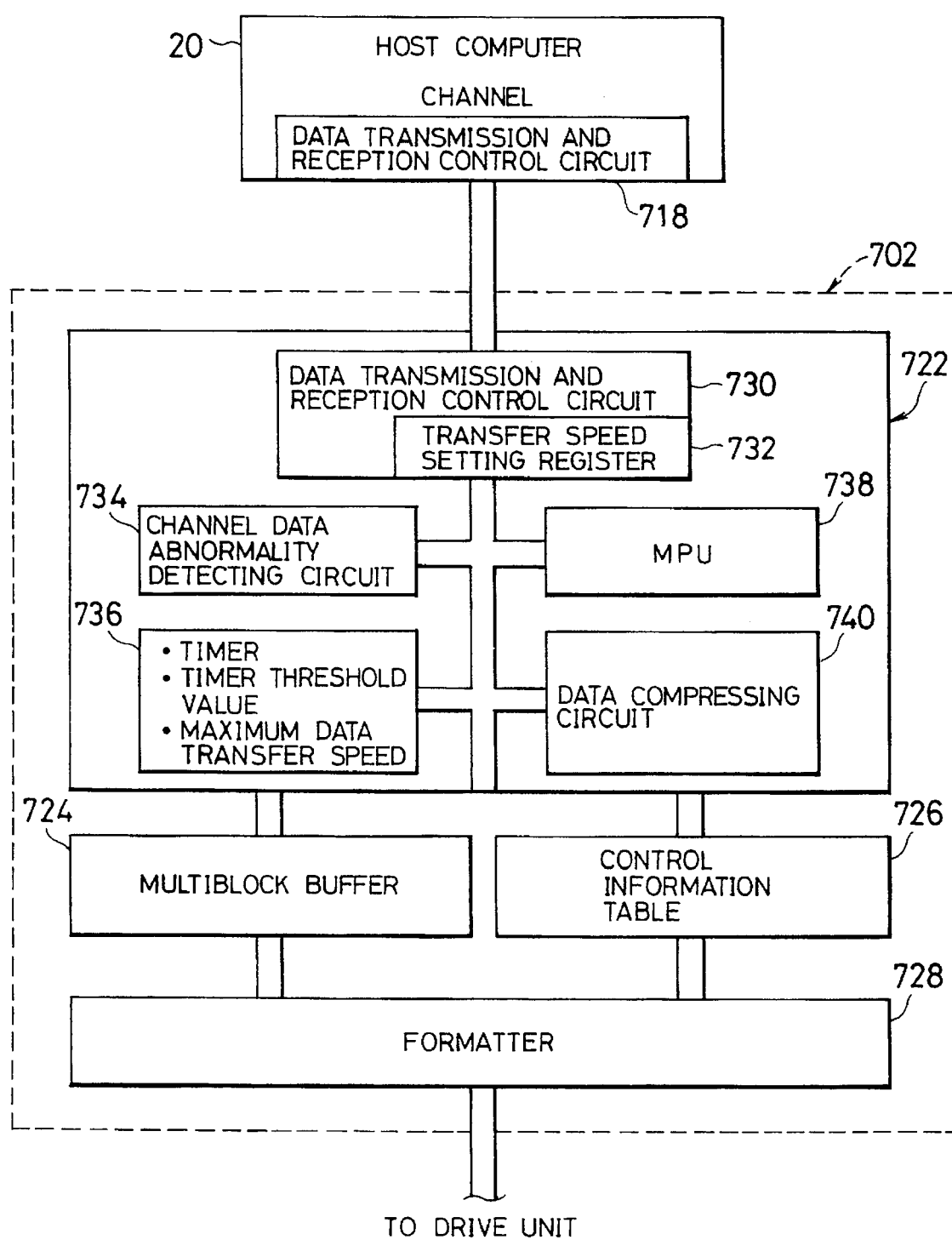
FIG. 3 is a block diagram of a conventional transfer control apparatus.
Figure 4:
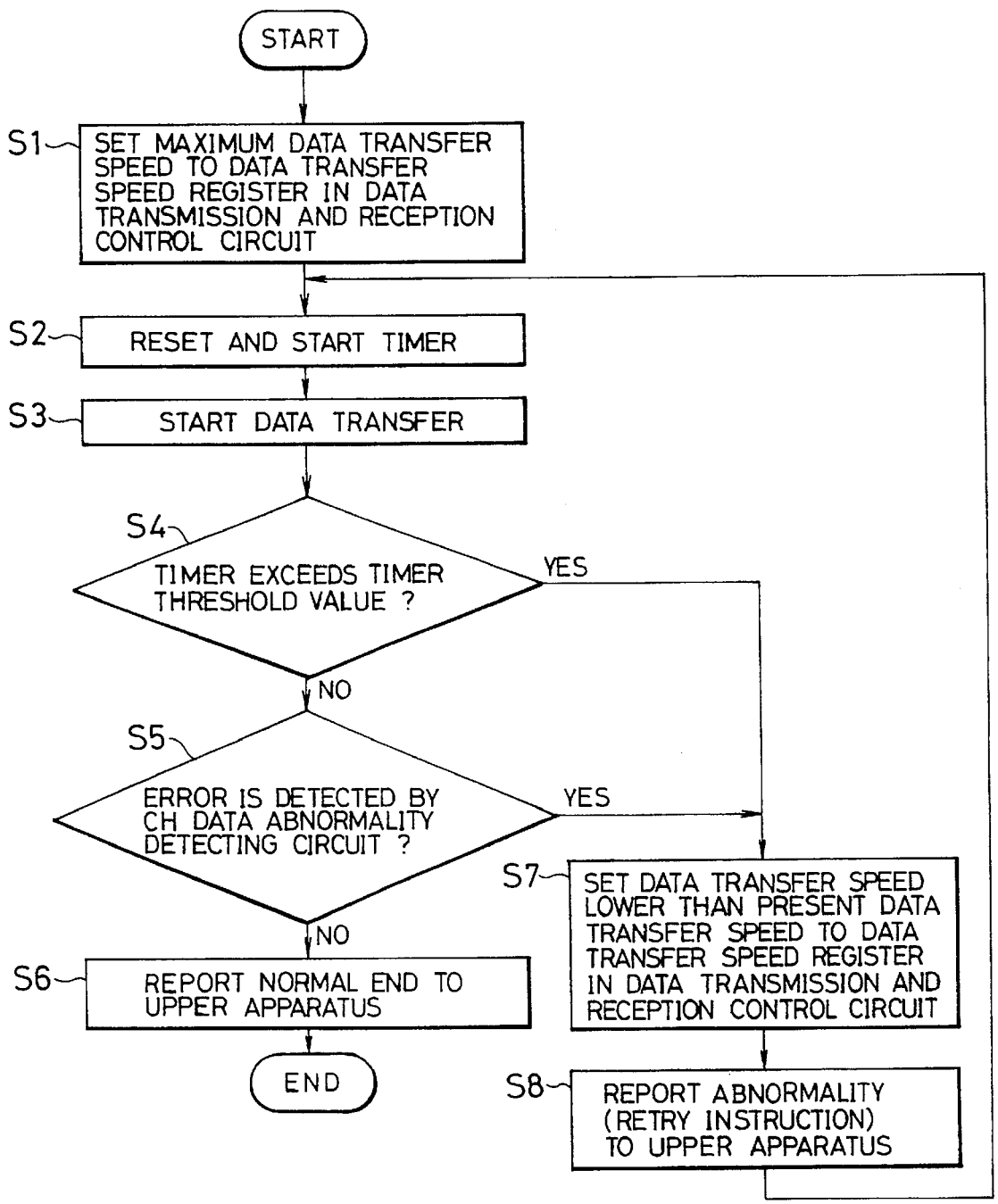
FIG. 4 is a flowchart for a conventional transfer control.
Figure 5:
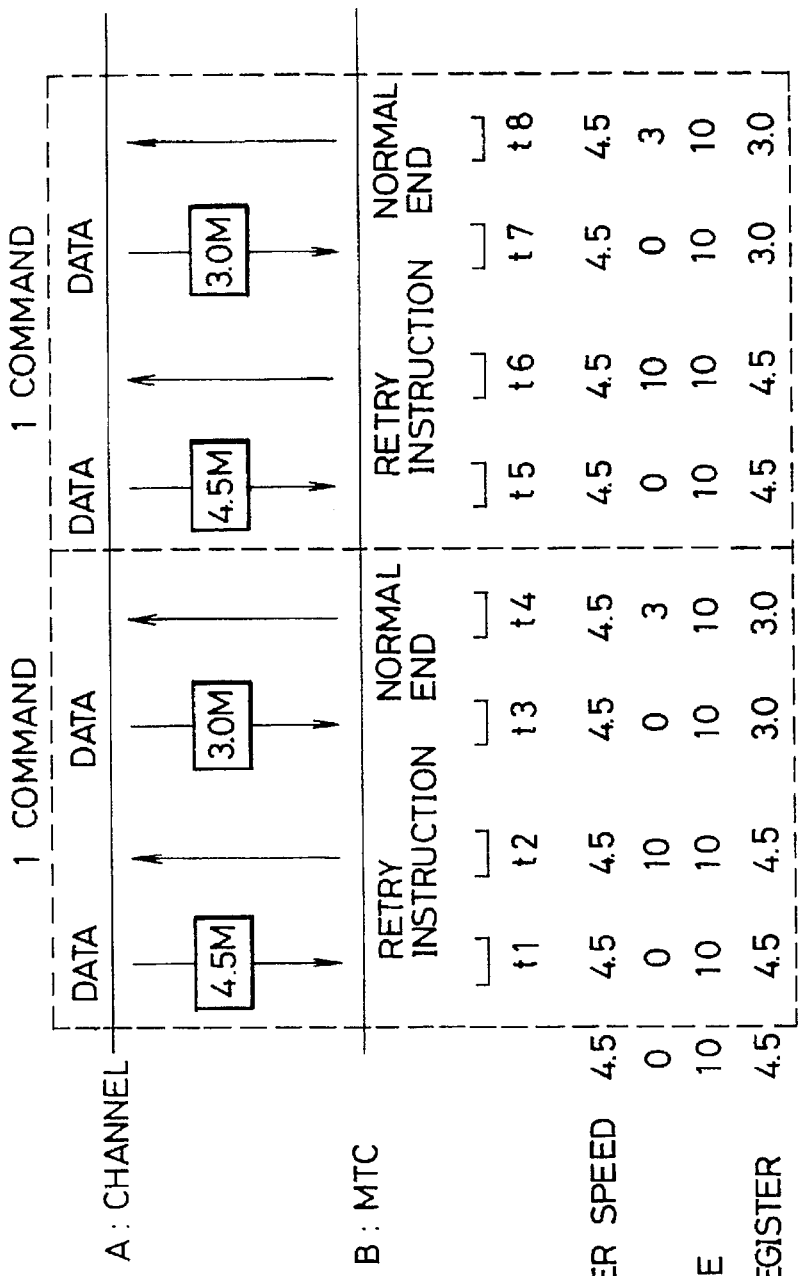
FIG. 5 is a timing chart for the conventional transfer control.
Figure 7:
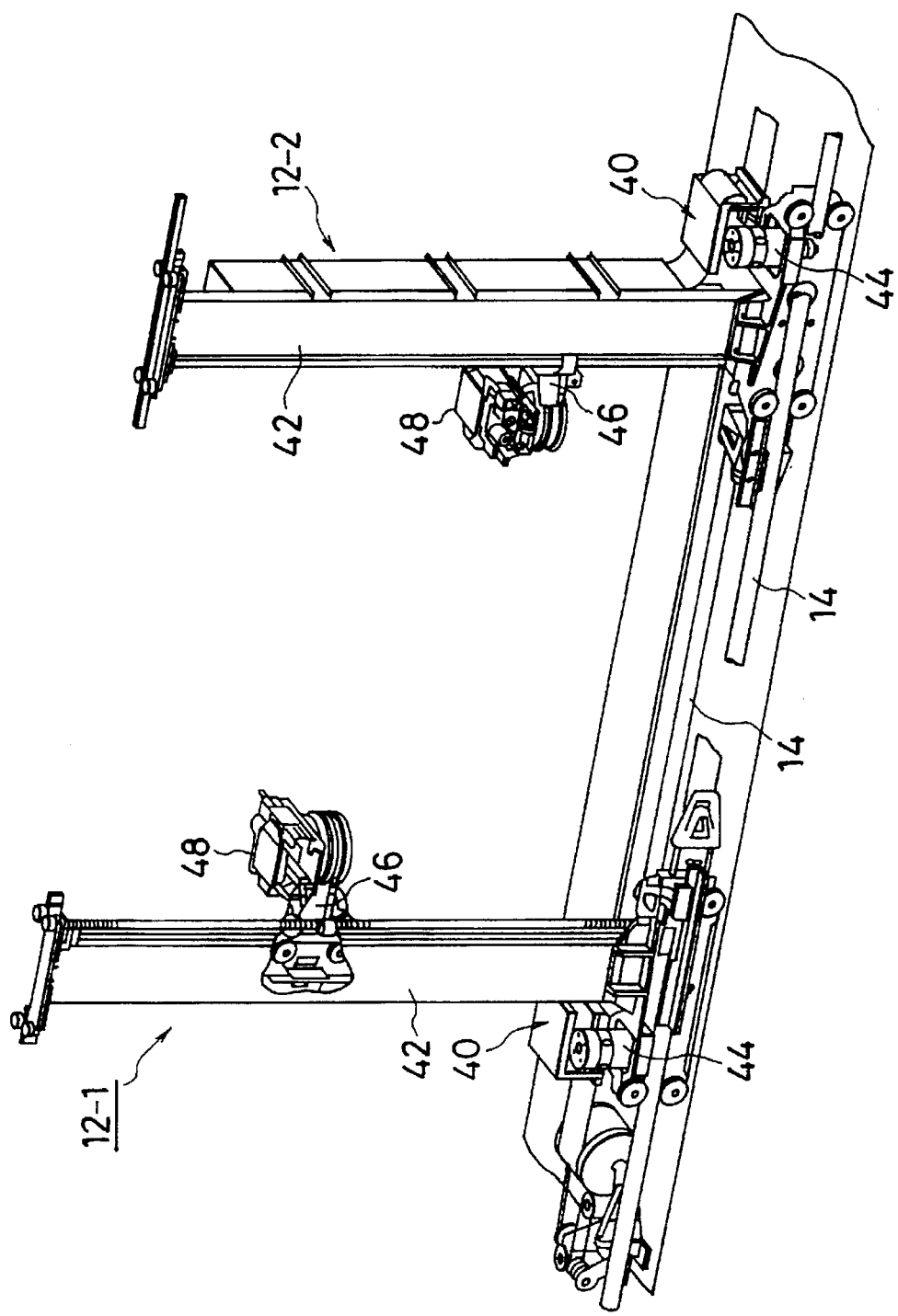
FIG. 7 is an explanatory diagram of an accessor in FIG. 6.
Figure 8:
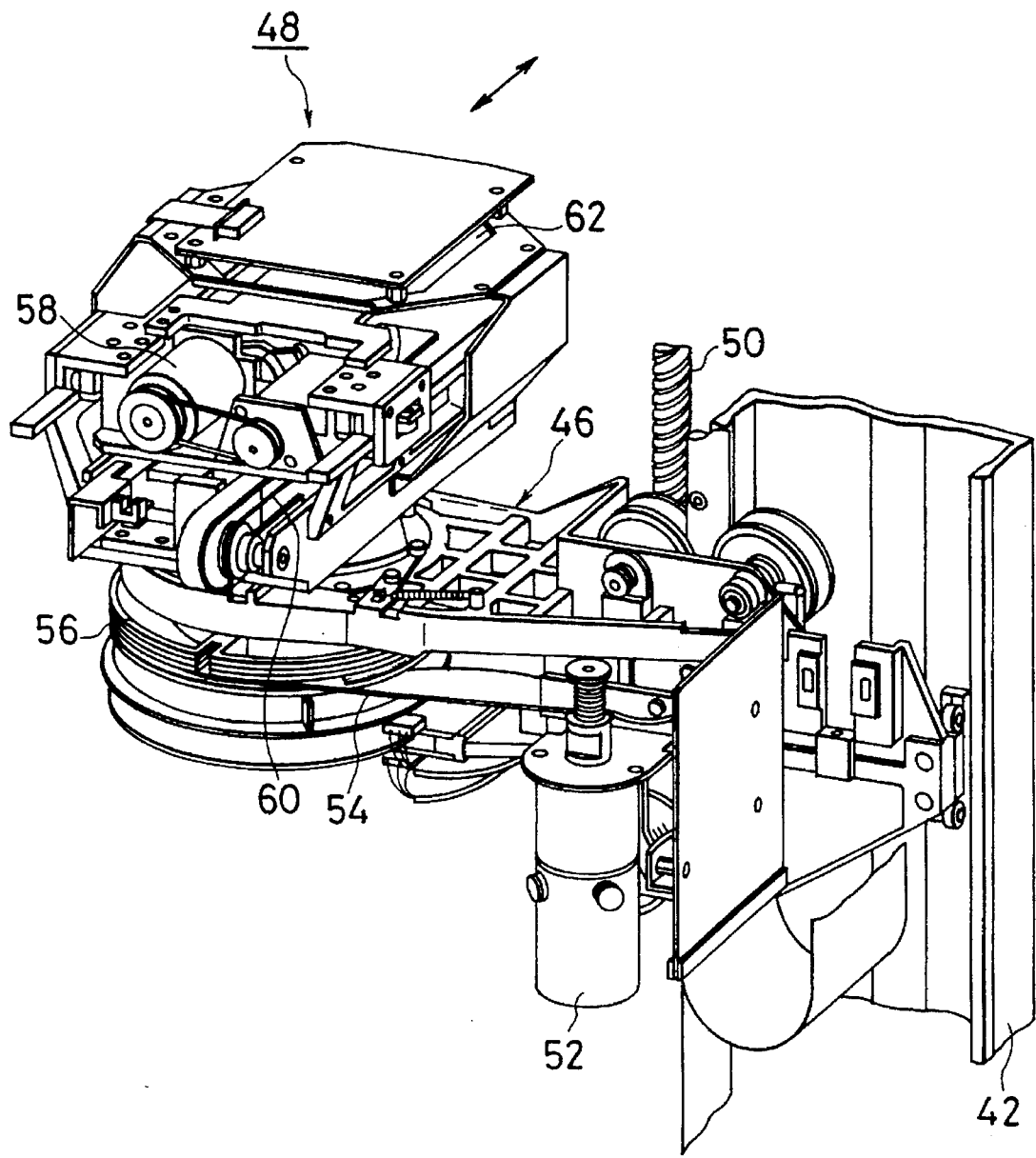
FIG. 8 is an explanatory diagram of a robot hand in FIG. 7.
Figure 9:
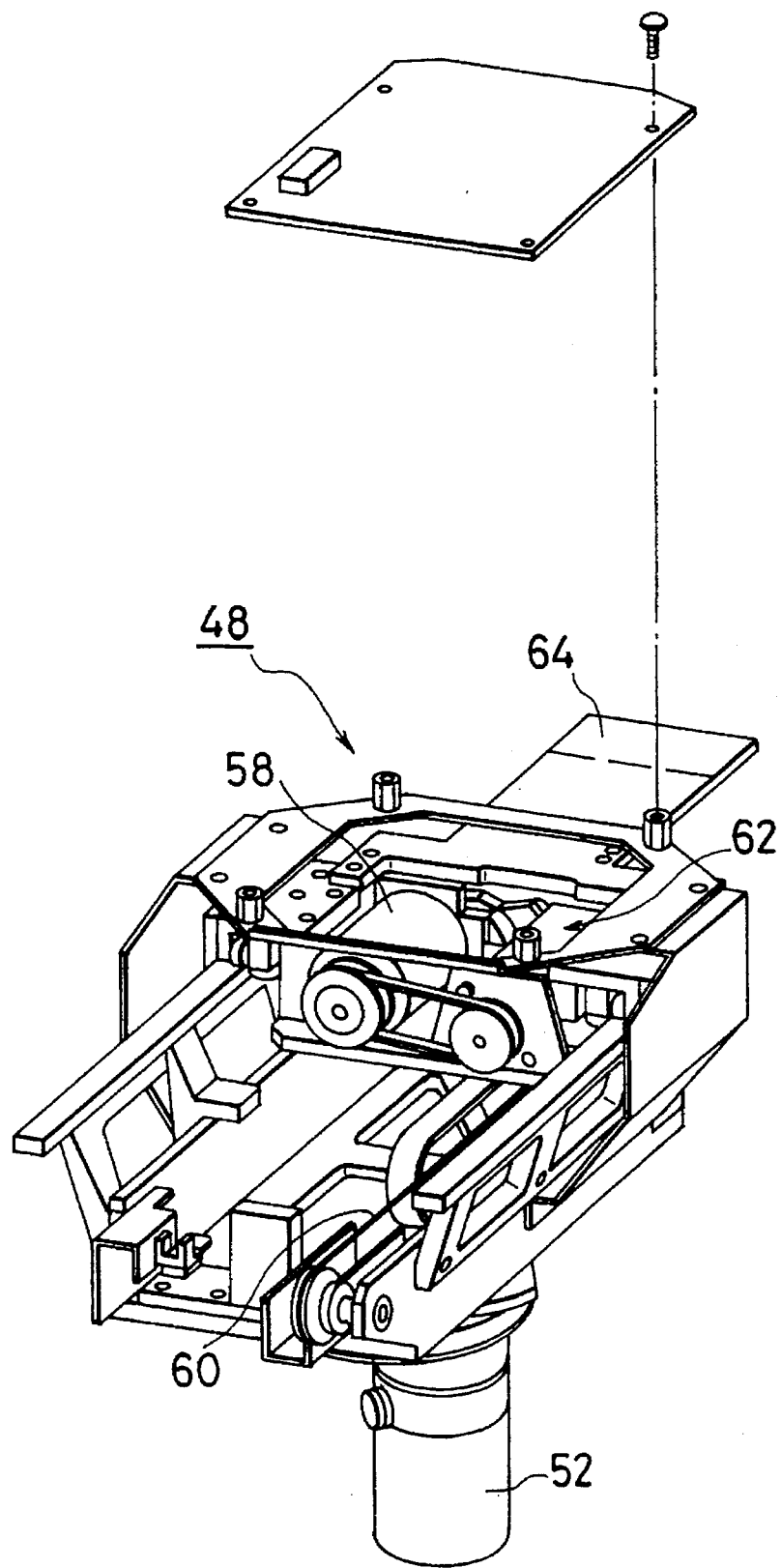
FIG. 9 is an explanatory diagram showing a state in which an upper cover of the robot hand in FIG. 8 is opened.

FIG. 7 shows the accessors in FIG. 3. The accessors 12-1 and 12-2 run the two rails 14 by the driving of motors 44 for running provided in running sections 40. A pillar 42 stands on the running section 40 and a lifting section 46 which is vertically movable is provided along the pillar 42. A robot hand 48 is attached to the lifting section 46. The details of the robot hand 48 are shown in FIGS. 8 and 9. The lifting section 46 on which the robot hand is attached is elevated up or down along the pillar 42 by the rotation of a screw shaft 50. A rotating pulley 56 is provided in the lifting section 46 and propagates the rotation of a motor 52 for rotation by a wire belt 54, thereby rotating the robot hand 48 on a horizontal plane. A medium grasping section 62 having a fixed plate 64 which is seen in a removal state of an upper cover in FIG. 9 is provided in the rotating portion of the robot hand 48. The medium grasping section 62 can be moved horizontally from the position in FIG. 8 to the front position shown in FIG. 9 by the driving of a wire belt 60 by a slide motor 58. In a state in which the medium grasping section 62 was moved out in the horizontal direction, the cartridge enclosed in the cell block or the like can be sandwiched between the fixed plate 64 and a lower movable plate (not shown).

[Hardware and Function of Library Apparatus]

Figure 10:
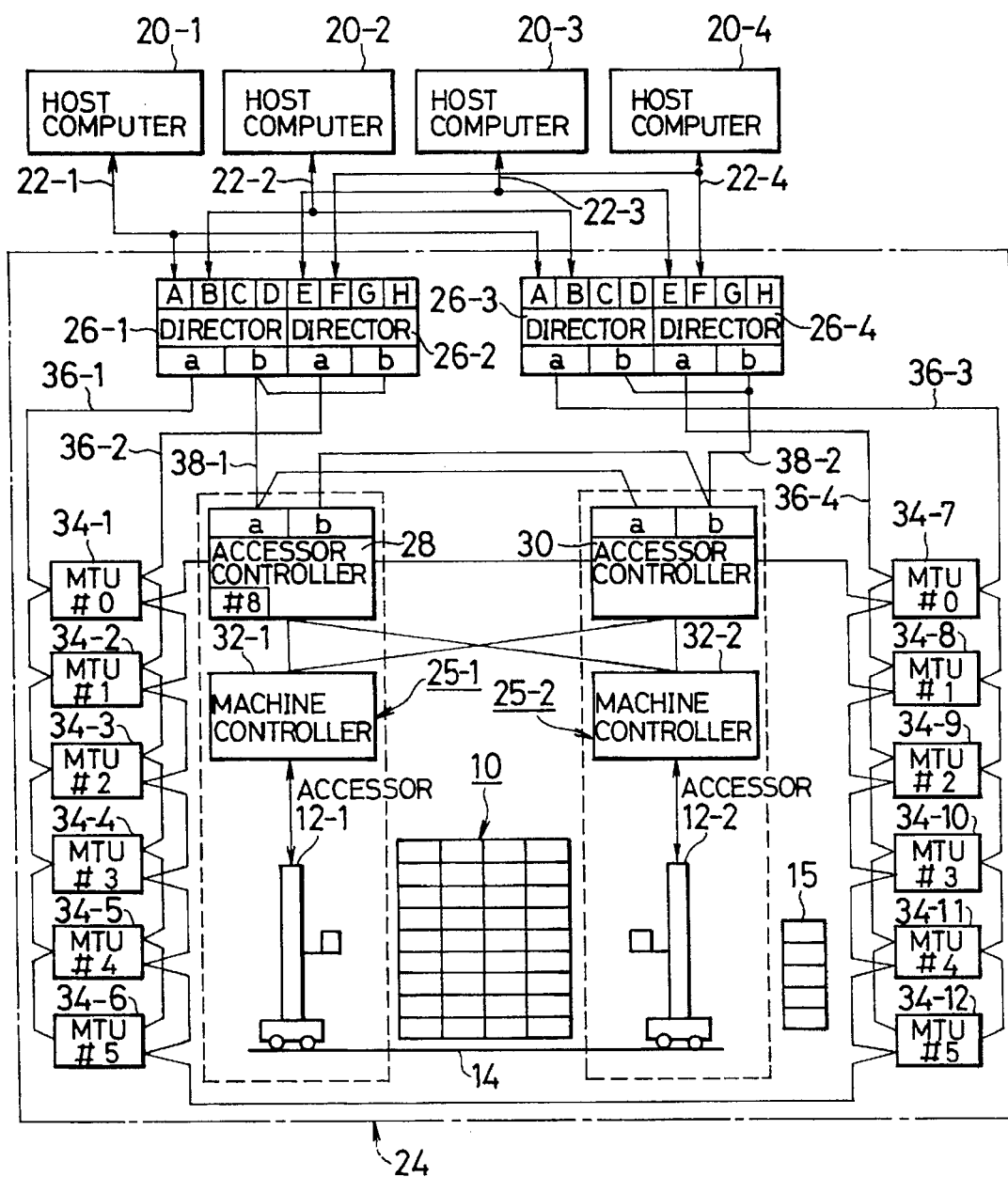
FIG. 10 is a block diagram of a hardware construction of the invention.

FIG. 10 is a block diagram of a system construction of the library apparatus of the invention. For example, four host computers 20-1 to 20-4 are provided as upper apparatuses for a library apparatus 24. The host computers 20-1 to 20-4 are connected to the library apparatus 24 by channel interface buses 22-1 to 22-4, respectively. For example, block multiplexer channel interfaces (BMC interfaces) are used as channel interface buses 22-1 to 22-4.

For example, four directors 26-1 to 26-4 are provided as input/output control units for the library apparatus 24. The directors 26-1 and 26-2 and the directors 26-3 and 26-4 have eight channels (A to H), respectively. The maximum number of channels of each of the directors 26-1 to 26-4 can be set to six channels. The channel interface bus 22-1 from the host computer 20-1 is connected to the channel (A) of each of the directors 26-1 and 26-3, while the channel interface bus 22-2 from the host computer 20-2 is connected to the channel (B). The channel interface bus 22-3 from the host computer 20-3 is connected to the channel E of each of the directors 26-2 and 26-4, while the channel interface bus 22-4 from the host computer 20-4 is connected to the channel F. The channels C and D of the directors 26-1 and 26-3 and the channels G and H of the directors 26-2 and 26-4 are not used in the embodiment.

Two channels (a, b) are provided on the terminal sides of each of the directors 26-1 to 26-4. The channel (a) is used for recording and reproducing. The channel (b) is used for controlling the accessor. The directors 26-1 and 26-2 commonly use six magnetic tape units 34-1 to 34-6 provided on the left side. Device interface buses 36-1 and 36-2 from the channel (a) are connected to the directors 26-1 and 26-2. Therefore, the directors 26-1 and 26-2 can execute a write access or read access to the magnetic tape units 34-1 to 34-6 on the left side by the channel (a). On the side of the host computers 20-1 to 20-4, the logical machine Nos. #0 to #5 have previously been allocated to the six magnetic tape units 34-1 to 34-6. When a command is issued, the logical machine No. is designated.

The directors 26-3 and 26-4 also commonly use six magnetic tape units 34-7 to 34-12 shown on the right side. Device interface buses 36-3 and 36-4 from the channel (a) are connected to the directors 26-3 and 26-4. Therefore, the directors 26-3 and 26-4 execute a write access or read access to the magnetic tape units 34-7 to 34-12 on the right side. In a manner similar to the above, logical machine Nos. #0 to #5 have also previously been allocated to the magnetic tape units 34-7 to 34-12 on the right side. In the actual apparatus, up to eight magnetic tape units can be installed on one side, so that the logical machine Nos. #0 to #7 are allocated in this case, respectively.

A medium conveying mechanism 25-1 is provided under the domination of the directors 26-1 and 26-2. A medium conveying mechanism 25-2 is also provided under the domination of the directors 26-3 and 26-4. The medium conveying mechanism 25-1 is ordinarily used and the medium conveying mechanism 25-2 is used as a spare. The medium conveying mechanism 25-1 which is ordinarily used will now be described. A device interface bus 38-1 led out from the directors 26-1 and 26-2 is connected to the channel (a) of an accessor controller 28. Similarly, a device interface bus 38-2 led out from the directors 26-3 and 26-4 is connected to the channel (b) of an accessor controller 30 on the spare side. The channels (a, b) of the accessor controllers 28 and 30 are commonly connected. The channels (b) of the accessor controllers 28 and 30 are also commonly connected. Therefore, the accessor controllers 28 and 30 receive a command from either one of the directors 26-1 to 26-4 and execute a conveying process. Machine controllers 32-1 and 32-2 to control the accessors 12-1 and 12-2 are provided under the domination of the accessor controllers 28 and 30, respectively. The accessor controllers 28 and 30 and the machine controllers 32-1 and 32-2 are cross connected. The medium conveying mechanism 25-1 which is ordinarily used will now be described hereinbelow and the medium conveying mechanism 25-2 as a spare is omitted.

Each of the host computers 20-1 to 20-4 provided as upper apparatuses of the library apparatus 24 designates the logical machine number address (hereinafter, simply referred to as a machine number address) on the basis of the generation of an input/output request for the library apparatus 24 in association with the execution of a job and executes the conveyance and reading/writing operations of the magnetic tape cartridge. The machine number addresses #0 to #5 are allocated to the magnetic tape units 34-1 to 34-6 and to the magnetic tape units 34-7 to 34-12, respectively. Since up to eight magnetic tape units can be installed on one side, the machine number addresses #0 to #7 are used for the magnetic tape units. On the other hand, the machine number address #8 is set into the medium conveying mechanism 25-1. Specifically speaking, the machine number address #8 is allocated to the accessor controller 28. Cell addresses have previously been defined at the locations where the magnetic tape cartridges exist in the library apparatus 24. FIG. 11 shows the cell addresses allocated to the library apparatus. The cell addresses expressed by hexadecimal notation shown in the diagram have previously been allocated to the accessor hands, medium inlet/outlet port 15, cell block 10, and magnetic tape units 34-1 to 34-12, respectively.

[Command Generating Function of Host Computer]

Figure 12:
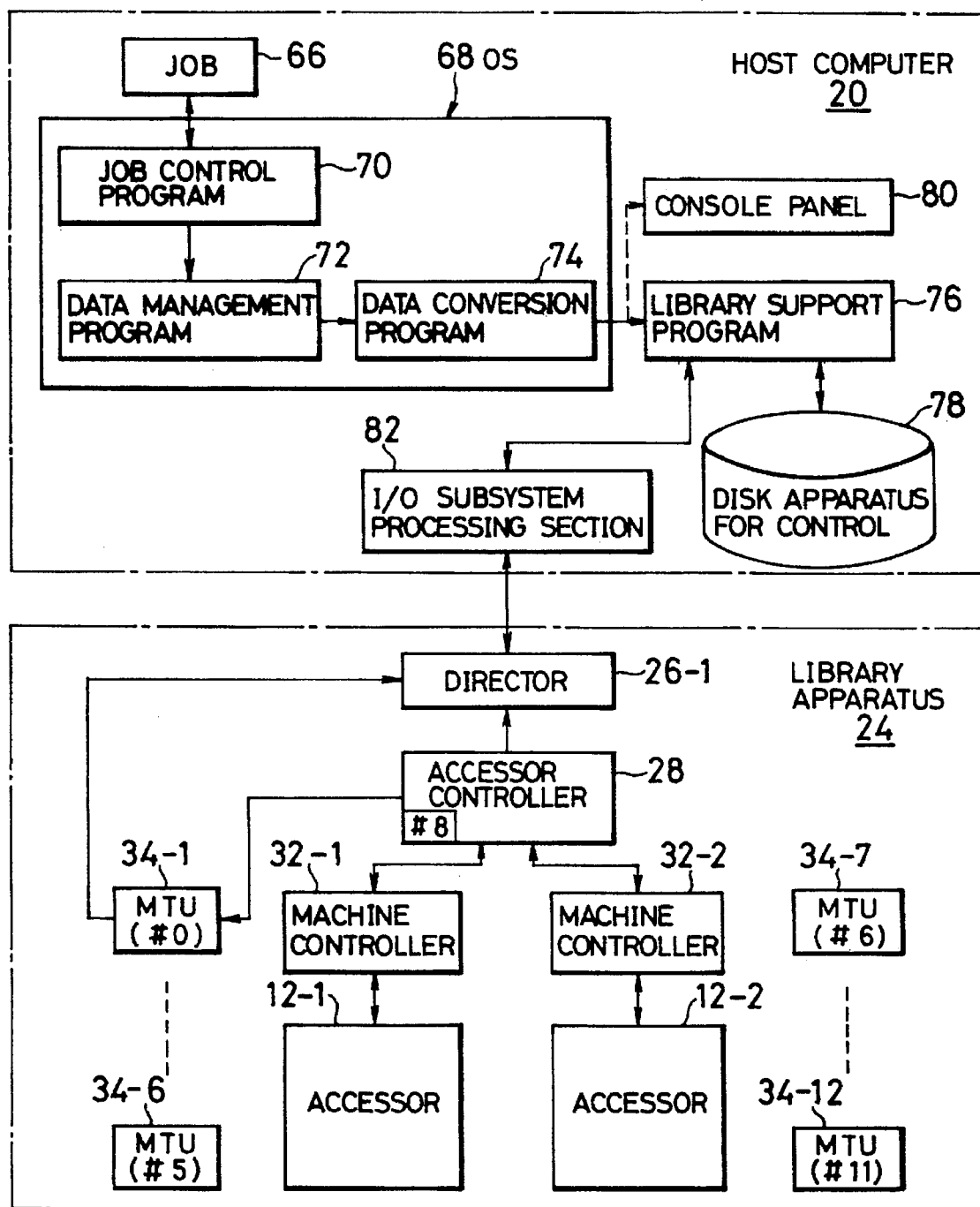
FIG. 12 is a functional block diagram of a host computer of the invention.

FIG. 12 shows a processing function of an input/output command for the library apparatus on the host computer side in FIG. 10. When an arbitrary job 66 is executed by the host computer 20, a job control program 70 of the operating system (hereinafter, referred to as an OS) is activated by the job 66. When an input/output request to the library apparatus 24 is generated in such a state, a read command or a write command is formed by a data management program 72. A library support program 76 which operates as an OS for the library apparatus is accessed through a data conversion program 74.

Since the initial library apparatus was constructed on the assumption of the operation of the operator as a prerequisite, the data conversion program 76 has been converted into a data format so as to display data onto a CRT display provided for a console panel 80. The library support program 76 can accept the conversion data as it is. A request command for the library support program 76 from an OS 68 designates at least the following four items.

I. Kind of read or write command

II. Medium number such as a volume number or the like

III. Sector address

IV. Data block length

A disk apparatus 78 for control is provided for the library support program 76 and control data sets have been stored. The library support program 76 reads the control data set from the control disk apparatus 78, produces medium conveyance information corresponding to the input/output request from the OS 68, and generates a necessary command to the library apparatus 24 through an input/output subsystem processing section 82. Ordinary processes from the host computer 20 to the library apparatus 24 are divided into a mounting process and a demounting process. The mounting process is a process for executing the reading or writing operation after the magnetic tape cartridge in the cell block 10 was conveyed to the magnetic tape unit and loaded. The demounting process is a process for unloading the magnetic tape cartridge from the magnetic tape unit after completion of the reading or writing operation and for conveying the unloaded magnetic tape cartridge to the original cell block. To execute the mounting process, the host computer 20 successively generates a moving command (first moving command) to convey the magnetic tape cartridge from the cell block to the magnetic tape unit, a loading command, and a reading or writing command. In the demounting process, the host computer 20 successively generates an unloading command and a moving command (second moving command) to return the medium to the original position of the cell block. When each command in such mounting and demounting processes is generated, the machine number addresses #i (where, i=0 to 7) of the magnetic tape units 34-1 to 34-12 are designated. The machine number address #8 is designated with respect to the medium conveying command.

The library apparatus 24 in FIG. 12 shows an executing state of the command which designated the machine number address #0 of the magnetic tape unit 34-4. That is, the library support program 76 of the host computer 20 first generates the moving command which designated the machine number address #8. With respect to the moving command, there is generated the movement original side/movement destination side address data in which the cell address of the cell block in which the magnetic tape cartridge as a target for input/output among the cell blocks is set to the movement original side address and the cell address of, for example, the magnetic tape unit 34-1 to mount the magnetic tape cartridge is set to the movement destination side cell address. The accessor controller 28 moves the accessor 12-1 to the position of the cell block that is designated by the movement original side address generated in response to the moving command, picks up the magnetic tape cartridge, conveys the cartridge to the tape inlet port of the magnetic tape unit 34-1 designated by the movement destination address, and inserts the magnetic tape cartridge. After completion of the conveying operation by the accessor 12-1, the host computer 20 generates the loading command which designated the machine number address #0, receives the loading instruction from the director 26-1, and executes the loading of the magnetic tape cartridge conveyed by the magnetic tape unit 34-1.

After the magnetic tape cartridge was loaded, the library support program 76 issues the reading or writing command and reads or writes the data from/to the magnetic tape cartridge in the magnetic tape unit 34-1 in accordance with the reading or writing instruction from the director 26-1.

When the reading or writing operation is finished, the unloading command is issued from the library support program 76 by the designation of the machine number address #0. Therefore, the director 26-1 supplies the unloading instruction to the magnetic tape unit 34-1 that is designated by the machine number address #0. By receiving the unloading instruction, the magnetic tape unit 34-1 first executes the rewriting of the tape of the magnetic tape cartridge and performs the ejecting operation to eject the cartridge to the outside by the completion of the rewriting.

In the library apparatus 24 of the invention, simultaneously with that the unloading is instructed to the magnetic tape unit 34-1 by the receipt of the unloading command from the host computer 20, a special report indicative of the pseudo end of the loading operation is sent to the host computer 20, specifically speaking, an attention status which designated the machine number address #8 to the accessor controller 28 is reported. That is, before the unloading operation is completed on the library apparatus 24 side, the pseudo unloading end report is performed. By receiving such a report, the library support program 76 of the host computer 20 recognizes the completion of the unloading operation and issues the moving command to return the ejected magnetic tape cartridge to the cell block. The moving command issued during the unloading operation of the magnetic tape unit 34-1 is held in the director 26-1. When the actual unloading completion report is received from the magnetic tape unit 34-1, the command data is supplied to the accessor controller 28 and the conveying operation to return the magnetic tape cartridge to the cell block 10 is started by the accessor 12-1.

[Mounting/Demounting Process]

Figure 13:
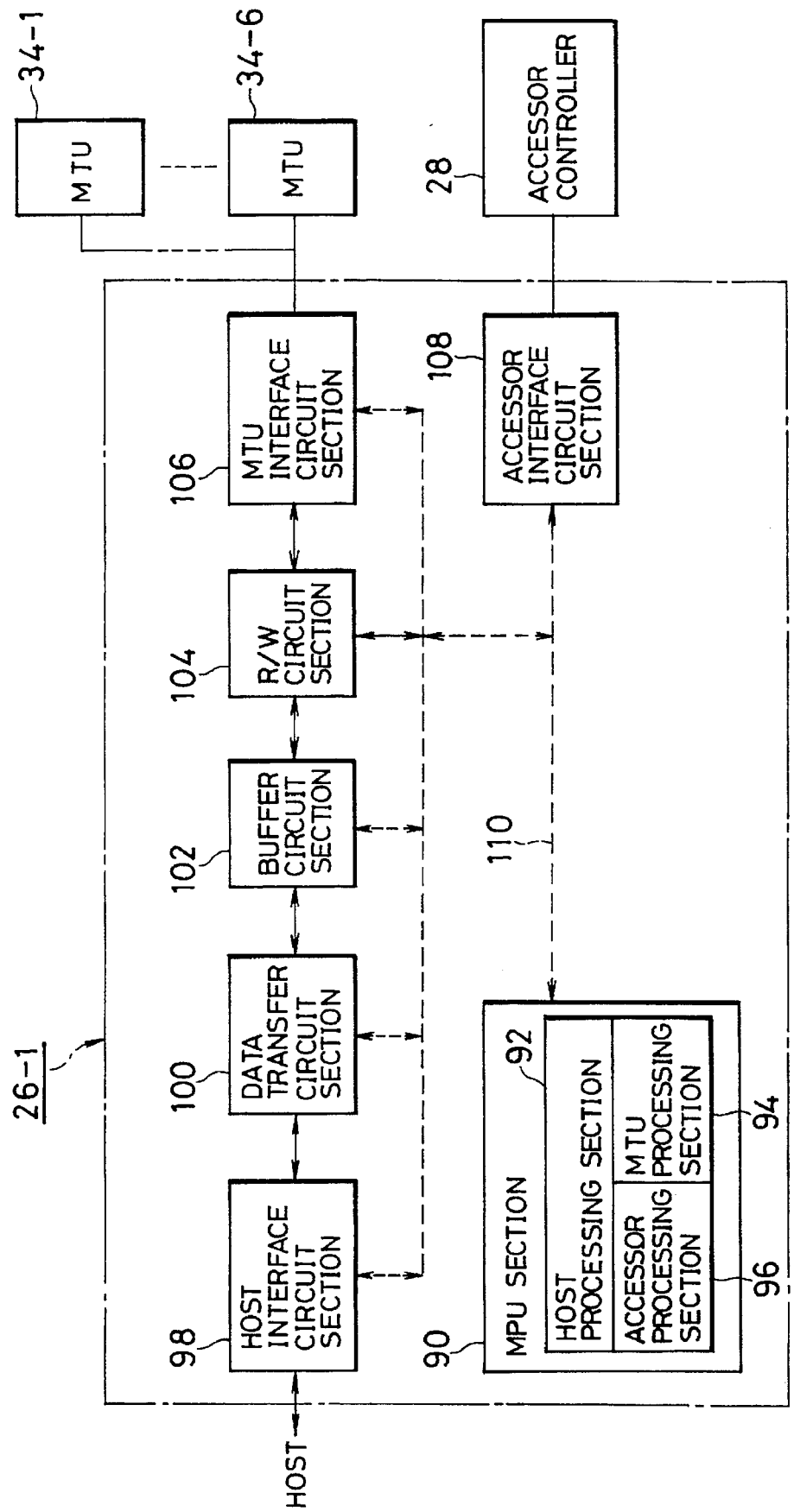
FIG. 13 is a block diagram of a director in FIG. 12.

FIG. 13 shows an embodiment of the director 26-1 shown as a representative in the library apparatus 24 in FIG. 12. An MPU section 90 is provided for the director 26-1. The MPU section 90 has a host processing section 92, an MTU processing section 94, and an accessor processing section 96 which are realized by program controls. The director 26-1 is provided with: a host interface circuit section 98; a data transfer circuit section 100; a buffer circuit section 102; a read/write circuit section 104; an MTU interface circuit section 106; and an accessor interface circuit section 108. Those circuit sections are connected by a data bus shown by solid lines. Those circuit sections are connected to the MPU 90 by a control bus 110 shown by a broken line. Each circuit section operates under control of the MPU 90.

Figure 14:
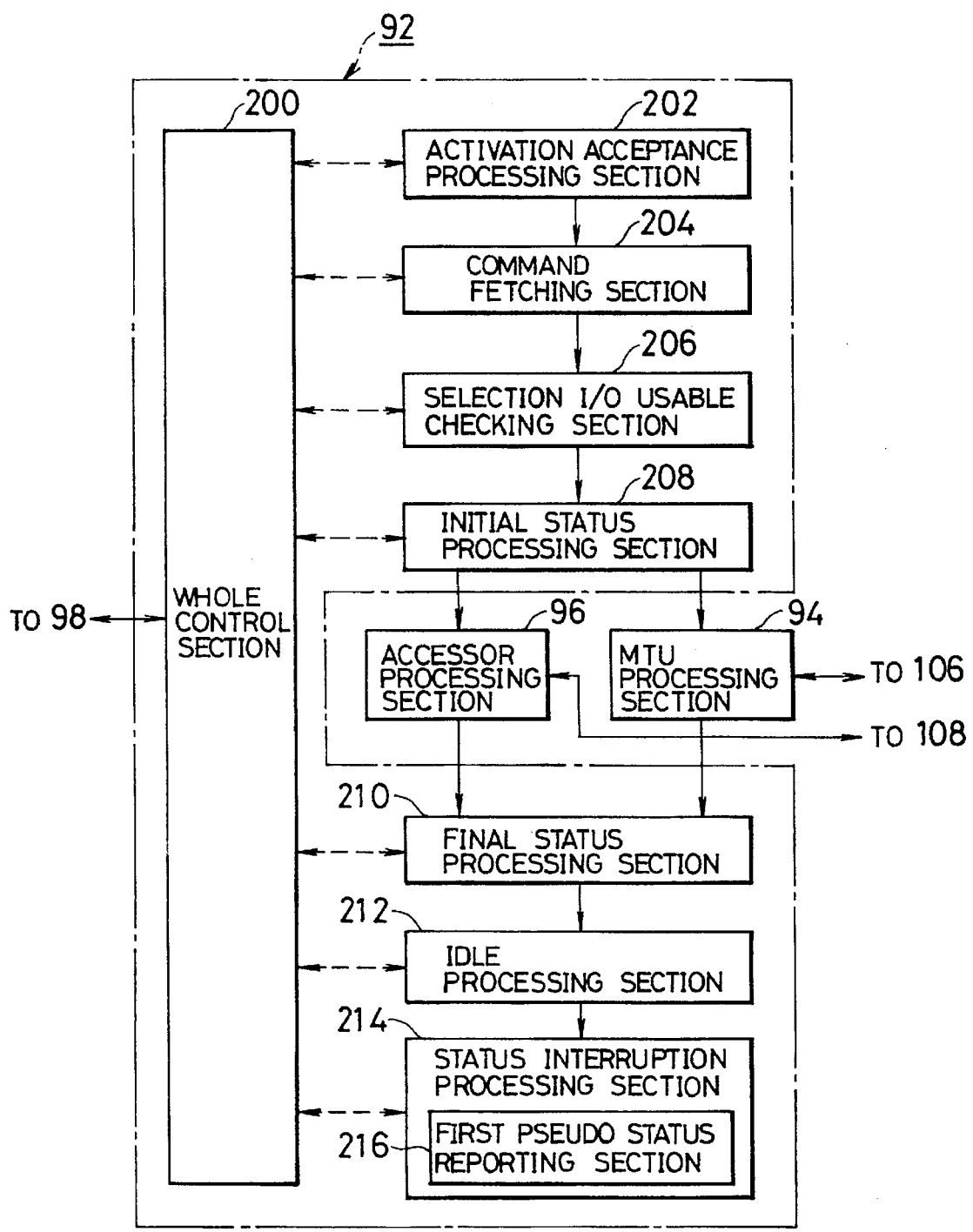
FIG. 14 is a functional block diagram of an MPU section in FIG. 13.

FIG. 14 is a functional block diagram of the host processing section 92 provided in the MPU section 90 in FIG. 13. The host processing section 92 comprises: a whole control section 200; an activation acceptance processing section 202; a command fetching section 204; a selection I/O usable checking section 206; an initial status processing section 208; a final status processing section 210; an idle processing section 212; and a status interruption processing section 214.

The activation acceptance processing section 202 accepts an activation request from the host computer 20 and activates the processes after the command fetching section 204. The command fetching section 204 fetches the command issued from the host computer and decodes. The selection I/O usable checking section 206 discriminates whether the input/output apparatuses which are designated by the machine number address #i designated by the command analyzed by the command fetching section 204, specifically speaking, the magnetic tape unit and the accessor controller are in the usable state or not. When they are usable, the processing routine advances to the initial status processing section 208. Since there are usable input/output apparatuses, the initial status processing section 208 reports the normal reception of the command to the host computer 20. When the selection I/O usable checking section 206 judges that the input/output apparatuses designated by the machine number address are in the unusable state, a bury response is returned to the host computer. After the busy response was returned, when the corresponding input/output apparatuses are returned to the usable state, a busy cancellation response is issued to the host computer, thereby promoting to again Generate the command. When the normal reception of the command is reported to the host computer by the initial status processing section 208, the processing routine advances to the MTU processing section 94 or accessor processing section 96. Namely, in case of the loading command, reading command, writing command, and unloading command, the processing routine advances to the MUM processing section 94. On the other hand, in case of the moving command, the processing routine advances to the accessor processing section 96. Upon execution of the process of the accessor processing section 96, the address data of the movement original side address and movement destination side address derived as command data is handed.

The MUM processing section 94 and accessor processing section 96 execute the instructions based on the respective commands for the magnetic tape unit and accessor controller. When the operating instruction to the magnetic tape unit by the MTU processing section 94 and the operating instruction to the accessor controller by the accessor processing section 96 are finished, the processing routine advances to the final status processing section 210.

When the instructing operations to the input/output apparatuses are normally finished, the final status processing section 210 reports the final status for allowing the host computer 20 to recognize the device end. After the final status processing section 210 reported the status to the host computer, a series of commands are set to the device end and the processing routine advances to the idle processing section 212. The idle processing section 212 exits from the processing routine in response to either one of the activation request from the host computer and the interruption request from the input/output apparatus side and gives the processing routine to the activation acceptance processing section 202 or status interruption processing section 214.

The status interruption processing section 214 executes the operating instruction to the magnetic tape unit by the MTU processing section 94 or the operating instruction to the accessor controller side by the accessor processing section 96, respectively, and disconnects them. After that, the status interruption processing section 214 receives an operation end report as an interruption activation request which is obtained from the magnetic tape unit or accessor controller side and operates and performs a necessary status report to the host computer 20. A first pseudo status reporting section 216 is newly provided for the status interruption processing section 214. When the unloading instruction based on the unloading command from the host computer is executed by the MTU processing section 94, the first pseudo status reporting section 216 executes a status report indicative of the pseudo completion of the unloading to the host computer without waiting for the actual unloading completion report. As a status indicative of the pseudo unloading completion by the first pseudo status reporting section 216, the attention status which designated the machine number address #8 of the accessor controller 28 is used.

By receiving the report of the attention status indicative of the pseudo unloading operation completion from the first pseudo status reporting section 216, the host computer 20 judges that the unloading operation has already been completed, so that the moving command to return the unloaded magnetic tape cartridge to the lower position of the cell block is issued. Therefore, in the library apparatus of the invention having the first pseudo status reporting section 216 in FIG. 14, the movement of the accessor by the moving command in which the magnetic tape unit during the unloading operation is set to the movement original side address is started in parallel during the unloading operation.

Figure 15:
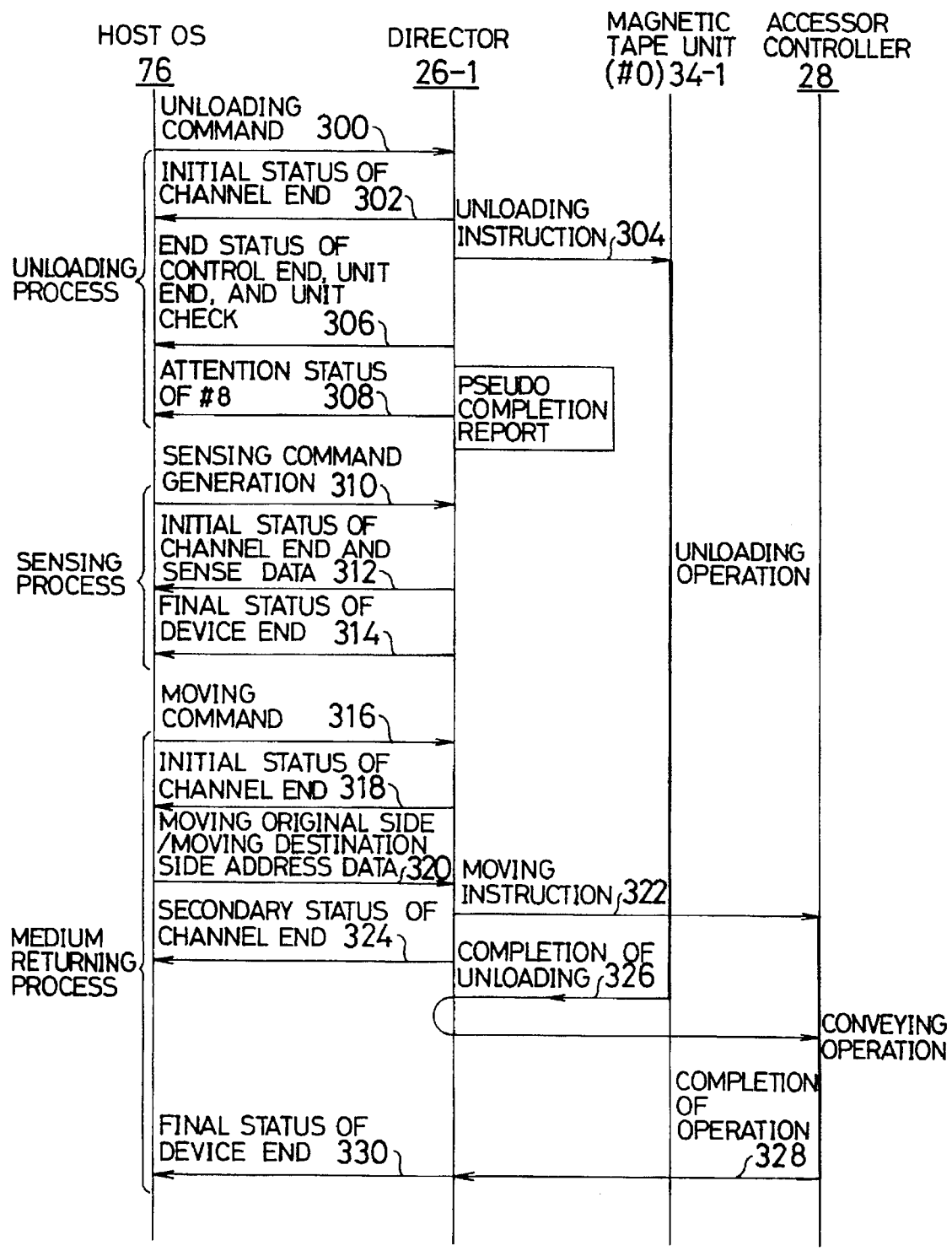
FIG. 15 is a timing chart of the first embodiment showing the demounting processing operation of the invention.

A timing chart of FIG. 15 shows the details of the demounting process in the case where the host processing section 92 in FIG. 14 is provided for the director 26-1. The demounting process will be explained with respect to the case of executing the demounting process after completion of the reading or writing operation in the magnetic tape unit 34-1 having the machine number address #0 as an example.

First, the library support program 76 (hereinafter, referred to as a host OS) issues an unloading command 300 which designated the machine number address #0 of the magnetic tape unit 34-1 to the director 26-1. When the director 26-1 normally receives the unloading command 300, an initial status 302 of "00" is reported and a channel end is set. By receiving the unloading command 300, the director 26-1 executes an unloading instruction 304 to the magnetic tape unit 34 that is designated by the machine number address #0. Thus, the magnetic tape unit 34-1 starts the unloading operation. In the unloading operation, the magnetic tape is first rewound and the cartridge is ejected out by completion of the rewinding.

The director 26-1 gives the unloading instruction 304 to the magnetic tape unit 34-1 and also reports the control end, unit end, and unit check to the host OS 76 as an end status 306. Further, simultaneously with the unloading instruction 304, an attention status 308 which designated the machine number address #8 of the accessor controller 28 is falsely generated and the completion of the unloading operation is falsely reported to the host OS 76. By receiving the attention status 308 of #8, the host OS 76 can recognize the completion of the unloading of the magnetic tape unit 34-1.

Subsequently, a generating process of the sensing command is performed. In the generating process of the sensing command, the host OS 76 first generates a sensing command 310 and reports an initial status of "00" and sense data 312 of a predetermined number of bytes from the director 26-1 as a normal command reception. After that, a final status 314 for the device end is reported. The sensing process is executed at every predetermined period in the free time of the command generation.

Subsequently, as a recognition result of the pseudo unloading completion report based on the report of the attention status 308 of #8 from the director 26-1, a moving command 316 which designated the machine number address #8 of the accessor controller 28 to return the unloaded magnetic tape cartridge to the original position of the cell block is generated from the host OS 76. In this instance, when the accessor 12-1 which is controlled by the accessor controller 28 is in a vacant state, an initial status 318 of the channel end indicative of the normal reception of the command is returned. In response to the initial status 318, the host OS 76 issues movement original side/movement destination side address data 320 to the director 26-1. The director 26-1 Gives a moving instruction 322 to the accessor controller 28 on the basis of the movement original side address and movement destination side address as command data generated in association with the moving command 316. By the moving instruction 322, the accessor controller 28 starts the conveying operation to move the accessor 12-1 to the cartridge ejecting position of the magnetic tape unit 34-1 during the unloading operation designated by the movement original side address. In this instance, the unloading operation of the magnetic tape unit 34-1 and the conveying operation of the accessor 12-1 by the accessor controller 28 are simultaneously executed in parallel.

When the magnetic tape cartridge is ejected out after completion of the tape rewinding in the magnetic tape unit 34-1, a completion of the unloading operation 326 is reported to the director 26-1. At this time, when the movement has already been finished before the magnetic tape unit 34-1 and the accessor is in a waiting state in which the medium is taken out by the robot hand, the report of the unloading completion 326 via the director 26-1 is informed to the accessor controller 28. Therefore, the magnetic tape cartridge is picked up by the robot hand of the accessor 12-1. After that, the magnetic tape cartridge is conveyed and returned to the position of the cell block designated by the movement destination side address.

After completion of the conveying operation of the accessor 12-1 by the accessor controller 28, an operation completion 328 is reported to the director 26-1. In response to such a report, the director 26-1 reports a final status 330 of the device end to normally finish the moving command 316 to the host OS 76. A series of demounting processes are finished.

Figure 16:
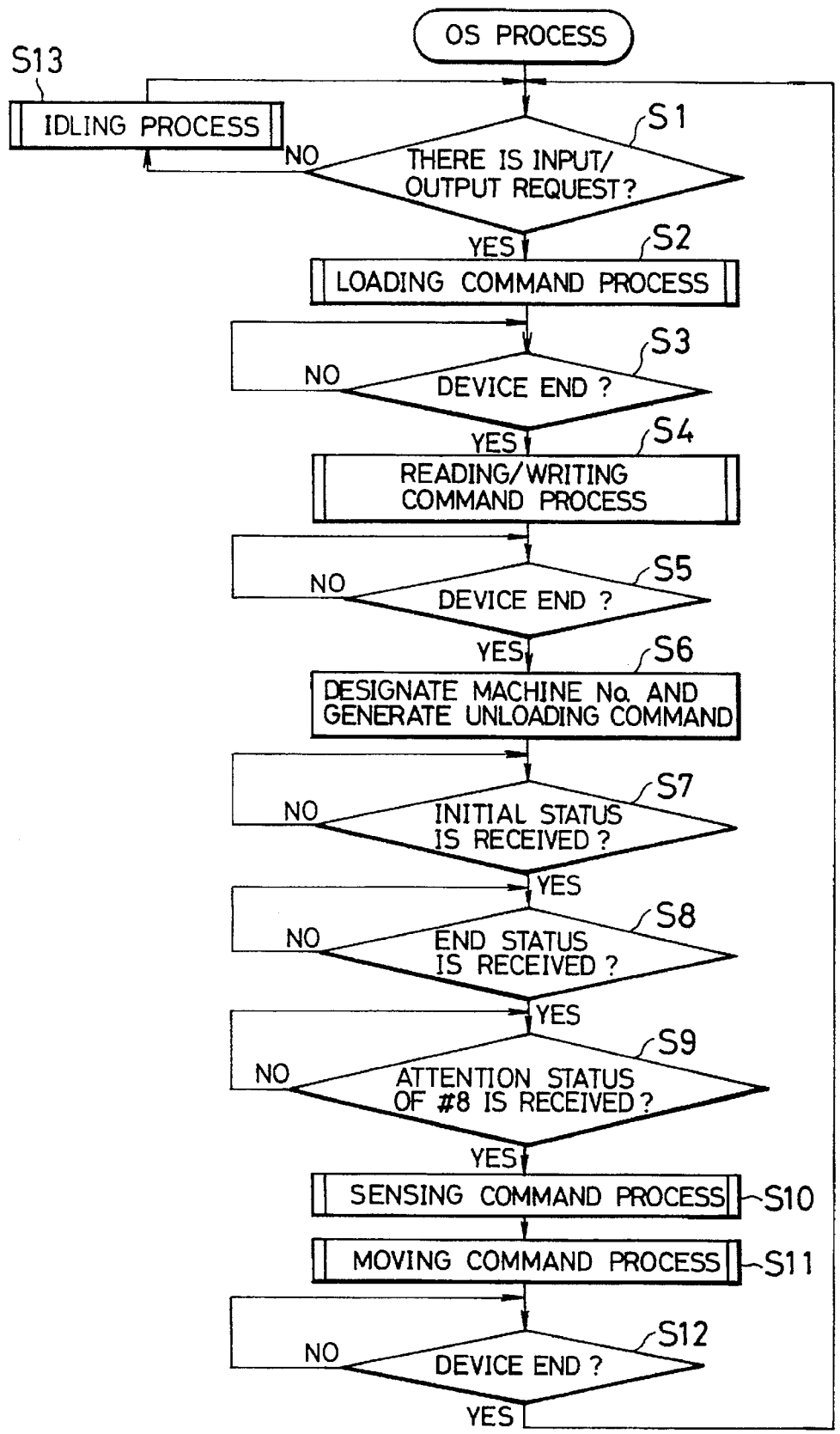
FIG. 16 is a flowchart for the processing operation of a library support program in FIG. 12.

A flowchart of FIG. 16 relates to a series of processing operations for executing the mounting and demounting processes for the library apparatus in the library support program of the host computer 20 in FIG. 9. First, in step S1, a check is made to see if there is an input/output request from the upper OS or not. If NO, the processing routine advances to an idling process in step S13. When there is an input/output request from the upper OS, step S2 follows and a loading command process is first executed. That is, a moving command in which the cell address of the medium as an input/output target obtained from the control data set is set to the movement original side address and the cell address of the specific magnetic tape unit is set to the movement destination side address is issued to the library apparatus. By the process based on such a moving command, when the status report as a device end is obtained from the library apparatus side in step S3, the processing routine advances to a reading/writing command process in step S4. For such a reading/writing command process, when the device end is obtained in step S5 by the status report indicative of the normal end from the library apparatus side, step S6 follows. The unloading command which designated the machine number address of the magnetic tape unit after completion of the reading or writing operation is issued. In response to the generation of the unloading command, in step S7, when the reception of the initial status indicative of the normal command reception is judged from the library apparatus, step S8 follows. The end status is received. When the end status can be normally received, step S9 follows and the apparatus waits for the reception of the attention status which designated the machine number address #8 as a pseudo completion report of the unloading operation.

When the attention status is received, the generating process of the sensing command is executed in step S10. After that, a moving command process by the generation of the moving command in which the cell address of the magnetic tape unit after completion of the unloading operation is set to the movement original side address and the original storing position of the cell block is set to the movement destination side address is executed in step S11. In response to the moving command process, when the device end is obtained from the library apparatus in step S12, it is regarded that the moving command is normally finished. The processing routine is returned to step S1.

Figure 17:
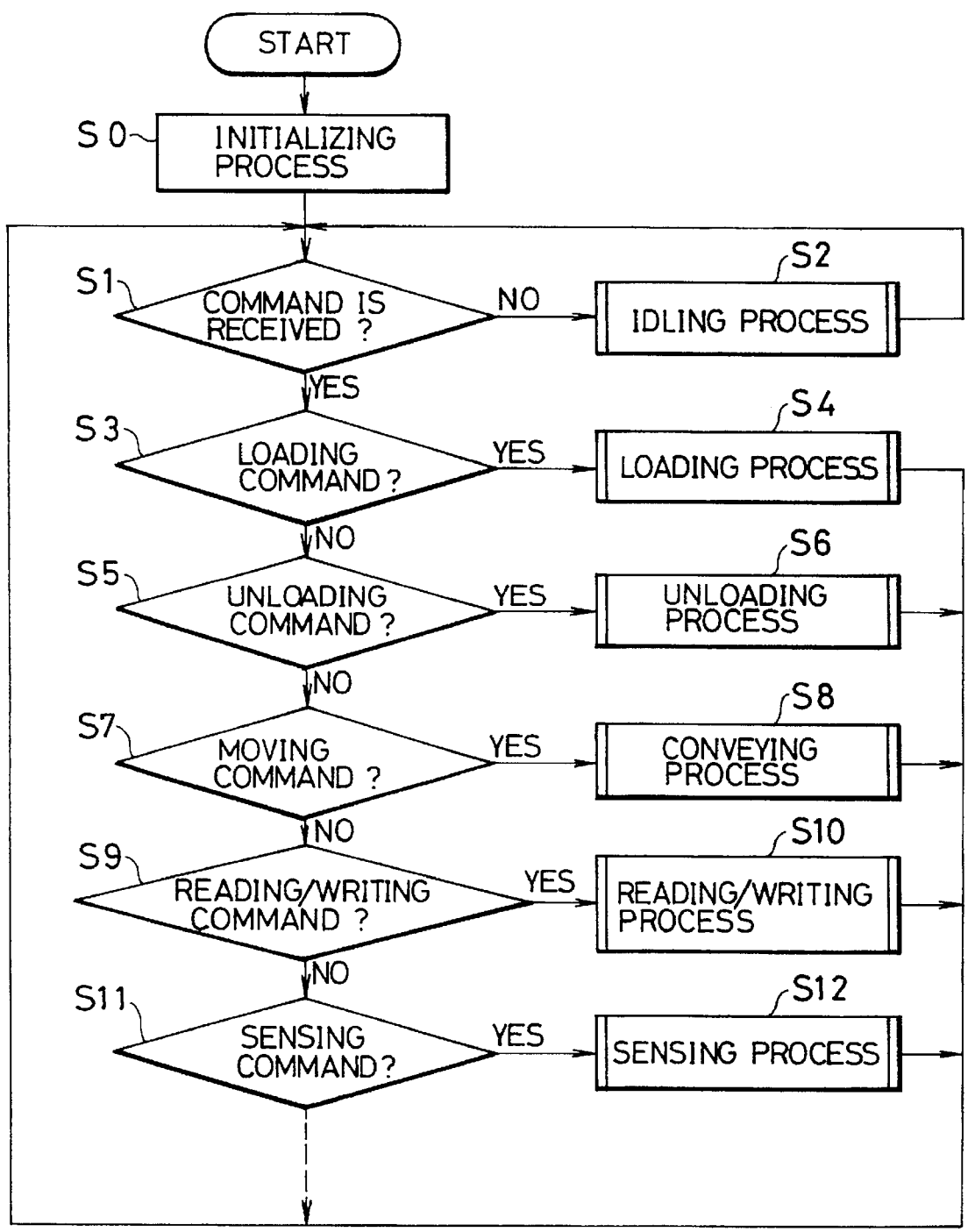
FIG. 17 is a flowchart showing a main routine of a director in FIG. 12.

A flowchart of FIG. 17 relates to an overall processing operation of the director 26-1 in FIGS. 12 and 13. When the library apparatus is activated, first in step S0, an initializing process is executed. In step S1, a check is made to see if a command from the host computer has been received or not. If no command is received, an idling process in step S2 is repeated. When the command is received in step S1, a check is made in step S3 to see if the command is a loading command or not. If YES, a loading process to load the magnetic tape cartridge into the magnetic tape unit designated by the machine number address is executed in step S4. When the received command is an unloading command in step S5, an unloading process in step S6 is executed. In step S7, when the received command is a moving command, step S8 follows and a conveying process of the medium by the accessor is performed. In step S9, when the received command is a reading command or a writing command, step S10 follows and a reading or writing process is executed. Further, in step S11, when the received command is a sensing command, a sensing process is executed in step S12. When the received command is a command other than the above commands, a process corresponding to such a command is executed.

Figure 18:
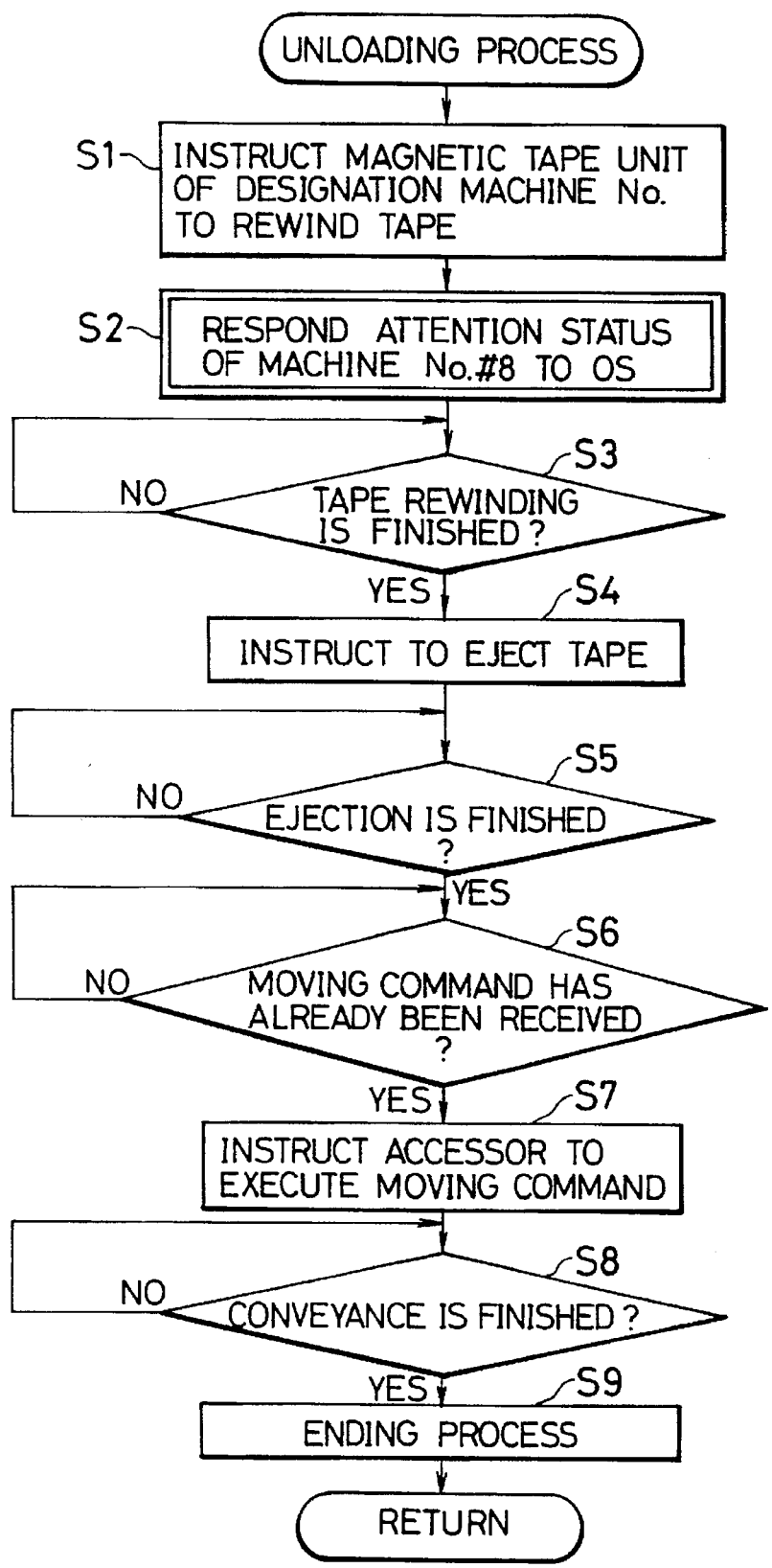
FIG. 18 is a flowchart for the first embodiment of an unloading process in FIG. 17.

FIG. 18 shows the details of the unloading process in step S6 in FIG. 17. In the unloading process, first in step S1, a tape rewinding is instructed to the magnetic tape unit of the machine number address designated by the unloading command. In step S2, an attention status of the machine number address #8 of the accessor controller is returned for the OS of the host computer and the pseudo completion report of the unloading operation is performed.

In step S3, a check is made to see if the tape rewinding has been finished or not. If YES, an ejection of the magnetic tape cartridge is instructed in step S4. When the completion of the ejection is judged in step S5, step S6 follows and a check is made to see if the moving command corresponding to the attention status generated in step S2 has been received from the host OS or not the moving command has already been received, step S7 follows and the execution of the received moving command is instructed to the accessor controller. Subsequently, in step S8, a check is made to see if there is a report of the conveyance end from the accessor controller side or not. When the conveyance end report is received, an end process is executed in step S9. The processing routine is returned to the main routine in FIG. 16.

The report waiting processes in steps S3, S5, S6, and S8 in FIG. 18 are executed by an interrupting process of the status interruption processing section 214 shown in FIG. 14 upon execution. During this interval, the director is held in an idle state. The report of the attention status to inform the pseudo completion of the unloading operation shown in step S2 is executed as a process by the first pseudo status reporting section 216 provided for the status interruption processing section 214 in FIG. 14.

[Modification of Demounting Process]

Figure 19:
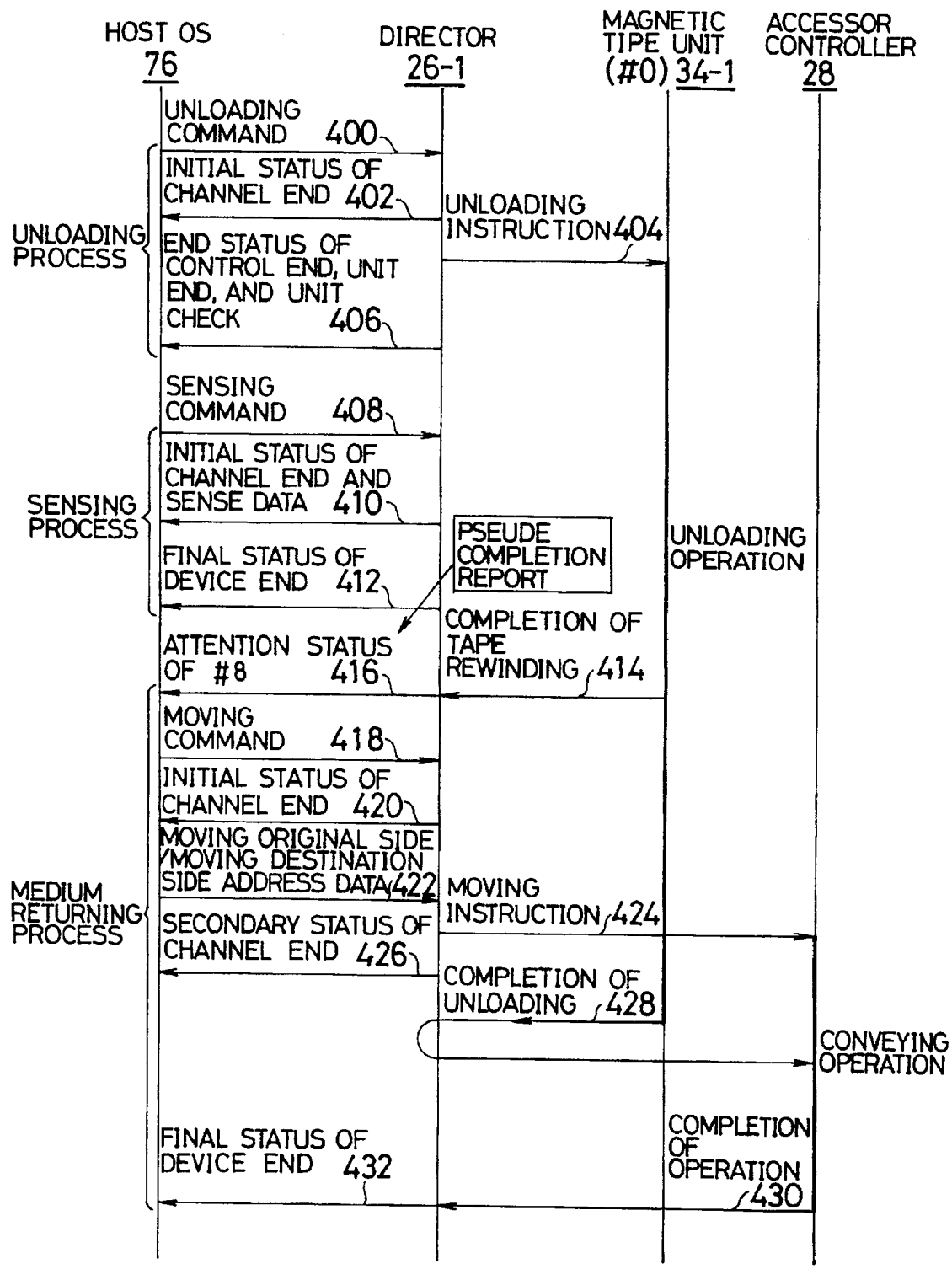
FIG. 19 is a timing chart showing the second embodiment of the demounting processing operation of the invention.

A timing chart of FIG. 19 relates to the second embodiment of the demounting process. In the first embodiment of FIG. 15, simultaneously with that the director 26-1 gives the unloading instruction 304 to the magnetic tape unit 34-1 on the basis of the unloading command 300, the attention status 308 indicative of the pseudo completion of the unloading operation is returned to the host OS 76. On the other hand, in the second embodiment of FIG. 16, on the basis of an unloading command 400 from the host OS 76, the director 26-1 supplies an unloading instruction 404 to the magnetic tape unit 34-1 and the unloading operation is started. After the tape rewinding which is executed at the first stage of the unloading operation was finished, a tape rewinding completion 414 is reported to the director 26-1. In response to it, an attention status 416 of the machine number address #8 of the accessor controller 28 is returned to the host OS 76. The processes other than that the pseudo unloading completion report of the magnetic tape unit 34-1 is executed in response to the completion of the tape rewinding are substantially similar to those in the first embodiment of FIG. 15.

In the second embodiment as well, the pseudo completion report of the unloading operation is performed to the host OS at the time point of the completion of the tape rewinding during the unloading operation of the magnetic tape unit. The moving command is issued during the ejecting operation of the next magnetic tape cartridge and the accessor can be moved to the magnetic tape unit during the unloading operation. Therefore, the medium conveying operation time after the unloading operation was actually finished can be reduced.

Figure 20:
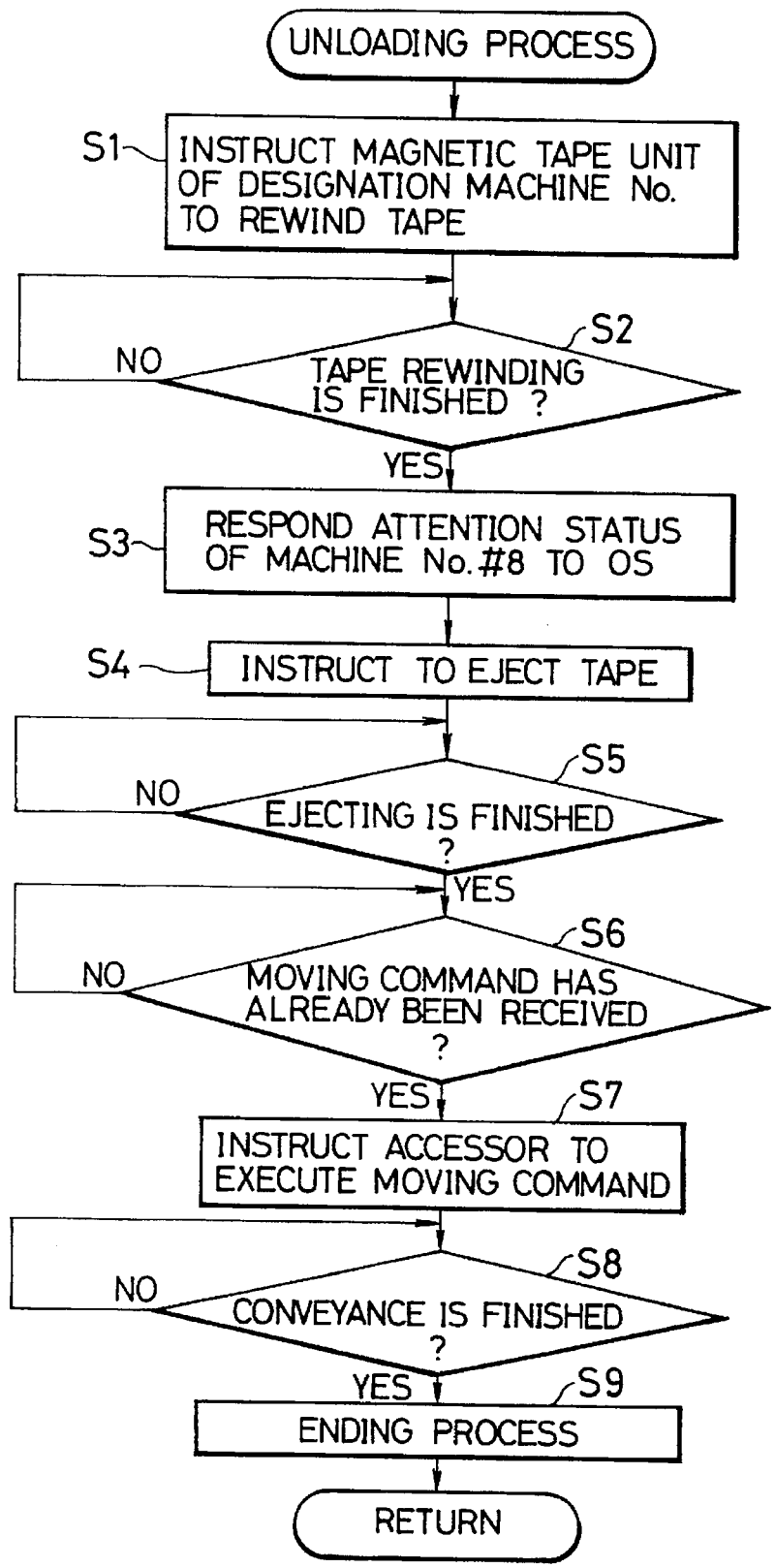
FIG. 20 is a flowchart for the second embodiment of the demounting process in FIG. 19.
Figure 21:
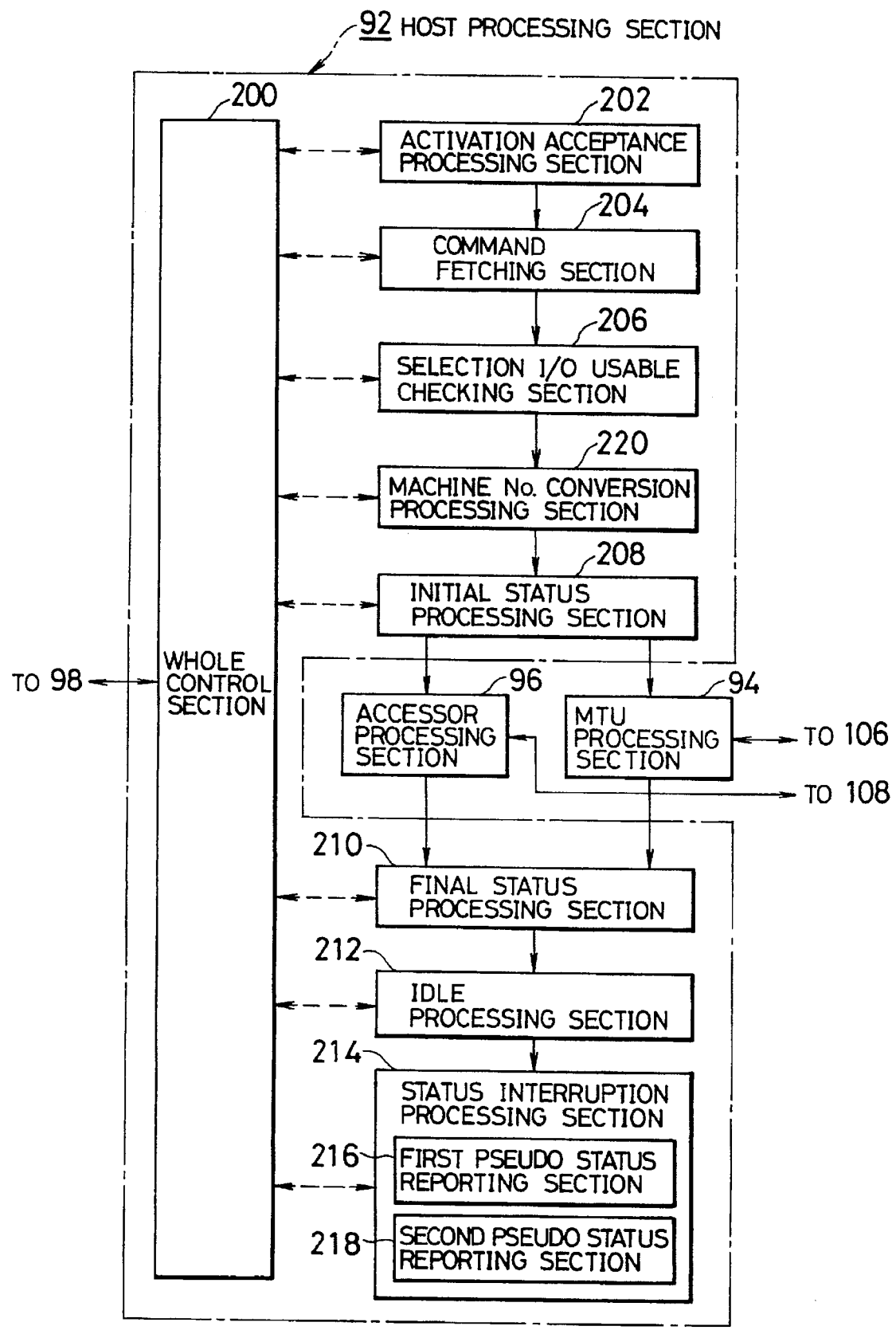
FIG. 21 is another functional block diagram of the MPU section in FIG. 13 of the invention.

A flowchart of FIG. 20 relates to the second embodiment of the unloading process in FIG. 19. The second embodiment of FIG. 20 differs from the flowchart of the first embodiment of FIG. 18 with respect to a point that when the processing routine advances to step S3 by judging the completion of the tape rewinding in step S2, the attention status of the machine number address #8 is sent to the host OS as a pseudo unloading operation completion report. The other processes are substantially the same as those in the first embodiment of FIG. 15.

[Modification of Mounting/Demounting Process]

FIG. 18 shows the details of the MPU section in FIG. 10 according to the third embodiment of the invention. In the embodiment, a second pseudo status reporting section 218 is newly added into the status interruption processing section 214 of the host processing section 92. A machine number conversion processing section 220 is newly provided between the selection I/O usable checking section 206 and the initial status processing section 208. The other processes are substantially the same as those in the first embodiment of FIG. 13.

The second pseudo status reporting section 218 falsely reports an end status of the device end to the moving command issued from the host OS by the attention status (pseudo report of the completion of the unloading operation) of #8 by the first pseudo status reporting section 216. The address data of the received moving command is held in the accessor processing section 96. The actual moving instruction is performed by receiving the report of the end of unloading from the magnetic tape unit. When the pseudo end status is reported for the moving command by the second pseudo status reporting section 218, the host OS issues a command in association with the next input/output request to the magnetic tape unit that is at present being unloaded. In the third embodiment, the command of the new input/output request which designated the magnetic tape unit that is being unloaded from the host OS can be accepted as it is and processed.

In the case where the host processing section 92 designates the machine number address of the magnetic tape unit that is at present being unloaded and receives the command issued from the host OS, the selection I/O usable checking section 206 selects the magnetic tape unit which is at present in the idle state. The machine number conversion processing section 220 converts the machine number address designated by the command into the machine number address of another magnetic tape unit in an idle state and processes a command of a new input/output request.

Figure 22:
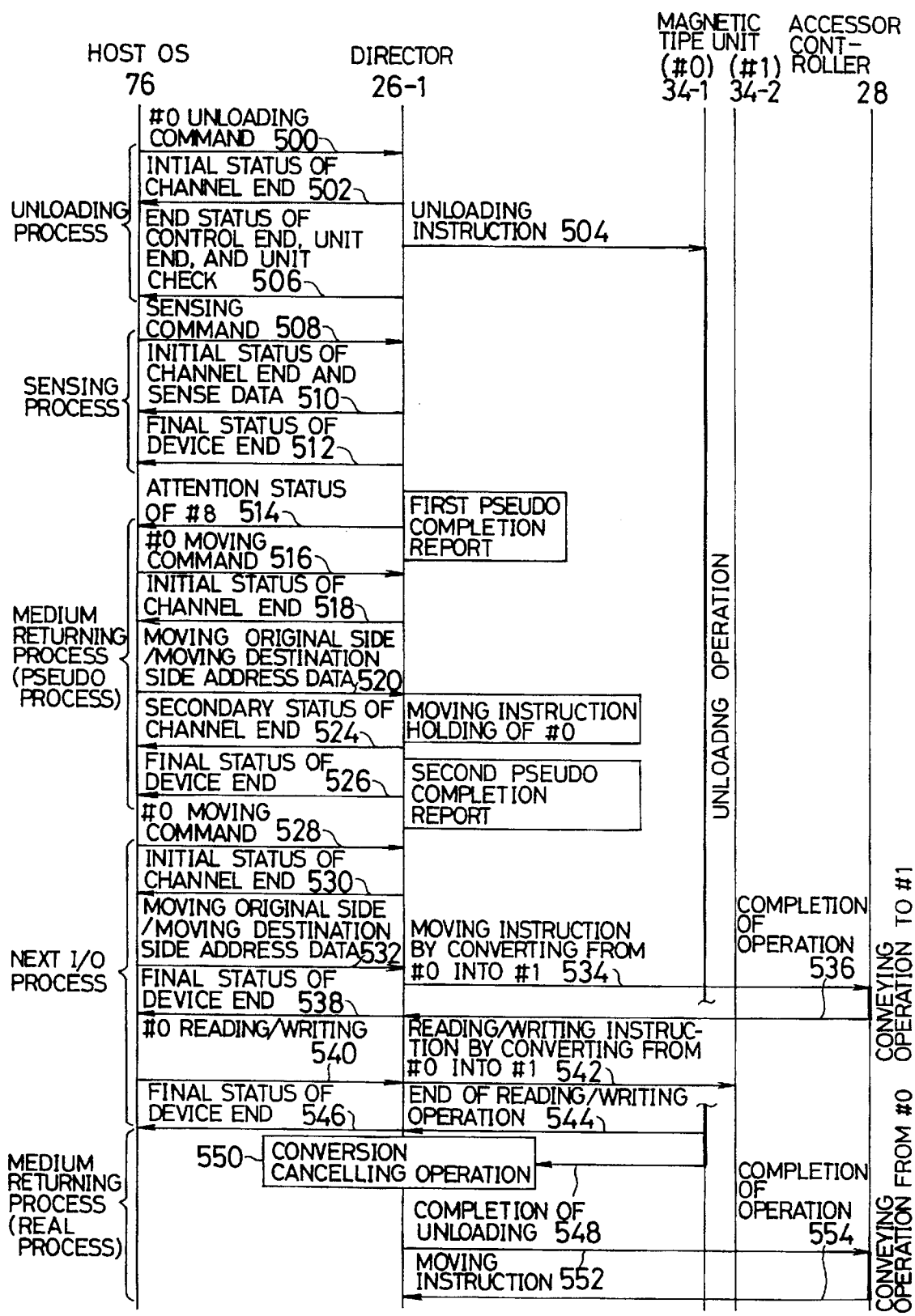
FIG. 22 is a timing chart showing the demounting processing operation of the invention.

A timing chart of FIG. 22 relates to the processing operation of the third embodiment of the invention. First, the host OS 76 issues an unloading command 500 which designated the machine number address #0 of the magnetic tape unit 34-1. Due to this, an unloading instruction 504 is supplied to the magnetic tape unit 34-1 and the unloading operation is started. In response to the unloading instruction 504, the director 26-1 reports an attention status 514 of the machine number address #8 of the accessor controller 28 to the host OS 76. Such a report is a pseudo report indicative of the completion of the unloading operation of the magnetic tape unit 34-1.

By receiving the attention status 514 of #8, the host OS 76 issues a moving command 516 which designated the machine number address #0 of the magnetic tape unit 34-1 and issues movement original side/movement destination side address data 520 subsequent to an initial status 518 of the channel end. The movement original side/movement destination side address data 520 in association with the moving command 516 is held as shown by reference numeral 522 in the director 26-1. Further, the director 26-1 issues a secondary status 524 of the channel end falsely indicating the normal end of the moving command 516 to return the medium to the cell block and a final status 526 of the device end. By receiving the secondary status 524 and final status 526, the host OS 76 judges that the moving command 516 for the magnetic tape unit 34-1 was normally finished. However, the magnetic tape unit 34-1 is executing the unloading operation and the unloading is not yet completed. The medium conveying operation is also not yet completed.

Subsequently, since the host OS 76 recognizes the completion of the unloading operation and the medium conveying operation of the magnetic tape unit 34-1 by the pseudo report, the host OS 76 issues a moving command 528 which designated the machine number address #0 of the magnetic tape unit 34-1 for the mounting process based on the next new input/output request. In response to the moving command 528, the director 26-1 recognizes the normal reception by an initial status 530 of the channel end.

Subsequently, the host OS 76 sends movement original side/movement destination side address data 532 for the mounting process of the new input/output request. For the moving operation based on the new input/output request, the director 26-1 refers to a management table indicative of the statuses of a plurality of magnetic tape units and selects the magnetic tape unit in the idle state, for example, the magnetic tape unit 34-2. The machine number address #0 designated by the moving command 528 is converted into the machine number address #1 of the selected idle magnetic tape unit 34-2. A moving instruction 534 is supplied to the accessor controller 28 by setting another magnetic tape unit 34-2 in the idle state into a movement destination side address. Therefore, although the movement destination side is set to the magnetic tape unit 34-1 in case of the moving command from the host OS 76, in the actual conveying operation, the conveying operation in which the movement destination side is set to the magnetic tape unit 34-2 is executed.

When an operation completion 536 is reported to the director 26-1 by the completion of the conveyance of the magnetic tape cartridge to the magnetic tape unit 34-2 of the machine number address #1, a final status 538 of the device end is reported to the host OS 76 and the normal end of the moving command 528 of the machine number address #0 is recognized.

When the host OS 76 recognizes the final status 538 of the device end, the host OS recognizes the end of mounting process of the new input/output request and subsequently issues a reading/writing command 540 which designated the machine number address #0. By receiving the reading/writing command 540, the director 26-1 converts the machine number address #0 into #1 and supplies a reading/writing instruction 542 to the magnetic tape unit 34-2. The reading or writing operation is executed by another magnetic tape unit 34-2 different from the magnetic tape unit 34-1 recognized by the host OS 76.

When the operation of the magnetic tape unit 34-2 is finished and an end of reading/writing operation 544 is reported, the director 26-1 sends a final status 546 of the device end to the host OS 76 and recognizes the normal end of the reading/writing command.

At this time point, when the unloading operation of the magnetic tape unit 34-1 is completed and a completion of the unloading operation 548 is reported to the director 26-1, the director 26-1 executes a conversion cancelling operation 550 for cancelling the converting process of the device machine number for the new input/output request since then. The converting operation from the machine number address #0 that is at present being executed into #1 is effective until the unloading command and moving command for the demounting process remaining at present are finished.

Subsequently, a moving instruction 552 based on the movement original side/movement destination side address data 520 of the moving command 516 held by the moving instruction holding operation 522 to the machine number address #0 of the director 26-1 is supplied to the accessor controller 28. The conveying operation to convey the magnetic tape cartridge from the magnetic tape unit 34-1 after completion of the unloading operation to the original position of the cell block is executed. When the conveying operation is completed and an operation completion 554 is reported to the director 26-1, a series of demounting processes started from the unloading command 500 of the machine number address #0 are finished at this time point.

Figure 23:
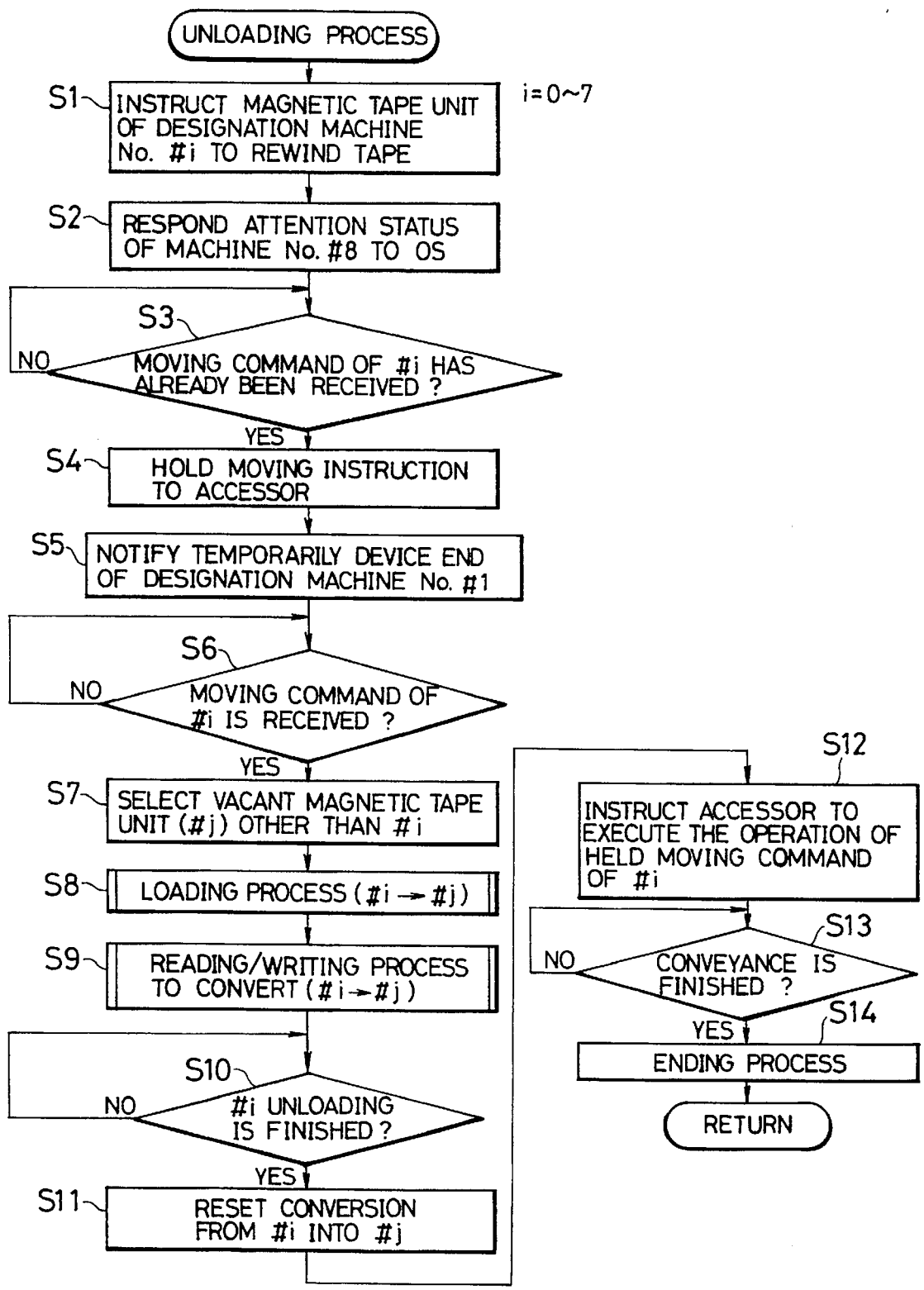
FIG. 23 is a flowchart for the third embodiment of the demounting process in FIG. 22.

A flowchart of FIG. 23 relates to the unloading process of the director 26-1 in the third embodiment of FIG. 22. First in step S1, a tape rewinding instruction is made to the magnetic tape unit having the machine number address #i designated by unloading command. In response to such a tape rewinding instruction in step S2, the attention status of the machine number address #8 is responded to the host OS and the pseudo completion of the unloading operation is reported. In step S3, a check is made to see if the moving command of the machine number address #i has been received or not. If YES, the moving instruction based on the moving command is held in step S4. In step S5, the device end of the machine number address #i is falsely informed to the host OS, thereby falsely reporting the end of all of the series of demounting processes. Therefore, the host OS receives the pseudo report of the device end in step S5 and advances to the next new input/output request and issues the moving command of the mounting process which designated the same machine number address #i.

In step S6, when the moving command of the same machine number address #i as that of the magnetic tape unit during the unloading operation at present is actually received, in step S7, a vacant magnetic tape unit of an address other than the designated machine number address #i is selected, for example, the magnetic tape unit of the machine number address #j is selected. In step S8, the machine number address #i designated by the moving command is converted into the machine number address #j of the selected vacant magnetic tape unit and loading process is executed. After completion of the loading process in step S8, step S9 follows. When the reading command or writing command which designated the machine number address #i is received in step S9, the machine number address is converted into the machine number address #j selected in step S7 and the reading or writing process is executed.

In step S10, a check is made to see if the unloading of the magnetic tape unit of the machine number address #i during the unloading operation at present has been finished or not. When the end of unloading is recognized, in step S11, the converting function from the machine number address #i into #j in the subsequent mounting and demounting processes is reset. With respect to the demounting process of the input/output request which is at present being executed after the processing routine has already progressed to the reading or writing process, the converting function from the machine number address #i to #j of the unloading command and moving command is held effective as it is and the process is continued.

In step S12, after completion of the unloading operation of the machine number address #i held at present, the conveying operation is instructed to the accessor, the medium is picked up from the magnetic tape unit of the machine number address #i after completion of the unloading operation, and the conveying operation to move the magnetic tape unit to the original position of the cell block is performed. When the end of conveying operation is recognized in step S13, step S14 follows and a necessary finishing process is executed. The processing routine is returned to the main routine shown in FIG. 17.

In the third embodiment, by performing the pseudo completion report with regard to any of the unloading command and the moving command in the demounting process, the input/output request from the host computer can be soon accepted by the library apparatus. A processing efficiency of the input/output request to the library apparatus can be raised.

As mentioned above, according to the invention, in response to the unloading command from the upper apparatus, by performing the pseudo unloading completion report for a period of time from the instruction of the unloading operation to the completion of the operation, the moving command for the medium conveyance after completion of the unloading is issued. Thus, the unloading operation and the medium conveying operation can be performed in parallel. A processing time of the demounting process to return the recording medium from the recording/reproducing unit to the cell block can be reduced. Practically speaking, the reduction of time of about five seconds as compared with that of the conventional apparatus was confirmed.

Simultaneously with the pseudo completion report for the unloading command, the pseudo completion report is also performed to the next moving command, thereby allowing the host computer side to regard as if all of the demounting processes from the unloading to the completion of the medium returning conveyance were falsely finished. The mounting process in association with the new input/output request can be started for the same recording/reproducing unit. Therefore, an accepting efficiency of the input/output request for the upper apparatus of the library apparatus can be raised and the processing performance can be raised.

[First Embodiment of Data Transfer Control]

According to the first embodiment of the data transfer control of the invention, the number of error times of the data transfer errors is counted every plural magnetic tape control units. When the number of error times exceeds a preset error threshold value, all of the command processes which are executed by the same magnetic tape control unit are executed while switching the data transfer speed to an executable data transfer speed. The executable data transfer speed is defined as a data transfer speed at which the data transfer can normally be finished without causing an error.

Figure 24:
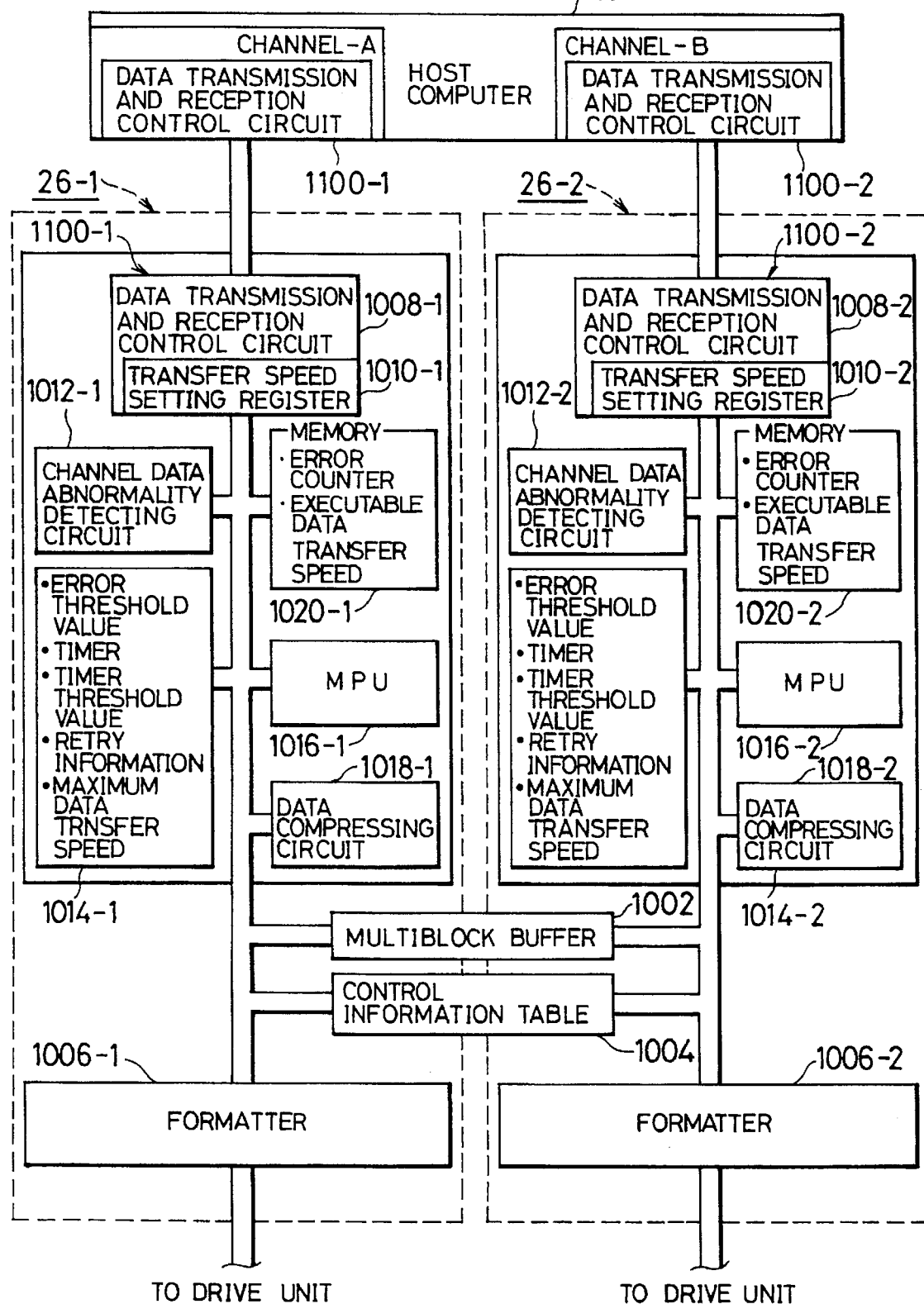
FIG. 24 is a block diagram of the first embodiment of a transfer control apparatus.

In FIG. 24, magnetic tape subsystems comprising magnetic tape control units 26-1 and 26-2 and drive unit groups (not shown) are connected to two channels (A) and (B) of the host computer 20. The magnetic tape control units 26-1 and 26-2 are units which are obtained by eliminating the control functions of the accessors 12-1 and 12-2 from the directors 26-1 and 26-2 in FIG. 13. Therefore, it is assumed that the magnetic tape control units are designated by the same reference numerals as those of the directors.

Data transmission and reception control circuits 1100-1 and 1100-2 are provided for the channels (A) and (B) of the host computer 20, respectively. The magnetic tape control units 26-1 and 26-2 comprise: host interface controllers 1000-1 and 1000-2; a multiblock buffer 1002; a control information table 1004; and formatters 1006-1 and 1006-2, respectively. Among them, the multiblock buffer 1007 and control information table 1004 are commonly used for the two magnetic tape control units 26-1 and 26-2.

The host interface controllers 1000-1 and 1000-2 of the magnetic tape control units 26-1 and 26-2 comprise: data transmission and reception control circuits 1008-1 and 1008-2; channel data abnormality detecting circuits 1012-1 and 1012-2; MPUs 1016-1 and 1016-2; memories 1014-1 and 1014-2; memories 1020-1 and 1020-2; and data compressing circuits 1018-1 and 1018-2, respectively. Transfer speed setting registers 1010-1 and 1010-2 are provided for the data transmission and reception control circuits 1008-1 and 1008-2, respectively.

The host interface controllers 1000-1 and 1000-2 execute various input and output processes such as command processes and the like between the host interface controllers and the host computer 20. The formatters 1006-1 and 1006-2 execute a formatting process of the write data and read data for a tape medium in a drive unit and the like. The control information tables 1004-1 and 1004-2 are memories which are accessed by the host interface controllers 1000-1 and 1000-2 and formatters 1006-1 and 1006-2 and in which various control information such as control information of a command and the like are stored. The multiblock buffer 1002 is a data buffer to temporarily store the transfer data. The drive units are the magnetic tape units 34-1 to 34-12 in FIG. 13 and drive the magnetic tapes under the controls of the magnetic tape control units 26-1 and 26-2, thereby reading and writing the data. The data transmission and reception control circuits 1100-1 and 1100-2 execute the transmission and reception controls of the data of the channels (A) and (B). The data transmission and reception control circuits 1008-1 and 1008-2 perform the transmission and reception controls of the data in the magnetic tape control units 26-1 and 26-2. The channel data abnormality detecting circuits 1012-1 and 1012-2 monitors whether the data transfer with the channels has normally been executed or not on the basis of interface control signals with the channels (A) and (B). In this case, information indicating whether the data transfer is normal or abnormal is notified from the channel data abnormality detecting circuits 1012-1 and 1012-2 to the MPUs 1016-1 and 1016-2. The MPUs 1016-1 and 1016-2 execute various kinds of controls in the magnetic tape control units 26-1 and 26-2. There are the following controls which are executed by the MPUs 1016-1 and 1016-2.

I. The data in the memories 1014-1, 1014-2, 1020-1, and 1020-2 is managed and controls such as reset, increment, and the like of the error counter are executed. Controls such as reset, start, and the like of the timer are executed.

II. The time is monitored by the timer, thereby detecting an error of the data transfer by the time-out. In this case, the MPUs 1016-1 and 1016-2 compare the timer values stored in the memories 1014-1 and 1014-2 and the timer threshold values, thereby detecting the time-out.

III. Retry information is written or cleared into/from the memories 1014-1 and 1014-2.

IV. The maximum data transfer speed of the memories 1014-1 and 1014-2 is set into the transfer speed setting registers 1010-1 and 1010-2. The executable data transfer speed of the memories 1020-1 and 1020-2 is set into the transfer speed setting registers 1010-1 and 1010-2. The executable data transfer speed is written into the memories 1020-1 and 1020-2.

V. An error of the data transfer is detected on the basis of the detection information from the channel data abnormality detecting circuits 1012-1 and 1012-2 and the time-out of the time monitor by the timer.

VI. In addition, other various controls such as data transfer control to the data compressing circuits 1016-1 and 1016-2 in the host interface controllers 1000-1 and 1000-2 and the like are executed.

The memories 1014-1 and 1014-2 store various kinds of data including the error threshold values, timer values, timer threshold values, retry information, and maximum data transfer speeds which are used when the MPUs 1016-1 and 1016-2 execute the controls, and the like. The memories 1020-1 and 1020-2 store various kinds of data including the error counter values and executable data transfer speeds which are used when the MPUs 1016-1 and 1016-2 perform the controls, and the like. The data compressing circuits 1018-1 and 1018-2 execute the compression of the data which is written to the tape medium and the decompression of the data read out from the tape medium. The transfer speed setting registers 1010-1 and 1010-2 set the data transfer speeds between the channels (A) and (B) and the control units. The MPUs 1016-1 and 1016-2 set the data transfer speeds into the transfer speed setting registers 1010-1 and 1010-2.

The operation of the embodiment of FIG. 24 will now be described with respect to the magnetic tape control unit 26-1. When the magnetic tape control unit 26-1 receives a command from the host computer 20, the MPU 1016-1 of the host interface controller 1000-1 analyzes the command and writes control information, namely, a command to the formatter 1006-1 into the control information table 1004-1 in accordance with the contents of the command. The formatter 1006-1 periodically reads the control information of the control information table 1004-1 and judges whether it has the contents to be processed or not. Thus, for example, in case of the reading or writing operation, the formatter 1006-1 executes a formatting process. In this case, the data transfer is performed between the host interface controller 1000-1 and the formatter 1006-1 while executing the buffering via the multiblock buffer 1002. After that, when the formatter 1006-1 finishes the execution of the command, the completion of the execution of the command is written into the control information table 1004. The host interface controller 1000-1 reports the end of the command to the host computer 20, thereby finishing the processing routine.

The MPU 1016-1 sets the maximum data transfer speed stored in the memory 1014-1 or the executable data transfer speed stored in the memory 1020-1 into the transfer speed setting register 1010-1. Thus, the data transmission and reception control circuit 1008-1 executes the data transfer between the control circuit and the channel (A) in accordance with the data transfer speed set in the transfer speed setting register 1010-1. For a period of time during which the data transfer is executed with the channel (A), the MPU 1016-1 resets and starts the timer in the memory 1014-1 and compares the timer value (elapsed time) to the timer threshold value in the memory 1014-1, thereby monitoring the time-out of the data transfer. The MPU 1016-1 monitors whether the data transfer became the abnormal state or not on the basis of the detection information from the channel data abnormality detecting circuit 1012-1. When the time-out occurs or the abnormality is detected by the channel data abnormality detecting circuit 1012-1 and the data transfer error occurs, the MPU 1016-1 sets a data transfer speed lower than the present data transfer speed into the transfer speed setting register 1010-1 and reports the error to the channel (A), thereby instructing the retry. Thus, the data transfer is retried at a low speed.

Figure 25:
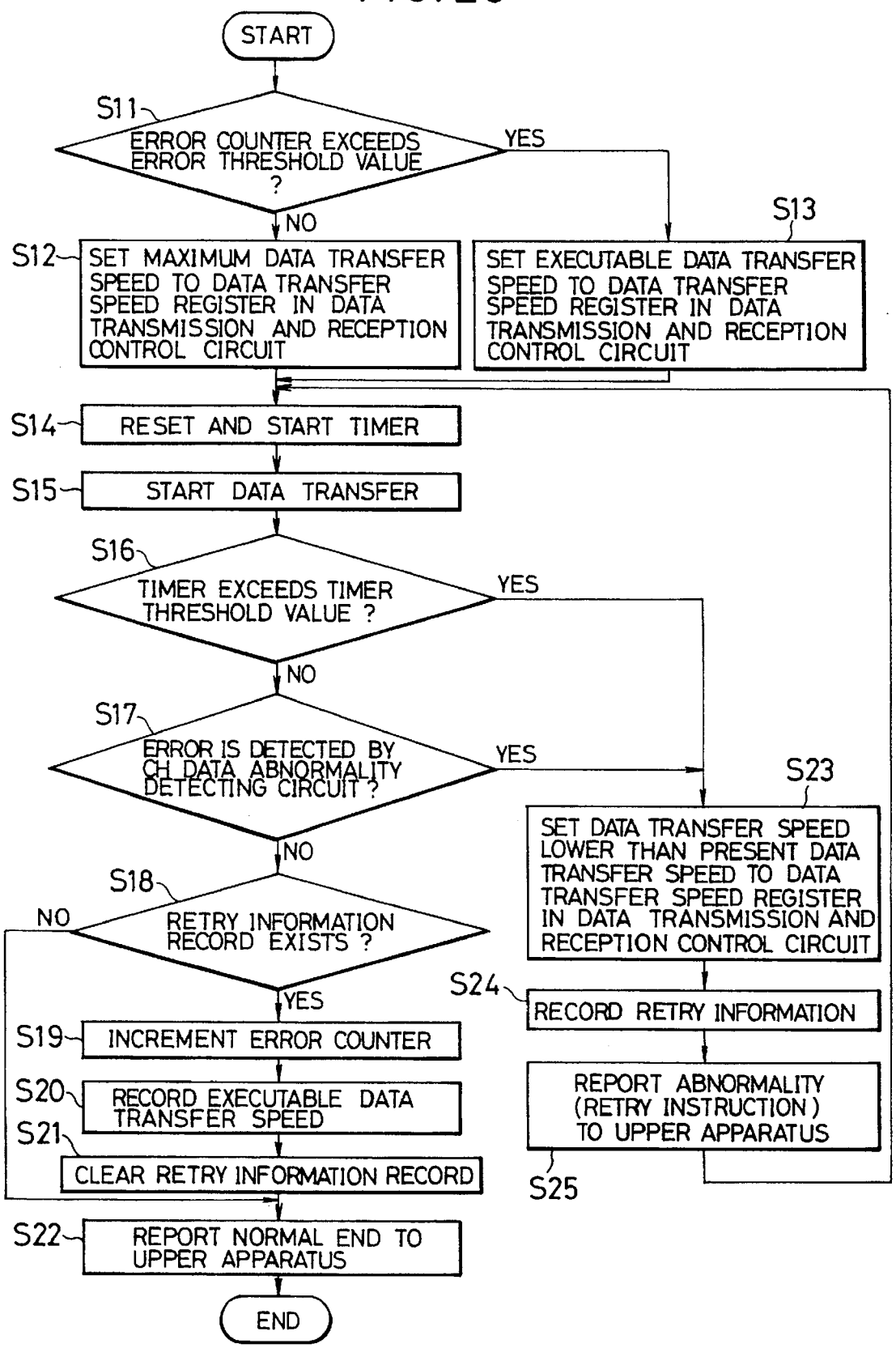
FIG. 25 is a flowchart for a transfer control in FIG. 24.

A flowchart of FIG. 25 shows a control process of the MPU 1016-1 of the first embodiment of FIG. 24. When receiving the data transfer request from the channel, the MPU 1016-1 first judges whether the value of the number of error times of the error counter in the memory 1020-1 exceeds the error threshold value in the memory 1014-1 or not (step S11). When the number of error times of the error counter doesn't exceed the error threshold value, the maximum data transfer speed stored in the memory 1014-1 is read out and is set into the transfer speed setting register 1010-1 of the data transmission and reception control circuit 1008-1 (step S12). When the number of error times of the error counter exceeds the error threshold value, the executable data transfer speed stored in the memory 1020-1 is read out and is set into the transfer speed setting register 1010-1 of the data transmission and reception control circuit 1008-1 (step S13). The timer in the memory 1014-1 is reset and started (step S14). An instruction is sent to the data transmission and reception control circuit 1008-1, thereby starting the data transfer (step S15). After the start of the data transfer, the MPU 1016-1 starts the timer in the memory 1014-1 and times up and judges whether the timer value exceeds the timer threshold value or not (step S16). Until the timer value exceeds the timer threshold value, a check is made to see if the error has been detected or not by the channel data abnormality detecting circuit 1012-1 (step S17). When no error is detected, a check is made to see if the retry information has been recorded in the memory 1014-1 or not (step S18). When the retry information is not recorded, the normal end is reported to the channel (step S22). When the retry information is stored (step S18), this means that the error was detected. Therefore, the count value of the error counter in the memory 1020-1 is increased (step S19). The executable data transfer speed is stored in the memory 1020-1 (step S20). The retry information recorded in the memory 1014-1 is subsequently cleared (step S21) and the normal end is reported to the channel (step S22)

On the other hand, when the timer value exceeds the timer threshold value in step S16 or when the error is detected in step S17, a data transfer speed lower than the present data transfer speed is set into the transfer speed setting register 1010-1 in the data transmission and reception control circuit 1008-1 (step S23). The retry information is stored into the memory 1014-1 (step S24) and the error is reported to the channel (step S25). The error report results in a retry instruction to the host computer 20.

Figure 26:
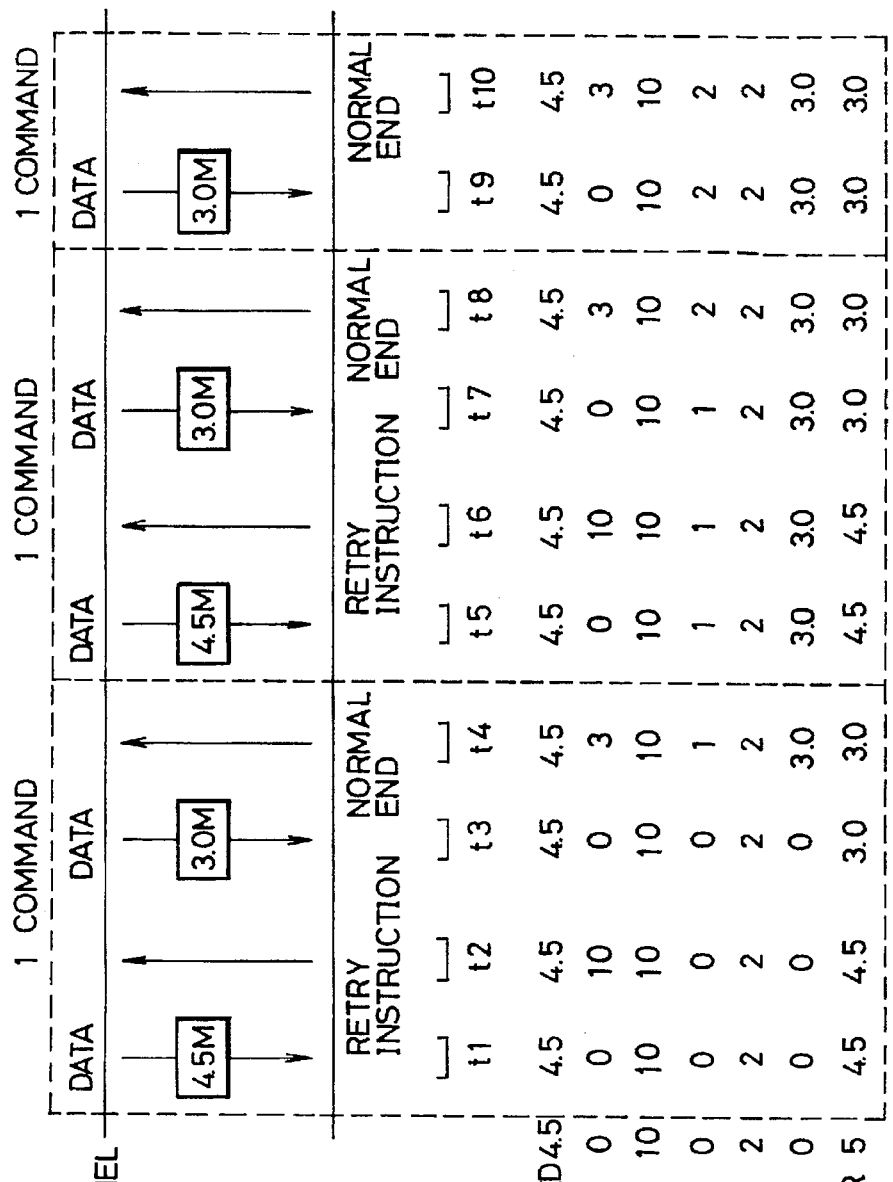
FIG. 26 is a timing chart for the transfer control of FIG. 24.

A timing chart of FIG. 26 relates to the transfer control by the MPU 1016-1 in the first embodiment of FIG. 24. In FIG. 26, (A) denotes the channel; (B) the magnetic tape control unit 26-1; (C) the maximum data transfer speed of 4.5 MBytes/sec; (D) the timer value (initial value=0); (E) the timer threshold value (=10); (F) the number of error times of the error counter (initial value =0); (G) the error threshold value (=2); (H) the executable data transfer speed (initial value=0); (I) the value of the transfer speed setting register 1010-1 (initial value=4.5 MBytes/sec); and t1 to t10 the timings.

When a data transfer request is generated from the channel (A) of the host computer 20 at the timing t1, the MPU 1016-1 compares the number of error times of the error counter and the error threshold value. When the number of error times of the error counter doesn't exceed the error threshold value, the data transfer is started at the maximum data transfer speed of 4.5 MBytes/sec. When the time-out in which the timer value exceeds the timer threshold value is detected during the data transfer at the timing t2, the error is reported to the channel (A), thereby instructing the retry. Since the error has already been detected at the timing t3 in case of the data transfer speed of 4.5 MBytes/sec, the data transfer speed is reduced to 3.0 MBytes/sec and the data transfer is retried. Since the data transfer speed was reduced to 3.0 MBytes/sec, the data transfer succeeds, the normal end is reported to the channel (A), and the count value of the error counter stored in the memory 1020-1 is increased at the timing t4. The data transfer speed of 3.0 MBytes/sec which was rescued by the retry is stored into the memory 1020-1 as an executable data transfer speed. When a new input/output request is generated from the channel (A) at the timing t5, the number of error times of the error counter is compared with the error threshold value. Since the number of error times of the error counter doesn't exceed the error threshold value in this instance, the maximum data transfer speed of 4.5 MBytes/sec is set and the data transfer is started. However, since the data speed is too high, the time-out occurs at the timing t6 during the data transfer and the error is reported to the channel (A), thereby instructing the retry. The data transfer speed is reduced to 3.0 MBytes/ sec at the timing t7, thereby performing the retry. At the next timing t8, the normal end is reported to the channel and the same process as that at the timing t4 is executed. When a new data transfer request is generated at the timing t9, the number of error times of the error counter is compared with the error threshold value. In this instance, the number of error times of the error counter is equal to 2 and coincides with the error threshold value (=2). Therefore, it is judged that the data transfer at 4.5 MBytes/sec as a maximum data transfer speed is impossible. The data transfer speed at which the data transfer could be executed in the past, namely, the executable data transfer speed of 3.0 MBytes/sec stored in the memory 1020-1 is used and is set into the transfer speed setting register 1010-1, thereby performing the data transfer. When the data transfer is normally finished at the timing t10, the normal end is reported to the channel.

Although the control processes in FIGS. 25 and 26 have been described with respect to the magnetic tape control unit 26-1 side as an example, similar control processes are also executed with respect to the magnetic tape control unit 26-2 side.

[Second Embodiment of Data Transfer Control]

According to the second embodiment of the data transfer control of the invention, the number of error times of the data transfer errors is counted every channel ports (A) and (B) of the upper apparatus and, in the case where the number of error times exceeds a preset error threshold value, all of the command processes which are executed by the same channel port are executed while switching the transfer speed to the executable data transfer speed.

Figure 27:
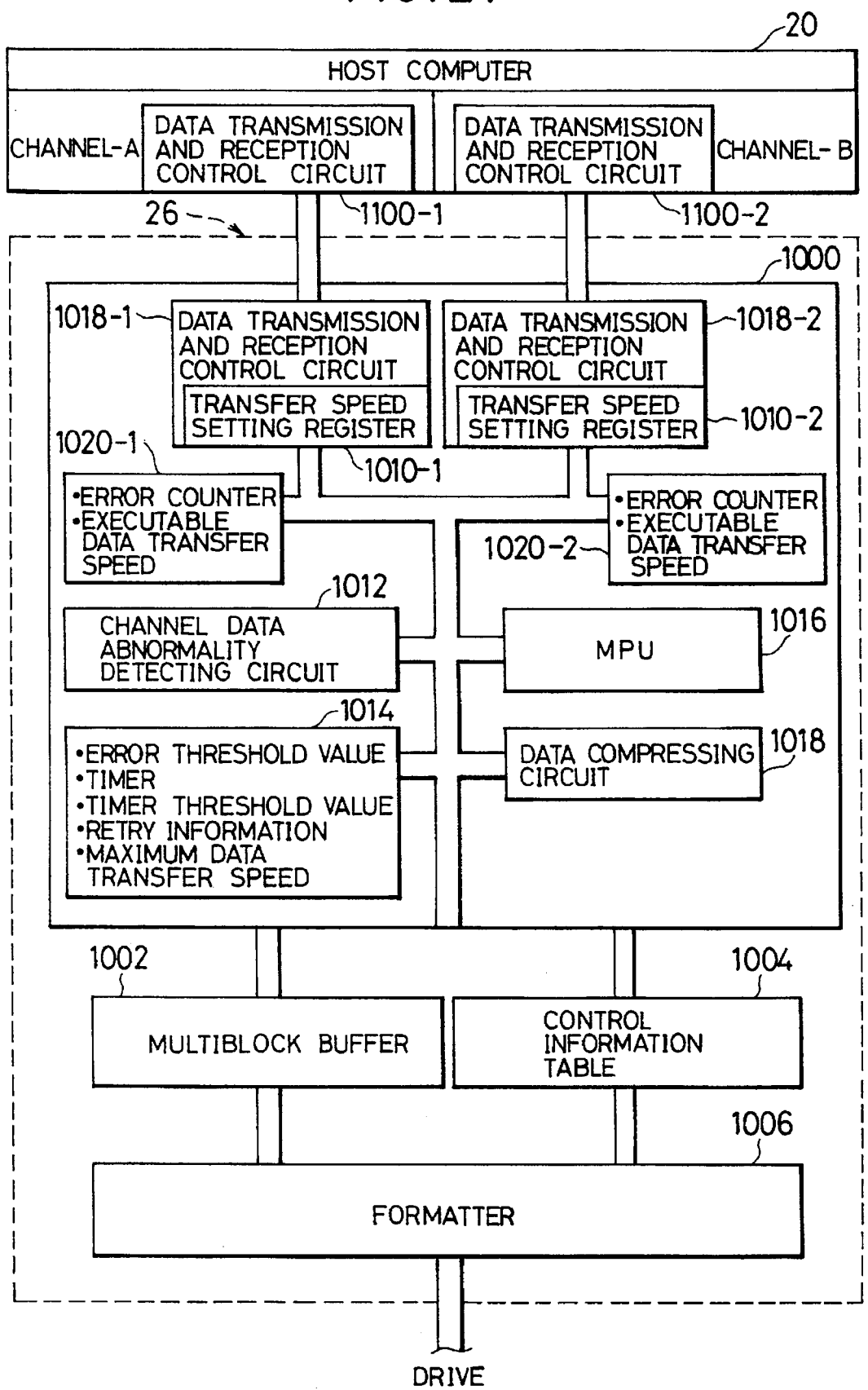
FIG. 27 is a block diagram of the second embodiment of a transfer control apparatus.

In FIG. 27, one magnetic tape control unit 26 is provided for the channels (A and B) of the host computer 20. The data transmission and reception control circuits 1018-1 and 1018-2, memories 1020-1 and 1020-2, and transfer speed setting registers 1010-1 and 1010-2 are provided for the magnetic tape control unit 26 in correspondence to the channels (A) and (B). A data abnormality detecting circuit 1012, an MPU 1016, a data compressing circuit 1018, and a memory 1014 are provided as common circuits for the channels (A) and (B). The function of each section is similar to that in the first embodiment of FIG. 24.

Figure 28:
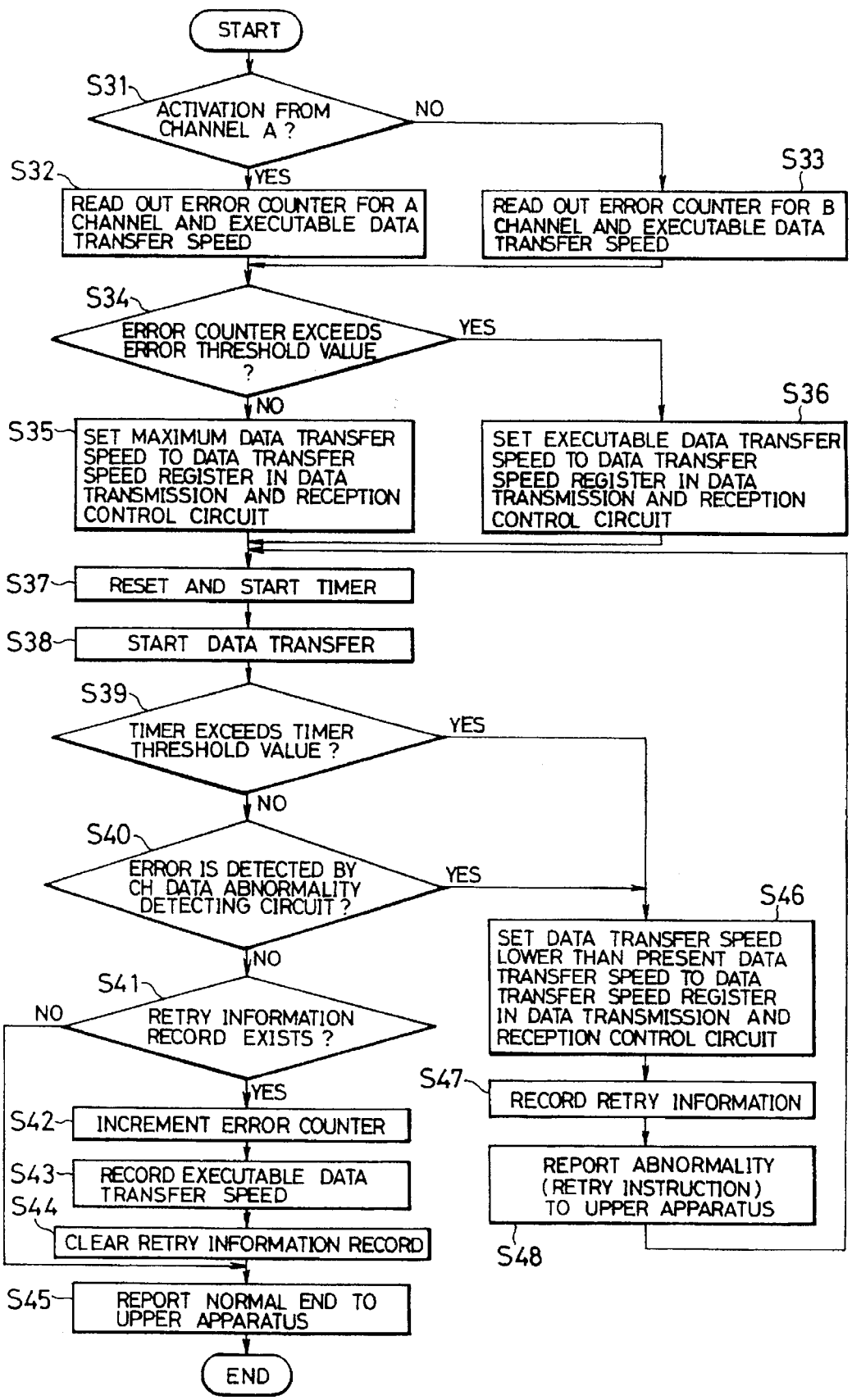
FIG. 28 is a flowchart for a transfer control of FIG. 27.

A flowchart of FIG. 28 relates to a control process of the MPU 1016 of the second embodiment of FIG. 27. When an activation request is supplied from the channel (A) to the magnetic tape control unit 26 (step S31), the MPU 1016 reads out the value of the error counter of the channel (A) stored in the memory 1020-1 and the executable data transfer speed (step S32). On the other hand, when there is an activation request from the channel (B), the value of the error counter of the channel (B) in the memory 1020-2 and the executable data transfer speed are read out (step S33). A check is now made to see if the value of the error counter in the memory 1020-1 or 1020-2 exceeds the error threshold value in the memory 1014 or not (step S34). When the count value doesn't exceed the error threshold value, the maximum data transfer speed is set into either one of the transfer speed setting register 1010-1 or 1010-2 on the side in which there is the activation request (step S35).

However, when the value of the error counter exceeds the error threshold value in the process in step S34, the executable data transfer speed stored in the memory 1020-1 or 1020-2 is set to either one of the transfer speed setting register 1010-1 or 1010-2 in which there is the activation request (step S36). The timer in the memory 1014 is subsequently reset and started (step S37) and the data transfer is started (step S38). After the data transfer was started, a check is made to see if the value of the timer exceeds the timer threshold value or not (step S39). When the timer value doesn't exceed the timer threshold value, a check is made to see if the error has been detected or not by the channel data abnormality detecting circuit 1012 (step S40). When the error is not detected, a check is made to see if the retry information has been recorded in the memory 1014 or not (step S41). When no retry information is recorded, the normal end is reported to the channel side (step S45). When the retry information has been recorded (step S41), this means that the error occurred. Therefore, the value of the error counter of the memory 1020-1 or 1020-2 is increased (step S42). The executable data transfer speed is recorded into the memory 1020-1 or 1020-2 (step S43). After that, the retry information recorded in the memory 1014 is cleared (step S44). The normal end is reported to the channel side (step S45). When the timer value exceeds the timer threshold value in step S39 or when the error is detected in step S40, a data transfer speed lower than the present data transfer speed is set into the transfer speed setting register 1010-1 or 1010-2 (step S46). Subsequently, the retry information is recorded in the memory 1014 (step S47). The error is reported to the channel side, thereby instructing the retry (step S48). As mentioned above, the number of error times of the data transfer error is counted every channels (A) and (B). When the number of error times exceeds the preset error threshold value, all of the command processes which are executed by the same channel are executed while switching the speed to the executable data transfer speed.

Figure 29:
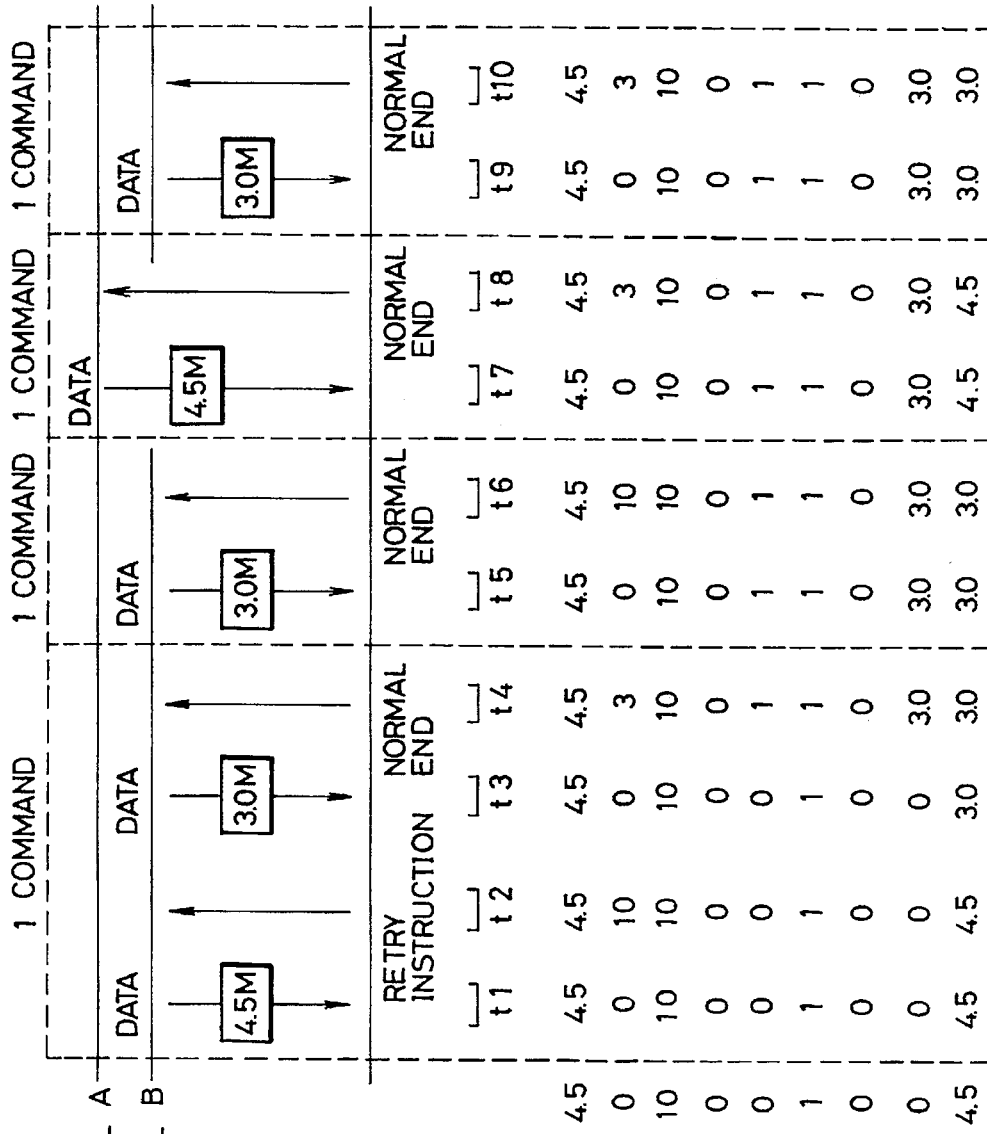
FIG. 29 is a timing chart for the transfer control of FIG. 27.

A timing chart of FIG. 29 relates to a control process of the MPU 1016 in the second embodiment of FIG. 27. In FIG. 29, (A) denotes the channel (A); (B) the channel (B); (C) the magnetic tape control unit 26; (D) the maximum data transfer speed of 4.5 MBytes/sec; (E) the timer value (initial value=0); (F) the timer threshold value (10); (G) the value of the error counter of the channel (A) (initial value=0); (H) the value of the error counter of the channel (B) (initial value= 0); (I) the error threshold value (1); (J) the executable transfer speed of the channel (A) (initial value=0); (K) the executable transfer speed of the channel (B) (initial value= 0); (L) the value of the transfer speed setting register (initial value=4.5); and t1 to t10 the timings.

When a data transfer request is generated from the channel (B) at the timing t1, the MPU 16 compares the value of the error counter for the channel (B) and the error threshold value. When the value of the error counter exceeds the error threshold value, the data transfer is started at the maximum data transfer speed of 4.5 MBytes/sec. When the time-out is detected during the data transfer at the timing t2, the error is reported to the channel (B), thereby instructing the retry. When a new transfer request is received from the channel (B) at the timing t3, since the error has already been generated in the data transfer of the speed of 4.5 MBytes/sec, the data transfer speed is reduced to 3.0 MBytes/sec, thereby retrying. In the case where the data transfer succeeds by the retry by the reduced data transfer speed at the timing t4, the normal end is reported to the channel (B) and the count value of the error counter is increased. The data transfer speed of 3.0 MBytes/sec at which the data transfer can be rescued by the retry is set to the executable data transfer speed and is stored into the memory 1020-2 of the channel (B). When a new data transfer request is generated from the channel (B) at the timing t5, the value of the error counter of the channel (B) is compared with the error threshold value. Since the value of the error counter now coincides with the error threshold value, in the data transfer via the channel (B), the executable data transfer speed of 3.0 MBytes/sec obtained by the successful retry is set. When the data transfer is normally finished at the timing t6, the normal end is reported to the channel (B).

When a new data transfer request is generated from the channel (A) at the timing t7, the value of the error counter for the channel (A) is compared with the error threshold value. When the value of the error counter doesn't exceed the error threshold value, the data transfer is started at the maximum data transfer speed of 4.5 MBytes/sec in the memory 1014. When the data transfer is normally finished at the timing t8, the normal end is reported to the upper apparatus. When the data transfer request is generated from the channel (B) at the timing t9, since the value of the error counter has already exceeded the error threshold value in the data transfer of the channel (B), the data transfer is executed at the executable data transfer speed of 3.0 MBytes/sec. When the data transfer is normally finished at the timing t10, the normal end is reported to the channel (B).

[Third Embodiment of Data Transfer Control]

According to the data transfer control of the third embodiment of the invention, the number of error times of the data transfer errors is counted every drive machine number of a plurality of drive units and, when the number of error times exceeds a preset error threshold value, all of the command processes which are executed by the same drive machine number are executed while switching the speed to the executable data transfer speed.

Figure 30:
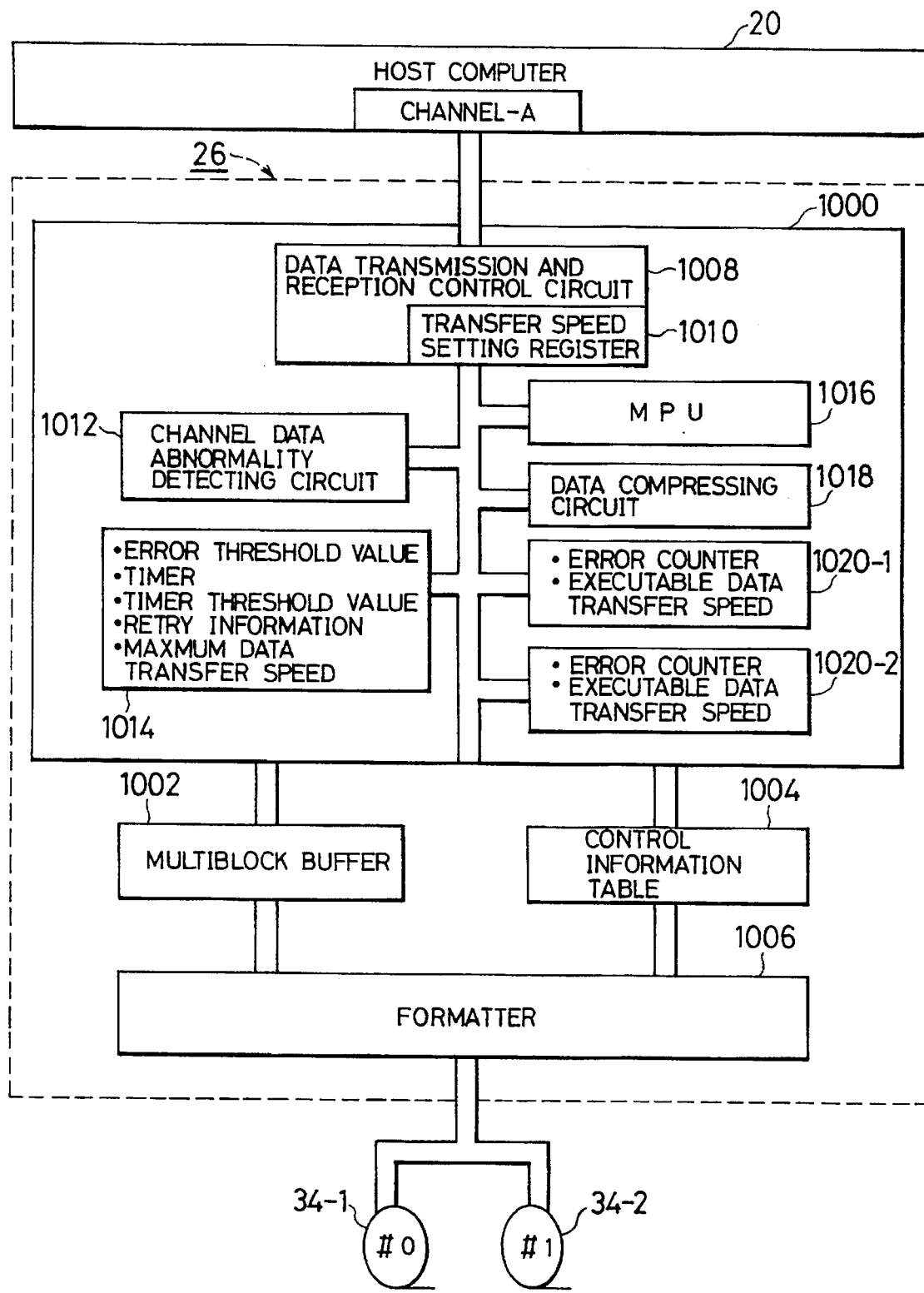
FIG. 30 is a block diagram of the third embodiment of a transfer control apparatus.

In FIG. 30, the host computer 20 has a single channel (A) and is connected to the magnetic tape control unit 26. For example, two drive units 34-1 and 34-2 are connected under the domination of the magnetic tape control unit 26. Drive machine numbers #0 and #1 are set to the drive units 34-1 and 34-2. The magnetic tape control unit 26 comprises: a host interface controller 1000; the multiblock buffer 1002; the control information table 1004; and a formatter 1006. The host interface controller 1000 comprises: a data transmission and reception control circuit 1008; the channel data abnormality detecting circuit 1012; the memory 1014; the MPU 1016; the data compressing circuit 1018; and the memories 1020-1 and 1020-2. The memory 1020-1 is a memory provided in correspondence to the drive machine No. #0 of the drive unit 34-1. The memory 1020-2 is a memory provided in correspondence to the drive machine No. #1 of the drive unit 34-2. The memories 1020-1 and 1020-2 store the same data as that of FIG. 24. The other constructions are also similar to those in the first embodiment of FIG. 24.

Figure 31:
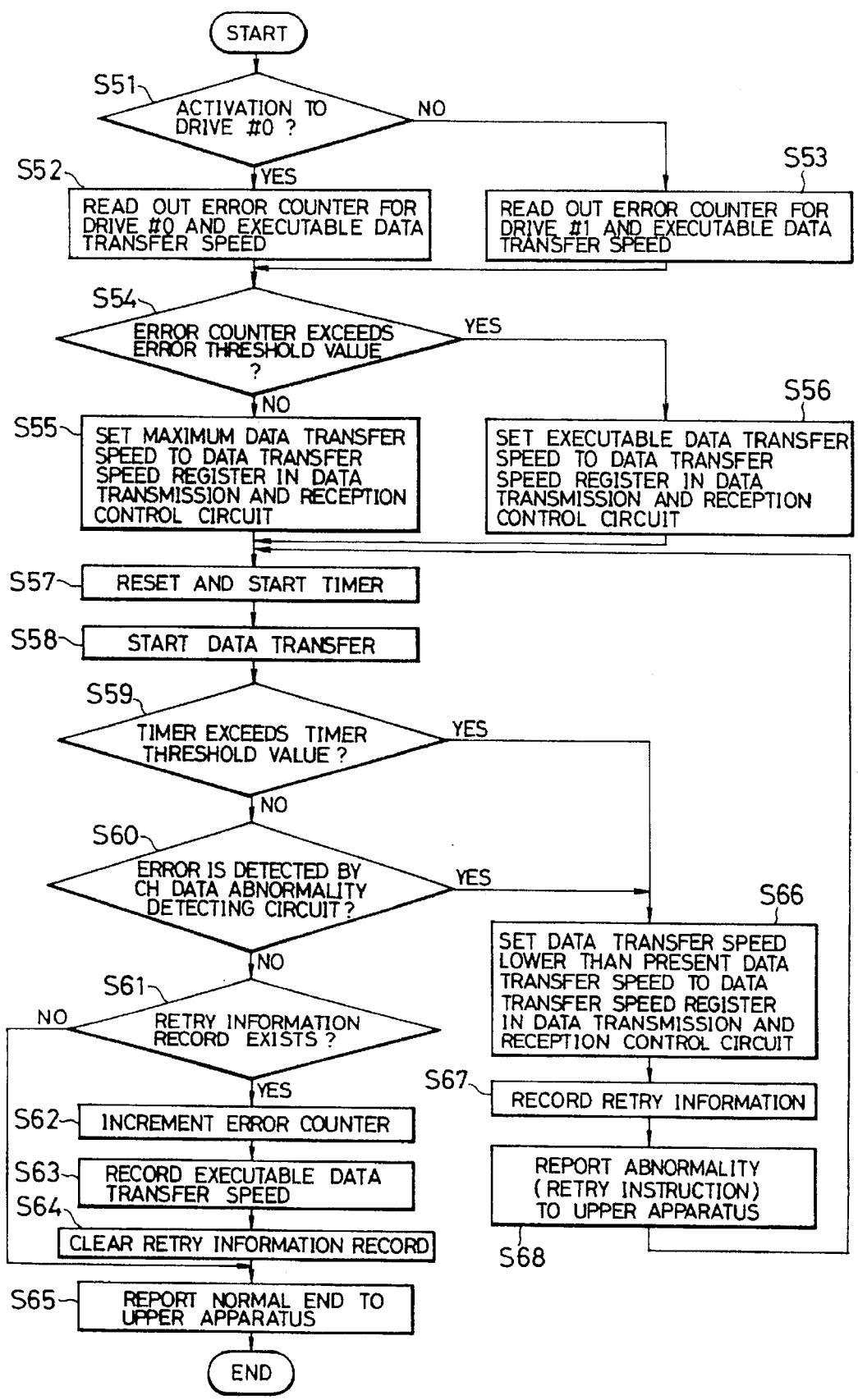
FIG. 31 is a flowchart for a transfer control of FIG. 30.

A flowchart of FIG. 31 relates to a control process of the third embodiment according to the MPU 1016 in FIG. 30. When the activation request in which the drive machine No. #0 is designated from the channel (A) is discriminated (step S51), the MPU 1016 reads out the value of the error counter of the drive machine No. #0 and the executable data transfer speed from the memory 1020-1 (step S52). When the activation request in which the drive machine No. #1 is designated is discriminated, the MPU 1016 reads out the value of the error counter of the drive machine No. #1 in the memory 1020-2 and the executable data transfer speed from the memory 1020-2 (step S53). A check is now made to see if the value of the error counter which was read out exceeds the error threshold value in the memory 1014 or not (step S54). If NO, the maximum data transfer speed is set into the transfer speed setting register 1010 in the data transmission and reception control circuit 1008 (step S55). However, when the value of the error counter exceeds the error threshold value in step S54, the executable data transfer speed of the designated drive machine No. is set into the transfer speed setting register 1010 of the data transmission and reception control circuit 1008 (step S56). Subsequently, the timer in the memory 1014 is reset and started (step S57) and the data transfer is started (step S58). After the data transfer was started, a check is made to see if the value of the timer exceeds the timer threshold value or not (step S59). When the timer value doesn't exceed the timer threshold value, a check is made to see if the error has been detected or not by the channel data abnormality detecting circuit 1012 (step S60). When the error is not detected, a check is made to see if the retry information has been recorded in the memory 1014 or not (step S61). When no retry information is recorded, the normal end is reported to the channel (step S65). When the retry information has been recorded (step S61), the value of the error counter stored in the memory 1020-1 or 1020-2 is increased (step S62). The executable data transfer speed is stored into the memory 1020-1 or 1020-2 (step S63). The retry information in the memory 1014 is cleared (step S64). The normal end is reported to the channel (step S65). When the timer value exceeds the timer threshold value in step S59 or when the error is detected in step S60, a data transfer speed lower than the present data transfer speed is set into the transfer speed setting register 1010 in the data transmission and reception control circuit 1008 (S66). The retry information is recorded in the memory 1014 (step S67). The error is reported to the channel (A) and the retry is instructed (step S68).

Figure 32:
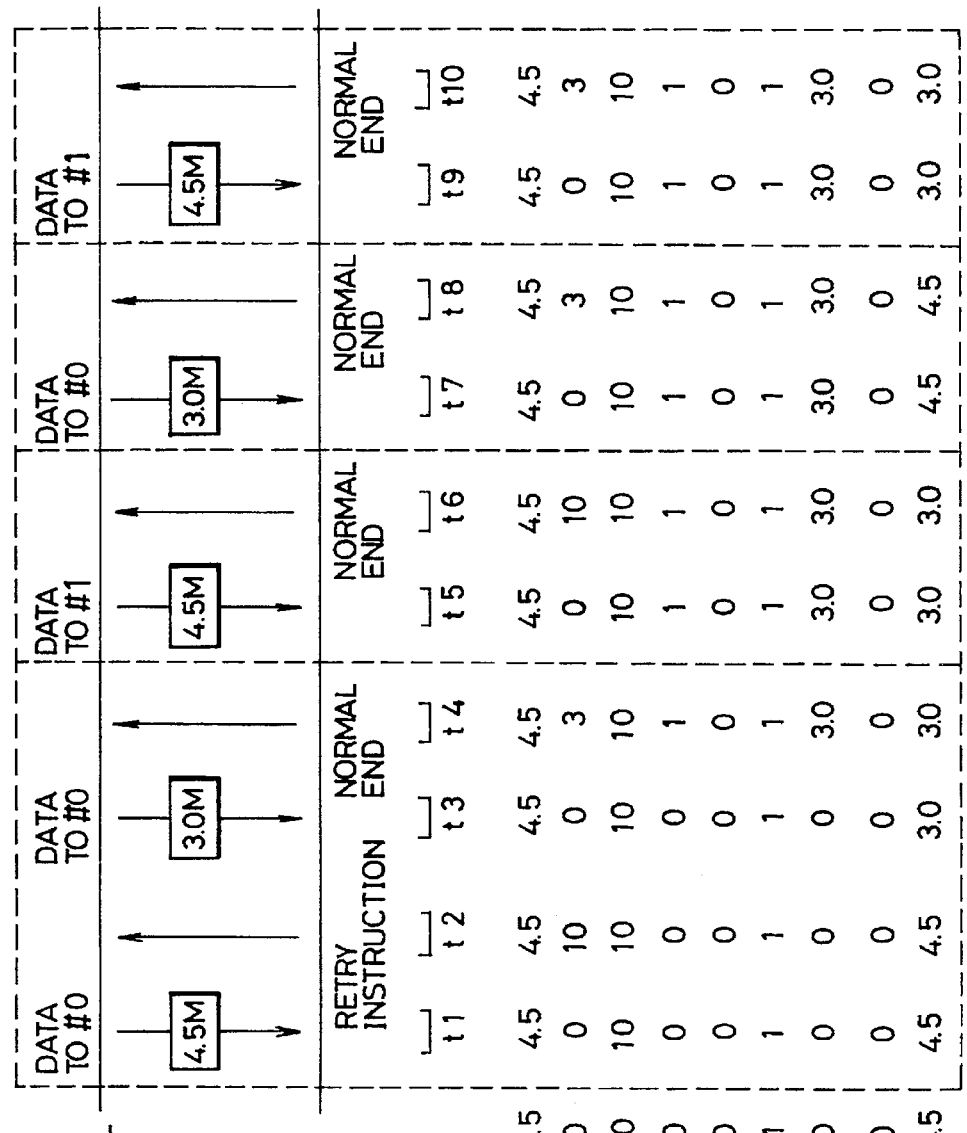
FIG. 32 is a timing chart for the transfer control of FIG. 30.

A timing chart of FIG. 32 relates to a control process by the MPU 1016 in FIG. 30. In FIG. 32, (A) denotes the channel; (B) the magnetic tape control unit 26; (C) the maximum data transfer speed of 4.5 MBytes/sec; (D) the value of the timer (initial value=0); (E) the timer threshold value (=10); (F) the value of the error counter for the drive machine No. #0 (initial value=0); (G) the value of the error counter for the drive machine No. #1 (initial value=0); (I) the executable transfer speed for the drive machine No. #0 (initial value=0); (J) the executable transfer speed (initial value=0) for the drive machine No. #1; (K) the value of the transfer speed setting register (initial value=4.5 MBytes/sec); and t1 to t10 the timings.

When the data transfer request in which the drive machine No. #0 is designated is generated from the channel (A) at the timing t1, the MPU 1016 compares the value of the error counter of the drive #0 stored in the memory 1020-1 and the error threshold value stored in the memory 1014. Thus, when the value of the error counter exceeds the error threshold value, the data transfer is executed at the maximum data transfer speed of 4.5 MBytes/sec. When an error occurs during the data transfer at the timing t2 and the time-out of the transfer time is detected, the error is reported to the channel (A), thereby instructing the retry. When the transfer request by the retry is received at the timing t3, since the error has already occurred in the data transfer of the speed of 4.5 MBytes/sec, the MPU 1016 reduces the data transfer speed to 3.0 MBytes/sec, thereby performing the retry. When the data transfer succeeds by the reduced data transfer speed at the timing t4, the normal end is reported to the channel. The value of the error counter of the drive machine No. #0 stored in the memory 1020-1 is increased. The data transfer speed of 3.0 MBytes/sec at which the data can be rescued is stored as an executable data transfer speed into the memory 1020-1.

Subsequently, when a new data transfer request in which the drive machine No. #1 is designated is newly generated from the channel (A) at the timing t5, the MPU 1016 compares the value of the error counter of the drive machine No. #1 in the memory 1020-2 and the error threshold value in the memory 1014. Since the count value doesn't exceed the error threshold value in this instance, the data transfer is started at the maximum data transfer speed of 4.5 MBytes/sec. When the data transfer is normally finished at the timing t6, the normal end is reported to the channel (A). When the data transfer request in which the drive machine No. #0 is designated is again generated from the channel (A) at the timing t7, the MPU 1016 compares the value of the error counter of the drive machine No. #0 in the memory 1020-1 and the error threshold value in the memory 1014. In this instance, since the value of the error counter of the drive machine No. #0 coincides with the error threshold value, all of the data transfer process in which the drive machine No. #0 is designated are executed at the reduced data transfer speed of 3.0 MBytes/sec. When the data transfer is normally finished at the timing t8, the normal end is reported to the channel (A). Subsequently, when the data transfer request in which the drive machine No. #1 is designated is generated from the channel (A), the MPU 1016 compares the value of the error counter for the drive machine No. #1 stored in the memory 1020-2 and the error threshold value stored in the memory 1014. Since the count value doesn't exceed the error threshold value in this instance, the data transfer is executed at the maximum data transfer speed of 4.5 MBytes/sec. When the data transfer is normally finished at the timing t10, the normal end is reported to the channel (A).

[Fourth Embodiment of the Data Transfer Control]

According to the fourth embodiment of the transfer control of the present invention, the number of error times of the data transfer errors is counted every tape medium and when the number of error times exceeds the error threshold value, all of the command processes which are executed by the same medium are executed while switching the speed to the executable data transfer speed.

Figure 33:
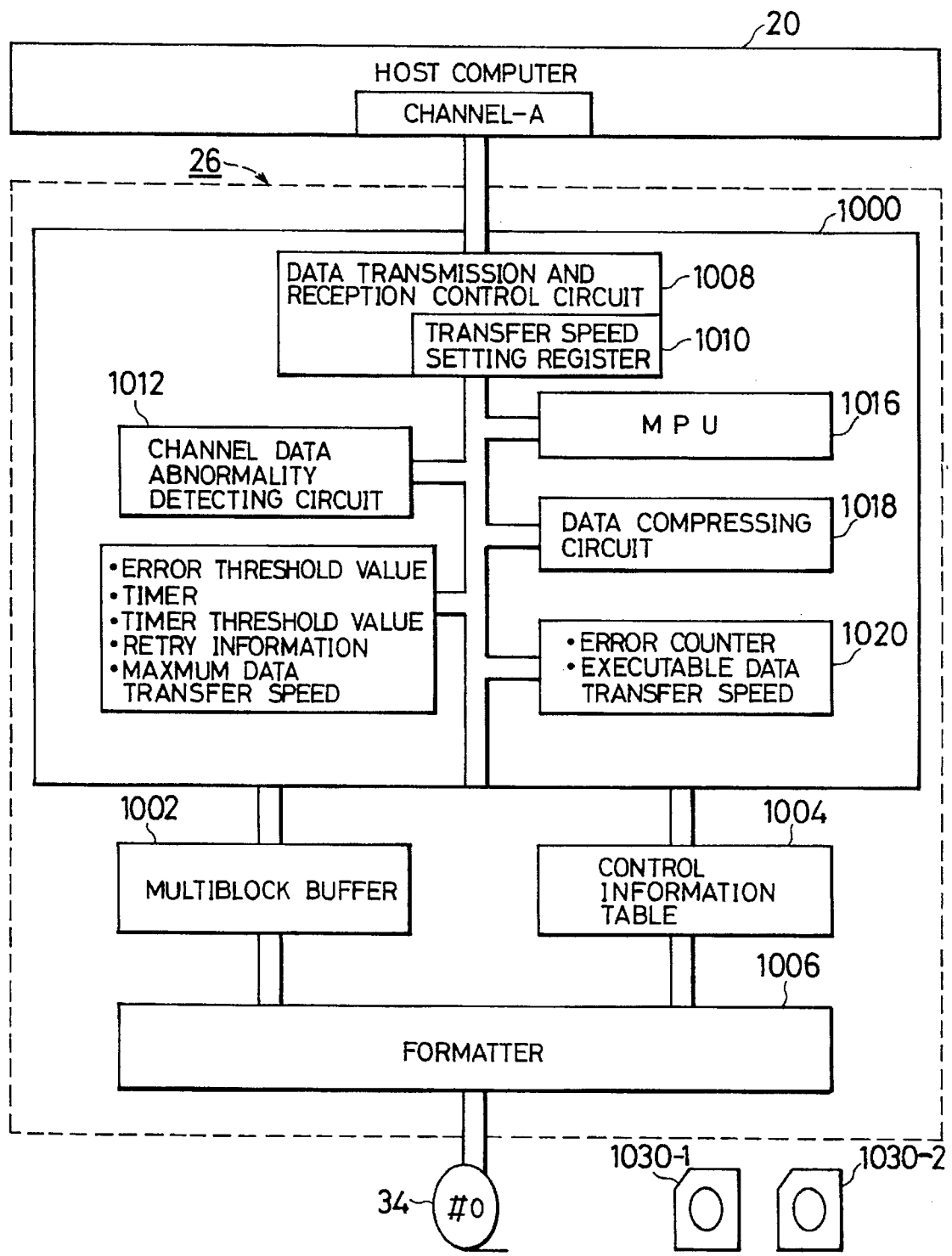
FIG. 33 is a block diagram of the fourth embodiment of a transfer control apparatus.

In FIG. 33, for a drive unit 34 connected to the magnetic tape control unit 26, for example, tape media (magnetic tape cartridges) 1030-1 and 1030-2 are exchanged by the accessor of the library apparatus. The host interface controller 1000, multiblock buffer 1002, control information table 1004, and formatter 1006 are provided for the magnetic tape control unit 26. The data transmission and reception control circuit 1008, channel data abnormality detecting circuit 1012, memory 1014, MPU 1016, data compressing circuit 1018, and memory 1020 are provided for the host interface controller 1000. A construction of each section is similar to that in the first embodiment of FIG. 24.

Figure 34:
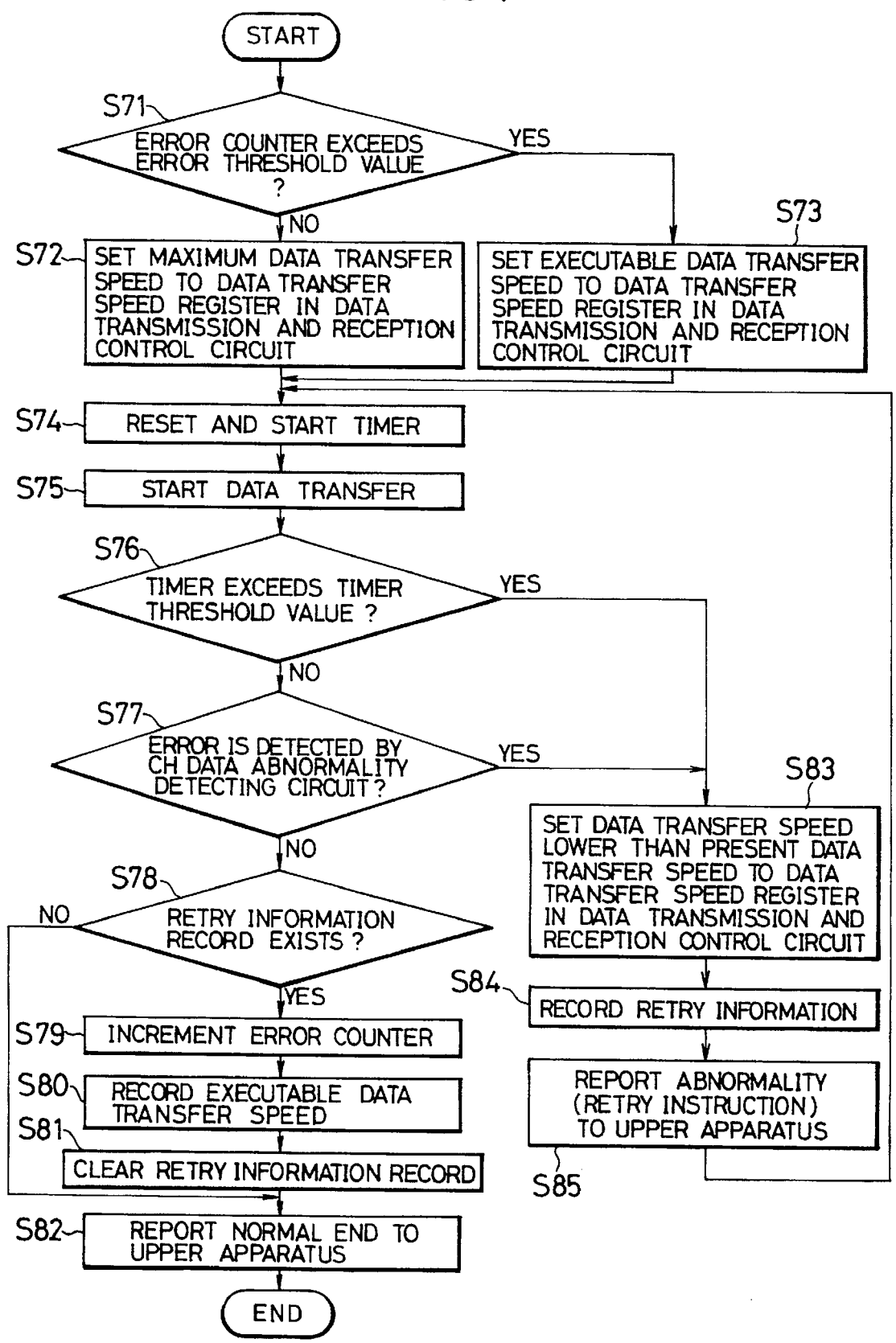
FIG. 34 is a flowchart for a transfer control of FIG. 33.

A flowchart of FIG. 34 relates to a transfer control of the MPU 1016 in the fourth embodiment of FIG. 33. The MPU 1016 judges whether the value of the error counter in the memory 1020 exceeds the error threshold value in the memory 1014 or not (step S71). If NO, the maximum data transfer speed of 4.5 MBytes/sec is set into the transfer speed setting register 1010 in the data transmission and reception control circuit 1008 (step S72). In step S71, when the value of the error counter exceeds the error threshold value, the executable data transfer speed of 3.0 MBytes/sec stored in the memory 1020 is set into the transfer speed setting register 1010 of the data transmission and reception control circuit 1008 (step S73). The timer in the memory 1014 is subsequently reset and started (step S74). The data transfer is started (step S75). After the data transfer was started, a check is made to see if the timer value exceeds the timer threshold value or not (step S76). When the timer value doesn't exceed the timer threshold value, a check is made to see if the error has been detected or not by the channel data abnormality detecting circuit 1012 (step S77). When the error is not detected, a check is made to see if the retry information has been recorded in the memory 1014 or not (step S78). When the retry information is not recorded in the memory 1014, the normal end is reported to the upper apparatus (step S82). When the retry information has been recorded (step S78), the value of the error counter in the memory 1020 is increased (step S79) and the executable data transfer speed is stored into the memory 1020 (step S80), the retry information in the memory 1014 is subsequently cleared (step S81). The normal end is reported to the channel (A) (step S82).

When the timer value doesn't exceed the timer threshold value in step S76 or when the error is detected in the process in step S77, a data transfer speed lower than the present data transfer speed is set into the transfer speed setting register 1010 in the data transmission and reception control circuit 1008 (step S83). The retry information is recorded in the memory 1014 (step S84). The error is reported to the channel, thereby instructing the retry (step S85).

Figure 35:
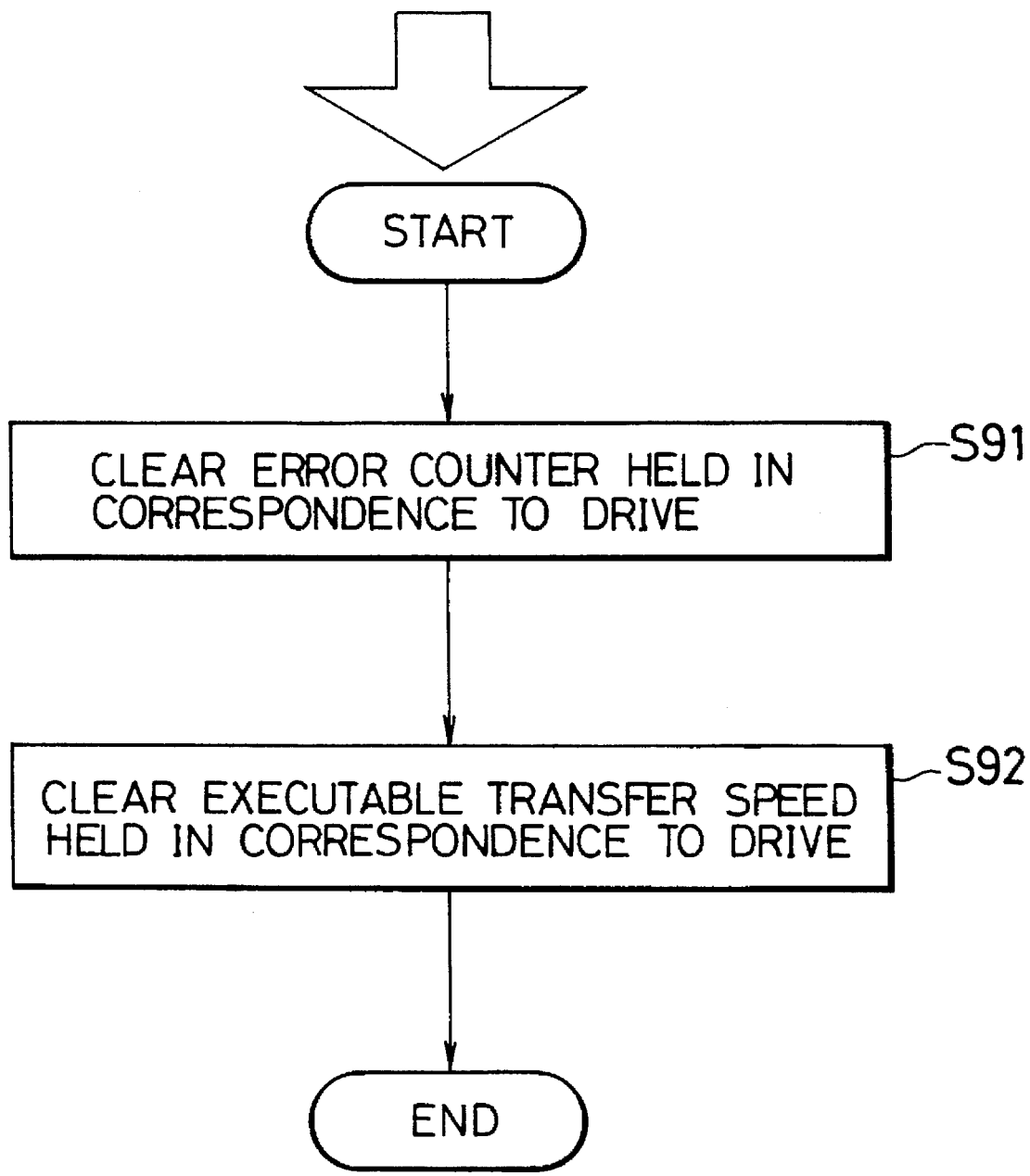
FIG. 35 is a flowchart for the transfer control of FIG. 33.

A flowchart of FIG. 35 relates to a control process when a tape medium is mounted to the drive unit 34 by the MPU 1016 in FIG. 33. In case of mounting the tape medium 1030-1 to the drive unit 34, first, the count value of the error counter stored in the memory 1020 in correspondence to the drive machine No. #0 of the drive unit 34 is cleared (step S91). The executable data transfer speed stored in the memory 1020 in correspondence to the drive machine No. #0 is subsequently cleared (step S92). After that, the processes shown in FIG. 34 are executed.

In case of the third embodiment of FIG. 30, since the judgment is performed in dependence on the drive unit, all of the data transfer processes for the drive unit designated in association with the transfer request become targets of the processes. In this case, the resetting conditions of the value of the error counter and the data transfer speed are specified by the time when an initial microprogram loader is loaded or when a power source is turned on. According to the fourth embodiment, however, since the judgment is performed in dependence on the tape medium, the count value of the error counter and the executable data transfer speed are reset as shown in FIG. 35 when the tape medium is mounted. Namely, when the tape medium is exchanged, the data transfer is executed at the designated maximum data transfer speed.

Figure 36:
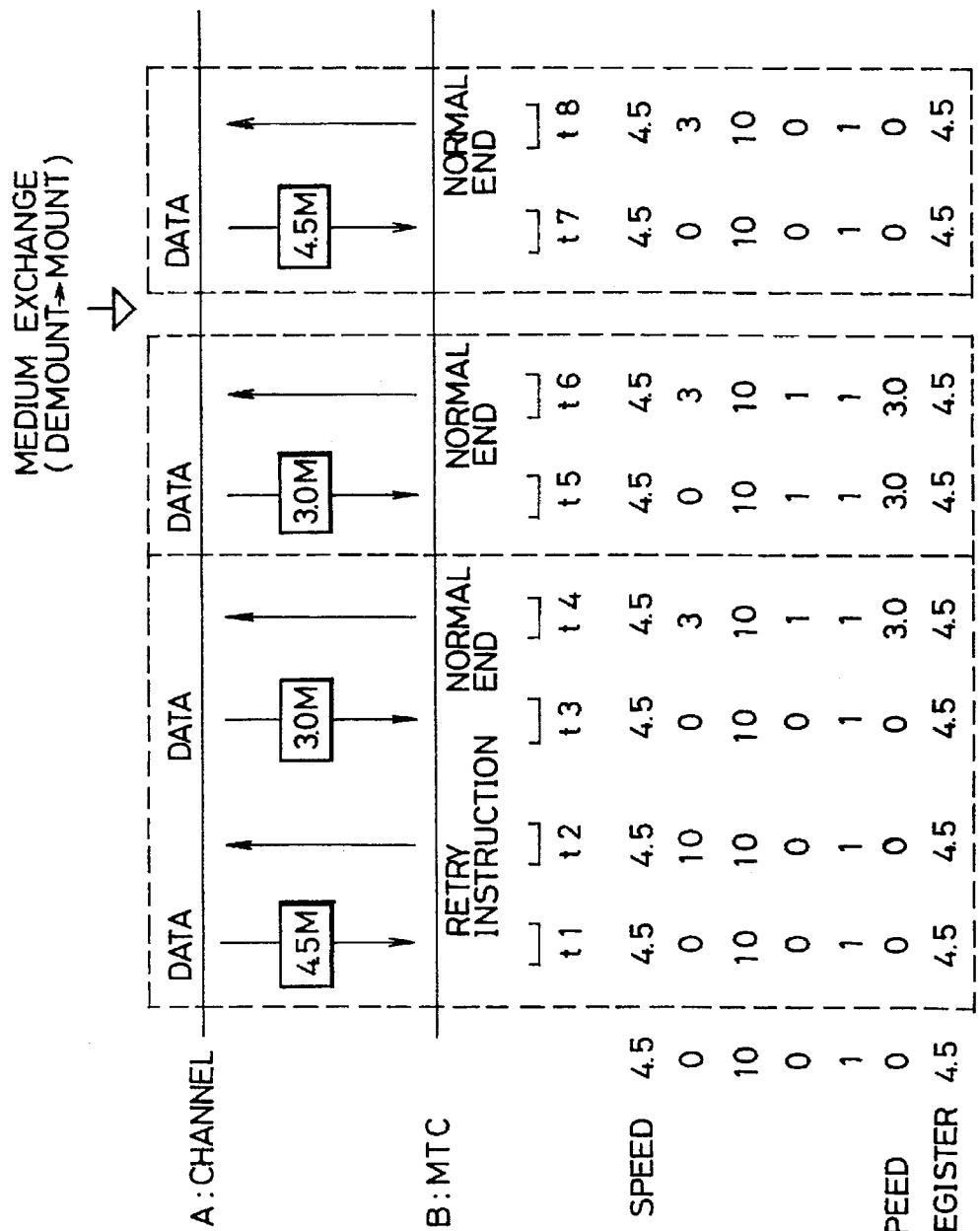
FIG. 36 is a timing chart for the transfer control of FIG. 33.

A timing chart of FIG. 36 relates to a control process by the MPU 1016 in the fourth embodiment of FIG. 33. In FIG. 36, (A) denotes the channel; (B) the magnetic tape control unit 26; (C) the maximum data transfer speed of 4.5 MBytes/sec; (D) the value of the timer (initial value=0); (E) the timer threshold value (=10); (F) the value of the error counter (initial value=0); (G) the error threshold value (=1); (H) the executable transfer speed (initial value=0); (I) the value of the transfer speed setting register (initial value=4.5); and t1 to t8 the timings.

When a data transfer request is generated from the channel (A) at the timing t1, the MPU 1016 compares the value of the error counter in the memory 1020 and the error threshold value in the memory 1014. When the value of the error counter doesn't exceed the error threshold value, the data transfer is executed at the maximum data transfer speed of 4.5 MBytes/sec. When the time-out by the error is detected during the data transfer at the timing t2, the error is reported to the channel (A), thereby instructing the retry. When the data transfer request to retry is generated from the channel (A) at the timing t3, since the error has already occurred in the data transfer of the speed of 4.5 MBytes/sec, the data transfer speed is reduced to 3.0 MBytes/sec, thereby performing the retry. When the data transfer succeeds by the reduced data transfer speed at the timing t4, the normal end is reported to the channel (A). The value of the error counter in the memory 1020 is increased. The data transfer speed of 3.0 MBytes/sec at which the data can be rescued by the retry is stored into the memory 1020 as an executable data transfer speed. Subsequently, when the data transfer request is generated at the timing t5, the value of the error counter in the memory 1020 is compared with the error threshold value. In this instance, since the value of the error counter coincides with the error threshold value, the data transfer speed is reduced to 3.0 MBytes/sec and the data transfer is executed. When the data transfer is normally finished at the timing t6, the normal end is reported to the channel. The tape medium is exchanged to the drive unit 34. For example, after the tape medium 1030-1 was demounted, the tape medium 1030-2 is mounted. In this instance, the MPU 1016 resets the count value of the error counter in the memory 1020 and the executable data transfer speed. When the data transfer request is generated at the timing t7, the value of the error counter in the memory 1020 is compared with the error threshold value in the memory 1014. In this instance, since the value of the error counter has been reset and doesn't exceed the error threshold value, the data transfer is executed at the maximum data transfer speed of 4.5 MBytes/sec. When the data transfer is normally finished at the timing t8, the normal end is reported to the channel.

Although the above embodiments have been described with respect to the magnetic tape cartridge as a recording medium as an example, in case of using an optical disk unit as an input/output apparatus, an optical disk cartridge can be also used as a memory medium. In addition to them, the invention can be also applied to a library apparatus using a proper detachable recording medium. It will be obviously understood that the invention is not limited by the numerical values shown in the above embodiments.

What is claimed is:

1. A library apparatus comprising:

a recording/reproducing unit for reading or writing a detachable memory medium;

an inserting/ejecting unit for inserting and ejecting said memory medium;

a medium storage for storing a plurality of said memory medium;

a medium conveying unit for conveying said memory medium between said medium storage and said recording/reproducing unit or between said medium storage and said inserting/ejecting unit; and an input/output control unit for sequentially receiving a first moving command, a loading command, a reading or writing command from a host computer, an unloading command, and a second moving command, for conveying said memory medium from said medium storage or said inserting/ejecting unit to said recording/reproducing unit by said medium conveying unit on the basis of said first moving command, subsequently for loading the memory medium conveyed by said medium conveying unit to said recording/reproducing unit, for executing a reading or writing operation on the basis of said reading or writing command, for ejecting out the memory medium from said recording/reproducing unit on the basis of said unloading command after completion of the reading or writing operation, and finally for conveying the memory medium ejected out of said recording/reproducing unit to said medium storage or said inserting/ejecting unit by said medium conveying unit on the basis of said second moving command, wherein said input/output control unit includes a status reporting section for issuing an end report of an unloading operation to said host computer during a period of time between after a start of the medium ejecting operation of said recording/reproducing unit based on the unloading command and before an end of the unloading operation.

2. An apparatus according to claim 1, wherein said status reporting section instructs the unloading operation to said recording/reproducing unit on the basis of said unloading command and also performs said end report of the unloading operation to said host computer, thereby allowing said host computer to issue said second moving command.

3. An apparatus according to claim 2, wherein said input/output control unit holds said second moving command issued from said host computer in accordance with the end report of the unloading operation of said status reporting section, and, when receiving the end report of the unloading operation from said recording/reproducing unit, said input/output control unit instructs the conveying operation to said medium conveying unit on the basis of the held second moving command.

4. An apparatus according to claim 1, wherein said recording/reproducing unit uses a magnetic tape cartridge as a memory medium and, when receiving a completion report of a tape rewinding from said recording/reproducing unit, said status reporting section executes the end report of the unloading operation to said host computer, thereby allowing said host computer to issue said second moving command.

5. An apparatus according to claim 1, further comprising:

a second status reporting section for issuing an end report of the conveying operation to return the memory medium ejected from said recording/reproducing unit to an original position, thereby allowing said host computer to issue a command based on a new input/output request when receiving said second moving command from said host computer in association with the end report of the unloading operation; and a logical number converting section which is constructed in a manner such that when a command having a logical machine number to designate the recording/reproducing unit is received from said host computer in accordance with said end report of the conveying operation, said logical machine number designated by said command is converted into a logical machine number of another recording/reproducing unit in a vacant state and the operation by said command is instructed.

6. An apparatus according to claim 5, wherein said logical number converting section instructs the operation by the conversion of the logical machine number with respect to each of said first moving command in association with the new input/output request received until the completion of the unloading operation of said recording/reproducing unit which performed said completion report, and said loading command, reading command, writing command, unloading command, and second moving command which are subsequent to said first moving command.

7. A control method of a library apparatus, comprising:

a first conveying step of conveying a memory medium from a medium storage or an inserting/ejecting unit to a recording/reproducing unit by a medium conveying unit on the basis of a first moving command issued by a host computer;

a loading step of loading said memory medium conveyed in said first conveying step to said recording/reproducing unit on the basis of a loading command issued by said host computer subsequent to said first moving command;

an input/output step of allowing said recording/reproducing unit to execute a reading or writing operation on the basis of a reading command or a writing command issued by said host computer subsequent to said first moving command;

an unloading step of ejecting said memory medium from said recording/reproducing unit on the basis of an unloading command issued by said host computer subsequent to said reading command or writing command;

a first status reporting step of issuing an end report of an unloading operation to said host computer, thereby allowing said host computer to issue said second moving command during the unloading operation for a period of time between after a start of ejecting said memory medium and before the ejection thereof from said recording/reproducing unit in said unloading step; and a second conveying step of conveying the memory medium ejected in said unloading step to said medium storage or said inserting/ejecting unit by said medium conveying unit on the basis of said second moving command issued by said host computer subsequent to said unloading command.

8. A method according to claim 7, wherein in said first status reporting step, simultaneously with the unloading operation instructed to said recording/reproducing unit in said unloading step, an end report of the unloading operation is issued to said host computer, thereby allowing said host computer to issue said second moving command.

9. A method according to claim 8, wherein in said second conveying step, said second moving command issued from said host computer on the basis of said end report of the unloading operation by said first status reporting step is held and, when the end report of the unloading operation is received from said recording/reproducing unit, the conveying operation is instructed to said medium conveying unit on the basis of said held second moving command.

10. A method according to claim 7, wherein said recording/reproducing unit uses a magnetic tape cartridge as said memory medium, and in said first status reporting step, simultaneously with the reception of a completion report of a tape rewinding of said magnetic tape cartridge from said recording/reproducing unit in said unloading step, an end report of the unloading operation is issued to said host computer, thereby allowing said host computer to issue said second moving command.

11. A method according to claim 7, further comprising:

a second status reporting step of issuing an end report of the conveying operation to return said memory medium ejected from said recording/reproducing unit to an original position, thereby allowing said host computer to issue a command based on a new input/output request when said second moving command is received from said host computer in association with said end report of the unloading operation; and a logical number converting step which is constructed in a manner such that, when a command having a logical machine number to designate the recording/reproducing unit is received from said host computer in accordance with said end report of the conveying operation, said logical machine number designated by said command is converted into a logical machine number of another recording/reproducing unit in a vacant state and the operation by said command is instructed.

12. A method according to claim 11, wherein in said logical number converting step, the operation by the conversion of the logical machine number is executed with respect to each of said first moving command in association with the new input/output request received until the completion of the unloading operation of said recording/reproducing unit which performed said end report, and said loading command, reading command, writing command, unloading command, and second moving command which are subsequent to said first moving command.

13. A library apparatus comprising;

a recording/reproducing unit for reading or writing a detachable memory medium;

an inserting/ejecting unit for inserting and ejecting said memory medium;

a medium storage for storing a plurality of said memory media;

a medium conveying unit for conveying said memory medium between said medium storage and said recording/reproducing unit or between said medium storage and said inserting/ejecting unit; and an input/output control unit for sequentially receiving a first moving command, a loading command, a reading or writing command from a host computer, an unloading command, and a second moving command, for conveying said memory medium from said medium storage or said inserting/ejecting unit to said recording/reproducing unit by said medium conveying unit on the basis of said first moving command, subsequently for loading the memory medium conveyed by said medium conveying unit to said recording/reproducing unit, for executing a reading or writing operation on the basis of said reading or writing command, for ejecting out the memory medium from said recording/reproducing unit on the basis of said unloading command after completion of the reading or writing operation, and finally for conveying the memory medium ejected out of said recording/reproducing unit to said medium storage or said inserting/ejecting trait by said medium conveying unit on the basis of said second moving command, wherein said input/output control unit includes a status reporting section, during a period of time between after the start of a medium ejecting operation of said recording/reproducing unit based upon the unloading command and before the end of the unloading operation, for issuing an end report of an unloading operation to said host computer, for receiving a second moving command, and for holding the second moving command until the loading operation is terminated.

* * * * *

UNITED STATES PATENT AND TRADEMARK OFFICE
CERTIFICATE OF CORRECTION

PATENT NO. : 5,654,839
DATED : Aug. 5, 1997
INVENTOR(S) : Tanaka et al.

Page 1 of 2

It is certified that error appears in the above-identified patent and that said Letters Patent is hereby corrected as shown below:

Column 1, line 12, before "apparatus" insert --an--.

Column 1, line 44, delete "a".

Column 13, line 29, delete "I" and insert --I.-- therefor.

Column 15, line 44, delete "MUM" and insert --MTU-- therefor.

Column 15, line 50, delete "MUM" and insert --MTU-- therefor.

UNITED STATES PATENT AND TRADEMARK OFFICE
CERTIFICATE OF CORRECTION

PATENT NO. : 5,654,839
DATED : Aug. 5, 1997
INVENTOR(S) : Tanaka et al.

It is certified that error appears in the above-identified patent and that said Letters Patent is hereby corrected as shown below:

Column 18, line 64, delete "54" and insert --S4-- therefor.

Column 19, line 1, delete "not the" and insert --not. If the-- therefor.

Column 36, line 49, delete "trait" and insert --unit-- therefor.

Signed and Sealed this

Twenty-fifth Day of August, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,654,839
DATED : Aug. 5, 1997
INVENTOR(S) : Hidehiko Tanaka

It is certified that error appears in the above-identified patent and that said Letters Patent is hereby corrected as shown below:

ON THE TITLE PAGE:

On the second line from the top, delete "et al."

Under "[75] Inventors" delete "; Ryutaro Kurusu, Yokohama; Akira Hayakawa, Yokohama; Masakazu Sakamoto, Yokohama, all of Japan" and insert --, Japan-- therefor Signed and Sealed this Twenty-seventh Day of October, 1998

BRUCE LEHMAN

*Attest:*

*Attesting Officer*      *Commissioner of Patents and Trademarks*